United States Patent
Bradley et al.

(10) Patent No.: US 11,102,259 B2
(45) Date of Patent: Aug. 24, 2021

(54) NETWORK SYSTEM FOR CONTENT PLAYBACK ON MULTIPLE DEVICES

(71) Applicant: Apple Inc., Cupertino, CA (US)

(72) Inventors: Bob Bradley, San Jose, CA (US); Bryan E. Hansen, San Francisco, CA (US); Vincent M. Lane, San Francisco, CA (US); Benjamin S. Phipps, San Francisco, CA (US); Karl F. Schramm, Monte Sereno, CA (US); Andrew J. Sinesio, Saratoga, CA (US); Jaireh Tecarro, Berkeley, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/741,504

(22) Filed: Jan. 13, 2020

(65) Prior Publication Data

US 2020/0236152 A1 Jul. 23, 2020

Related U.S. Application Data

(60) Provisional application No. 62/795,492, filed on Jan. 22, 2019.

(51) Int. Cl.
*H04L 29/06* (2006.01)
*H04N 21/258* (2011.01)
*H04L 29/08* (2006.01)
*H04N 21/235* (2011.01)

(52) U.S. Cl.
CPC ........ *H04L 65/4084* (2013.01); *H04L 63/083* (2013.01); *H04L 67/1095* (2013.01); *H04N 21/2358* (2013.01); *H04N 21/25816* (2013.01)

(58) Field of Classification Search
CPC . H04L 63/083; H04L 65/4084; H04L 65/602; H04L 65/1059; H04L 65/4015; H04L 67/06; H04L 67/303; H04L 67/1095; H04L 9/3226; H04N 21/482; H04N 21/485; H04N 21/2358; H04N 21/25808;
(Continued)

(56) References Cited

U.S. PATENT DOCUMENTS 6,389,467 B1 * 5/2002 Eyal ........................ H04L 65/60
709/223
7,228,305 B1 * 6/2007 Eyal ........................ G06Q 30/02
(Continued)

FOREIGN PATENT DOCUMENTS

WO WO-2014178605 A1 * 11/2014 ............ H04W 76/10

OTHER PUBLICATIONS

Srinivasan, Vijay, et al., "MobileMiner: Mining Your Frequent Patterns on Your Phone", Ubicomp '14, Sep. 13-17, 2014, Seattle, WA USA. 12 Pgs.

*Primary Examiner* — Kostas J Katsikis
(74) *Attorney, Agent, or Firm* — Morgan, Lewis & Bockius LLP

(57) ABSTRACT

Embodiments described herein provide a network system to enable content playback on multiple devices. An electronic device can receive information associated with media playback request and resolve a media item and intended playback device for the media request based on a set of available media items and player devices. The device can then transmit, via the data interface, a request to play the media item at the player device via a secure device to device communication system.

20 Claims, 38 Drawing Sheets

(58) Field of Classification Search
CPC ....... H04N 21/25816; H04N 21/44227; H04N 21/43615; G06F 21/33; H04W 12/06
See application file for complete search history.

(56) References Cited

U.S. PATENT DOCUMENTS

| | | | |
|---|---|---|---|
| 7,454,509 B2 * | 11/2008 | Boulter | G06F 16/9535 709/231 |
| 7,761,414 B2 | 7/2010 | Reedman | |
| 7,809,682 B2 | 10/2010 | Aterson et al. | |
| 7,984,161 B2 | 7/2011 | Esteve Balducci et al. | |
| 8,595,834 B2 | 11/2013 | Xie et al. | |
| 9,679,125 B2 | 6/2017 | Bailor et al. | |
| 2008/0059656 A1 | 3/2008 | Saliba et al. | |
| 2010/0287463 A1 * | 11/2010 | Lee | H04N 21/43615 715/243 |
| 2010/0303236 A1 * | 12/2010 | Laaksonen | H04L 9/3228 380/270 |
| 2011/0246885 A1 * | 10/2011 | Pantos | H04L 67/36 715/716 |
| 2012/0117586 A1 * | 5/2012 | McCoy | H04N 21/4722 725/25 |
| 2012/0117590 A1 * | 5/2012 | Agnihotri | H04N 21/4126 725/30 |
| 2013/0151655 A1 * | 6/2013 | Wu | H04N 21/2543 709/217 |
| 2013/0185398 A1 * | 7/2013 | Thang | H04L 65/4069 709/219 |
| 2013/0333016 A1 * | 12/2013 | Coughlin | H04L 63/083 726/9 |
| 2015/0046995 A1 * | 2/2015 | Yang | H04L 63/083 726/7 |
| 2015/0201230 A1 * | 7/2015 | Drope | H04N 5/76 725/88 |
| 2015/0222517 A1 * | 8/2015 | McLaughlin | G06F 21/445 713/156 |
| 2015/0355879 A1 * | 12/2015 | Beckhardt | H04N 21/4825 700/94 |
| 2016/0065641 A1 * | 3/2016 | Chesluk | H04L 67/02 709/219 |
| 2016/0259857 A1 | 9/2016 | Wang et al. | |
| 2018/0198834 A1 * | 7/2018 | Sodi | H04L 65/601 |
| 2020/0236152 A1 * | 7/2020 | Bradley | H04N 21/25816 |
| 2020/0344526 A1 * | 10/2020 | Kuper | G11B 27/105 |

\* cited by examiner

800

800

800

800

808

820
822

810

804a

NETWORK SYSTEM FOR CONTENT PLAYBACK ON MULTIPLE DEVICES

CROSS-REFERENCE

This application claims benefit of U.S. Provisional Patent Application No. 62/795,492, "NETWORK SYSTEM FOR CONTENT PLAYBACK ON MULTIPLE DEVICES," filed Jan. 22, 2019, which is hereby incorporated herein by reference.

FIELD

This application relates generally to a network system and framework that enables an intelligent automated assistant to perform content playback on multiple devices.

BACKGROUND OF THE DISCLOSURE

Intelligent automated assistants, or digital assistants, can provide a beneficial interface between human users and electronic devices. Digital assistants may be invoked in order to perform various user requests, such as facilitating media playback. However, conventional digital assistants are not well integrated into systems having multiple user devices capable of playing media, such as home entertainment systems. For instance, a user may wish to play specific media content on a specific device, although the user's speech request may be provided at a device which is different than the intended playback device. Conventional digital assistants may not be well equipped to handle these requests. Such problems are magnified when more complex or ambiguous requests are issued by a user. For example, a user may wish to transfer playback of currently playing media from a first device to a second device, such as from a mobile phone to a television. Additionally, the user may ambiguously refer to content and devices using references such as "this" or "that," resulting in failed attempts to play the desired content. Ultimately, these problems create a poor user experience. Accordingly, an improved system for content playback on multiple devices is desired.

SUMMARY

Systems and methods to enable a network system that facilitates content playback on multiple devices via an intelligent automated assistant.

One embodiment provides for an electronic device, comprising a data interface, a memory to store instructions, and one or more processors to execute the instructions, wherein the instructions cause the one or more processors to receive information associated with media playback, receive a request for playback of a media item, resolve a media item and player device for the request based on a set of available media items and player devices, and transmit, via the data interface, a request to play the media item at the player device. Resolving the media item and player device can include determining a network location for a device storing the media items, a streamable status of the media items (e.g., from a local device or cloud streaming service), and resolving a network location for the player device based on an identifier or physical location associated with the player device.

One embodiment provides for a method comprising, at an electronic device with one or more processors and memory, receiving information associated with media playback, receiving a request for playback of a media item, resolving a media item and player device for the request based on a set of available media items and player devices, and transmitting, via a data interface, a request to play the media item at the player device.

One embodiment provides for a non-transitory machine-readable medium storing instructions to cause one or more processors of an electronic device to perform operations comprising detecting a player device via a data interface of the electronic device, the player device detected on a network accessible to the electronic device, automatically attempting to connect with the player device upon detection of the player device, and exchanging data with the player device, wherein data exchanged with the player device includes a first list of media items accessible to the electronic device and a second list of media items accessible to the player device. The player device can then be added to a set of available player devices on the network. Upon subsequent receipt of a request for playback of a media item, the instructions can cause the electronic device to resolve a media item for the request based on the first list of media items and the second list of media item. The electronic device can resolve a player device for use in playback of the media item for the request based on the set of available player devices on the network, such as, for example, the rendering capabilities (e.g., audio, video, etc.) of the available player devices. The electronic device can then transmit, via a data interface, a request to play the media item at a resolved player device.

Other features of the present embodiments will be apparent from the accompanying drawings and from the detailed description, which follows.

DETAILED DESCRIPTION

Figure 1:
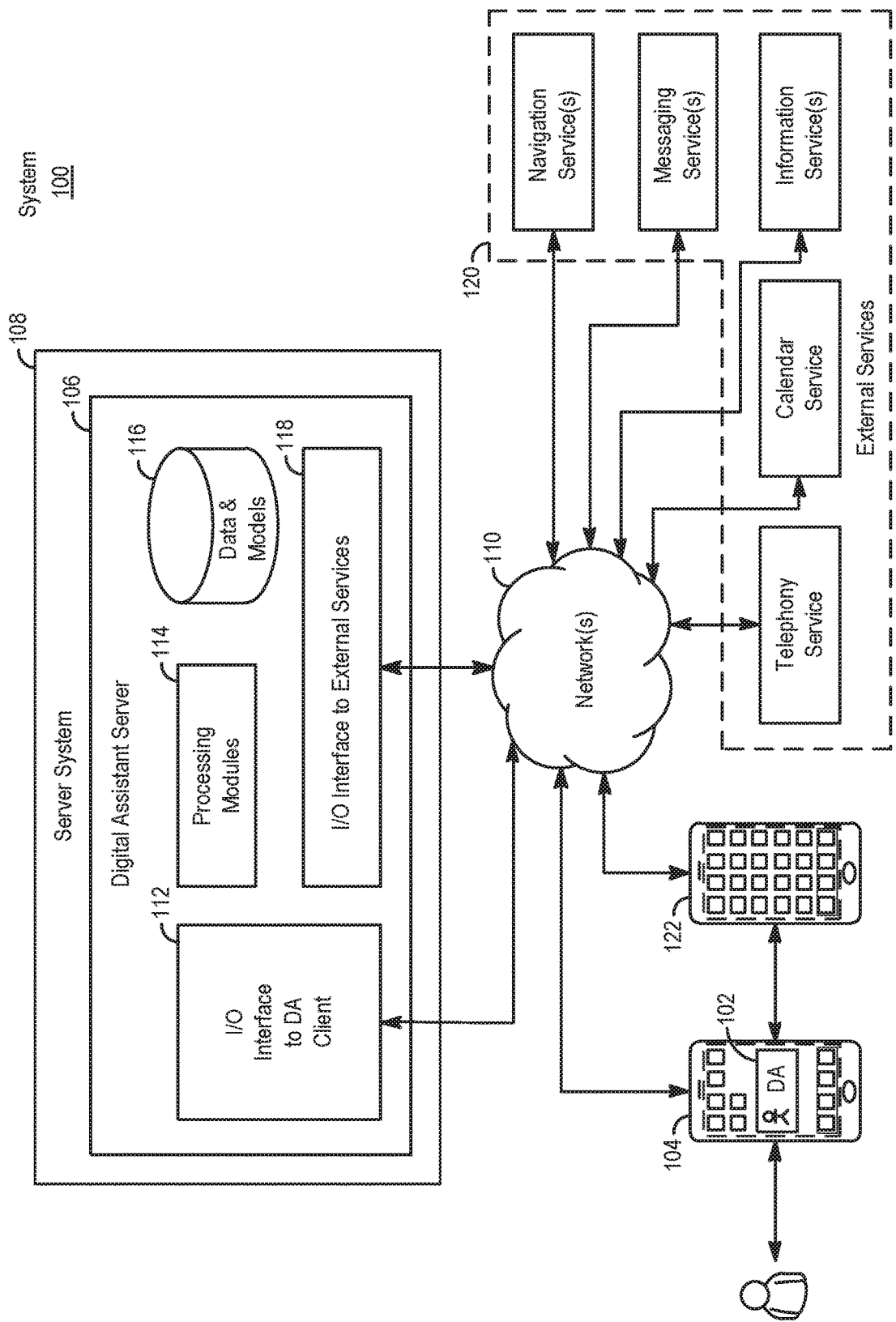
FIG. 1 is a block diagram illustrating a system and environment for implementing a digital assistant, according to various examples.

In the following description of examples, reference is made to the accompanying drawings in which are shown by way of illustration specific examples that can be practiced. It is to be understood that other examples can be used, and structural changes can be made without departing from the scope of the various examples.

Conventional techniques for media playback on multiple devices lack effectiveness. For instance, conventional systems are unable to efficiently handle requests to transfer playback of media content from a first device to a second device, based on natural language input. For example, a user may provide natural language input to a device, such as "Play this on that," where "this" may refer to media content currently playing on a first device (e.g., a mobile phone) and "that" may refer to a secondary user device that user wishes to transfer playback to. Conventional systems may be unable to determine user intent associated with such a request, much less perform the requisite steps to achieve media playback on the secondary device.

In accordance with some systems, computer-readable media, and processes described herein, media playback is improved by providing a content playback method on multiple user devices. In one example process, information associated with media playback is received from one or more user devices. For example, one or more user devices, such as a television set top box or a home speaker system, may send information to a first user device, such as a mobile phone. A speech request for a media item is then received at the first user device. At least the speech request and the information associated with media playback may then be transmitted to a second electronic device, such as a digital assistant server. The user device may then receive, based on at least the speech request and the information associated with media playback, an instruction for media playback on a secondary user device, such as a television set top box. At least one task is then performed based on the instruction for media playback, such as playing media content at the secondary user device.

By performing the task based on the received instruction for media playback, the system improves task execution, and specifically with respect to systems for media playback on multiple devices. For example, the system enhances the knowledge used for intent determination, device selection, and media identification by performing an initial procedure of receiving the information associated with media playback. For instance, a plurality of media devices (e.g., devices within the user's home, devices the user has previously interacted with, etc.) may transmit information associated with media playback to a user device, such as a mobile phone or a voice enabled speaker, for example. The information associated with media playback may include, for example, any information to assist the system with intent determination and media playback, such as information related to media ownership, playback capabilities, user interaction history, installed applications, and the like. In turn, the system improves natural language processing and task execution, and specifically in the context of content playback on multiple devices. For example, conventional systems typically struggle to determine user intent or identify media that a user is targeting, resulting in inaccurate results and repetitive interactions with a user. The system described herein not only addresses these problems, but provides platform to facilitate task execution for media playback on multiple devices. For example, a user may provide an ambiguous request to play "this" media on "that" device." The system described herein is equipped to efficiently identify both the media and device the user is targeting, thus providing a seamless user experience.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

System and Environment

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, Calif. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

Electronic Devices

Figure 2A:
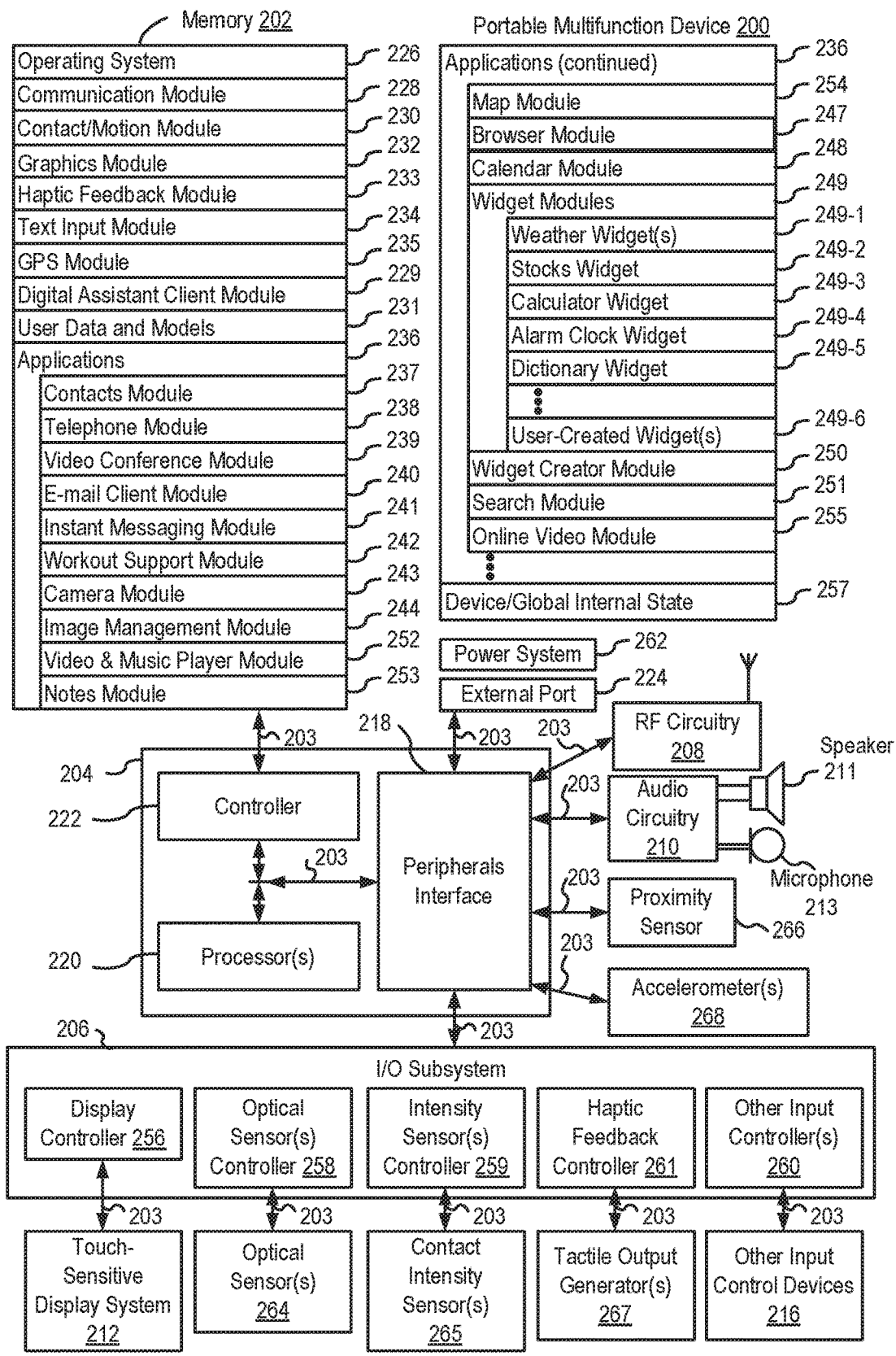
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random-access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; U.S. patent application Ser. No. 11/240,788, "Proximity Detector In Handheld Device"; U.S. patent application Ser. No. 11/620,702, "Using Ambient Light Sensor To Augment Proximity Sensor Output"; U.S. patent application Ser. No. 11/586,862, "Automated Response To And Sensing Of User Activity In Portable Devices"; and U.S. patent application Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods and Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
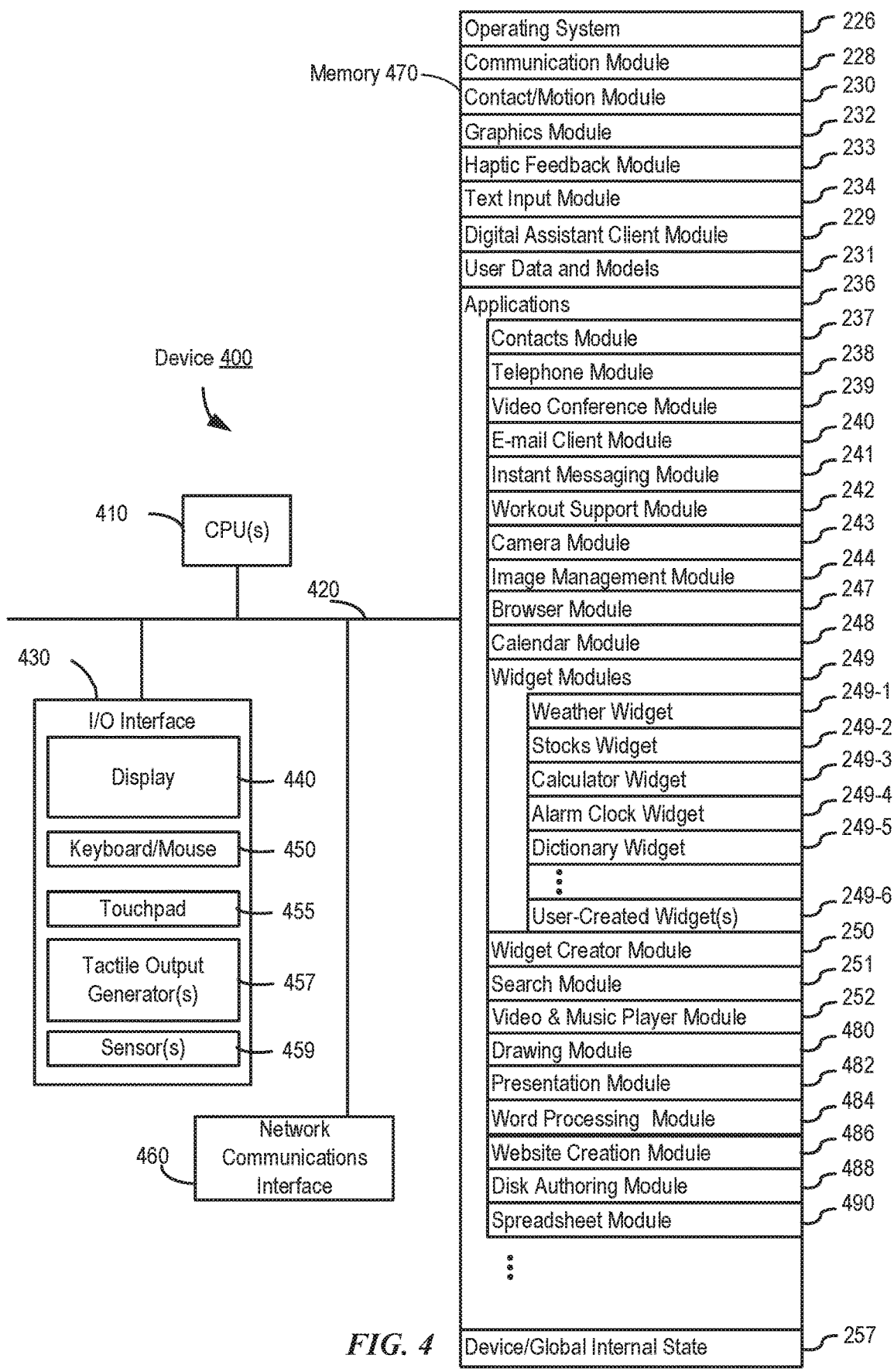
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:

Contacts module 237 (sometimes called an address book or contact list);
Telephone module 238;
Video conference module 239;
E-mail client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
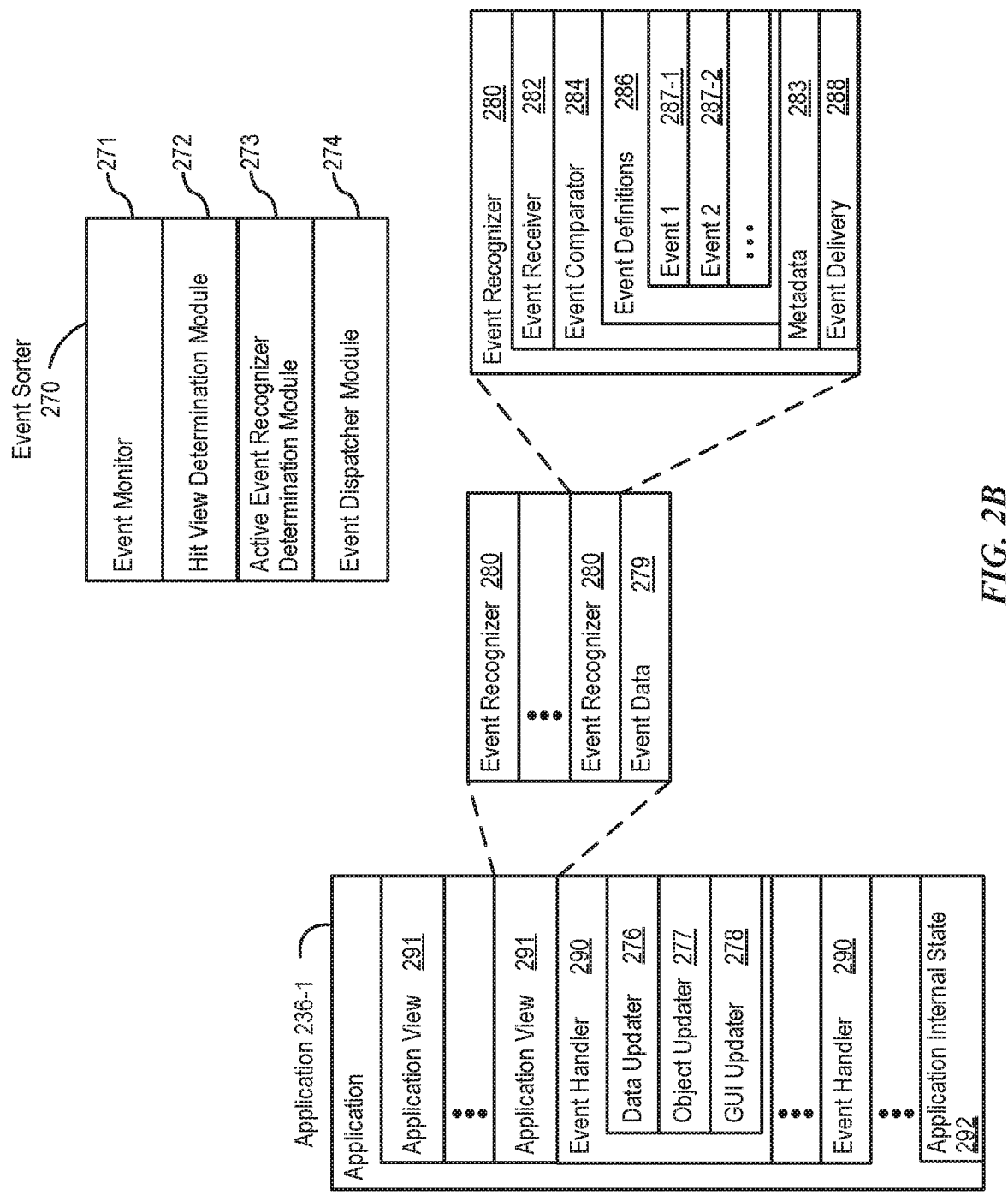
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
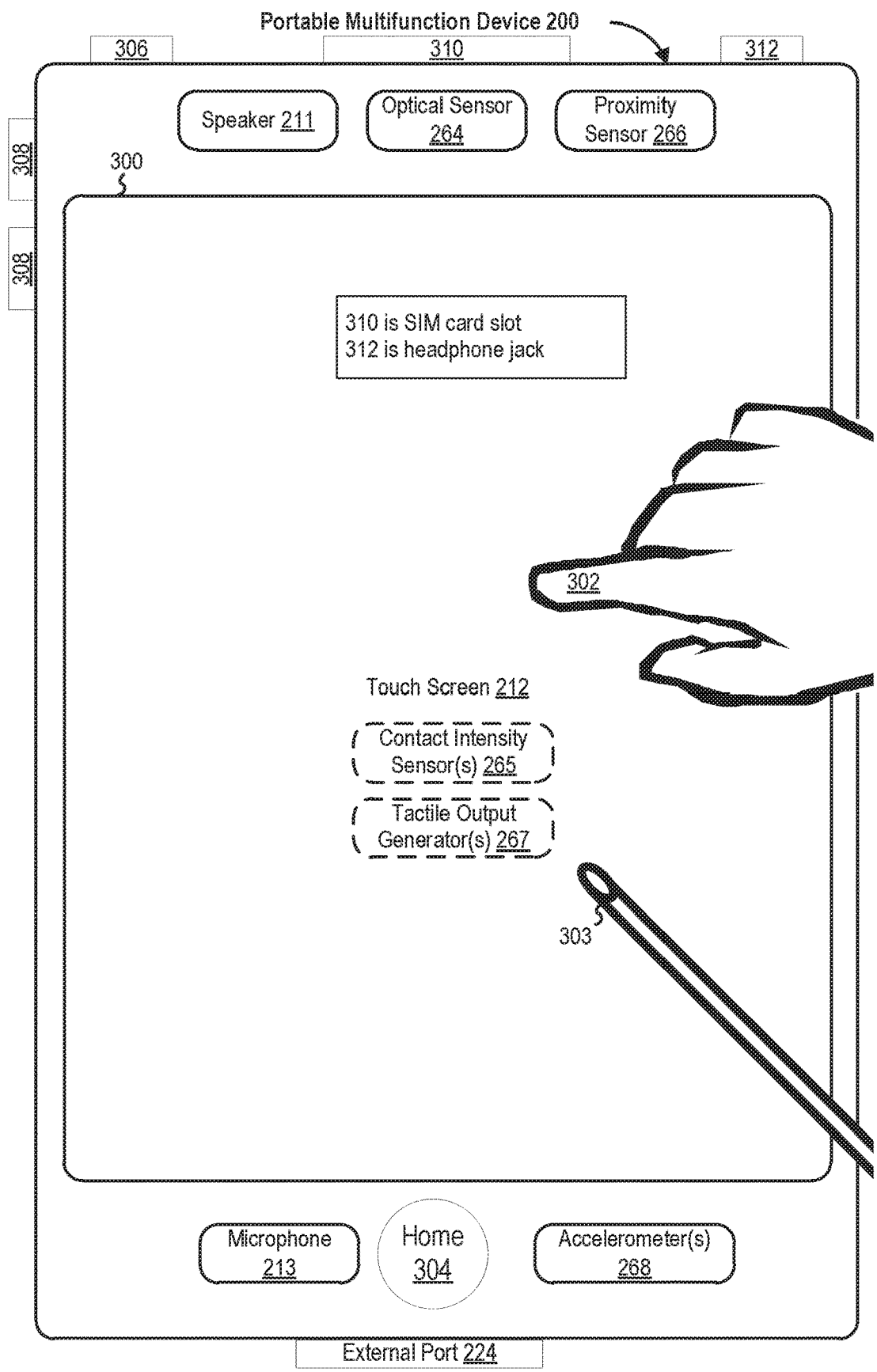
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
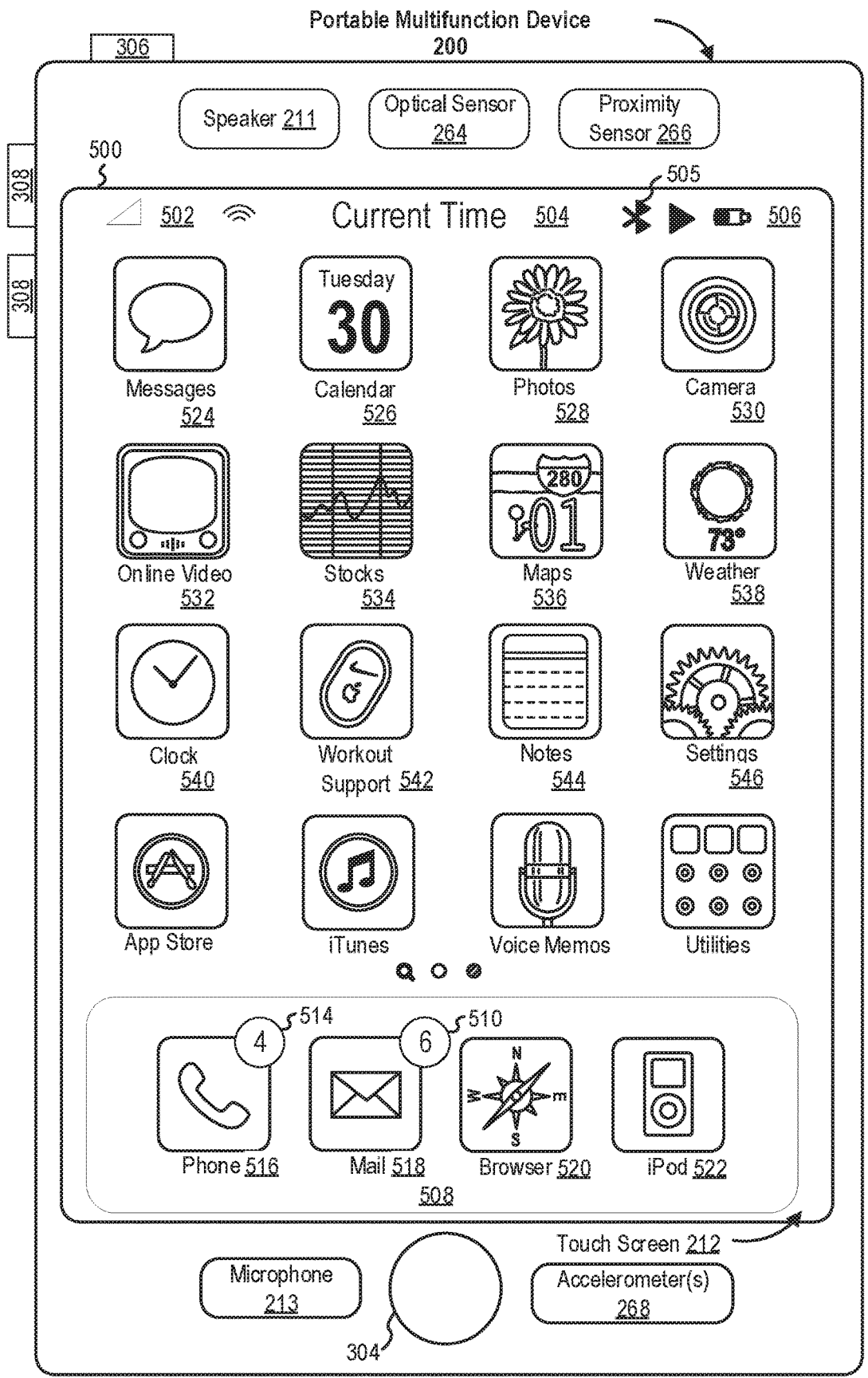
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
  Icon 516 for telephone module 238, labeled "Phone," which optionally includes an indicator 514 of the number of missed calls or voicemail messages;
  Icon 518 for e-mail client module 240, labeled "Mail," which optionally includes an indicator 510 of the number of unread e-mails;
  Icon 520 for browser module 247, labeled "Browser;" and
  Icon 522 for video and music player module 252, also referred to as iPod (trademark of Apple Inc.) module 252, labeled "iPod;" and
Icons for other applications, such as:
  Icon 524 for IM module 241, labeled "Messages;"
  Icon 526 for calendar module 248, labeled "Calendar;"
  Icon 528 for image management module 244, labeled "Photos;"
  Icon 530 for camera module 243, labeled "Camera;"
  Icon 532 for online video module 255, labeled "Online Video;"
  Icon 534 for stocks widget 249-2, labeled "Stocks;"
  Icon 536 for map module 254, labeled "Maps;"
  Icon 538 for weather widget 249-1, labeled "Weather;"
  Icon 540 for alarm clock widget 249-4, labeled "Clock;"
  Icon 542 for workout support module 242, labeled "Workout Support;"
  Icon 544 for notes module 253, labeled "Notes;" and Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
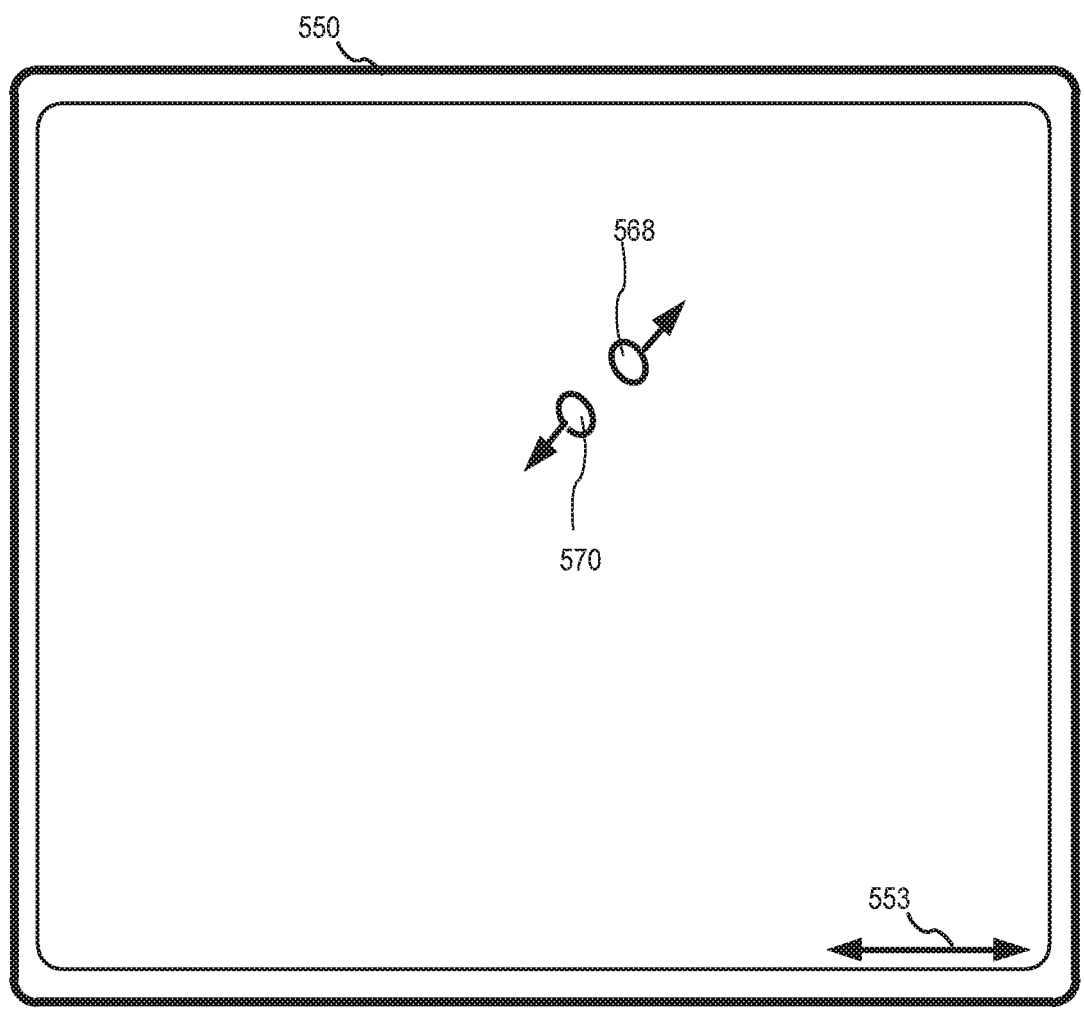
FIG. 5B illustrates an exemplary user interface for a multifunction device with a touch-sensitive surface that is separate from the display, according to various examples.
Figure 5B:
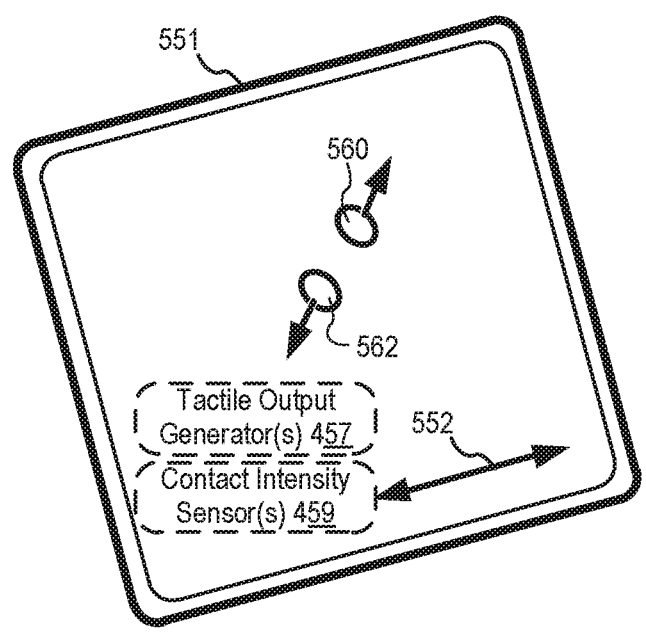

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
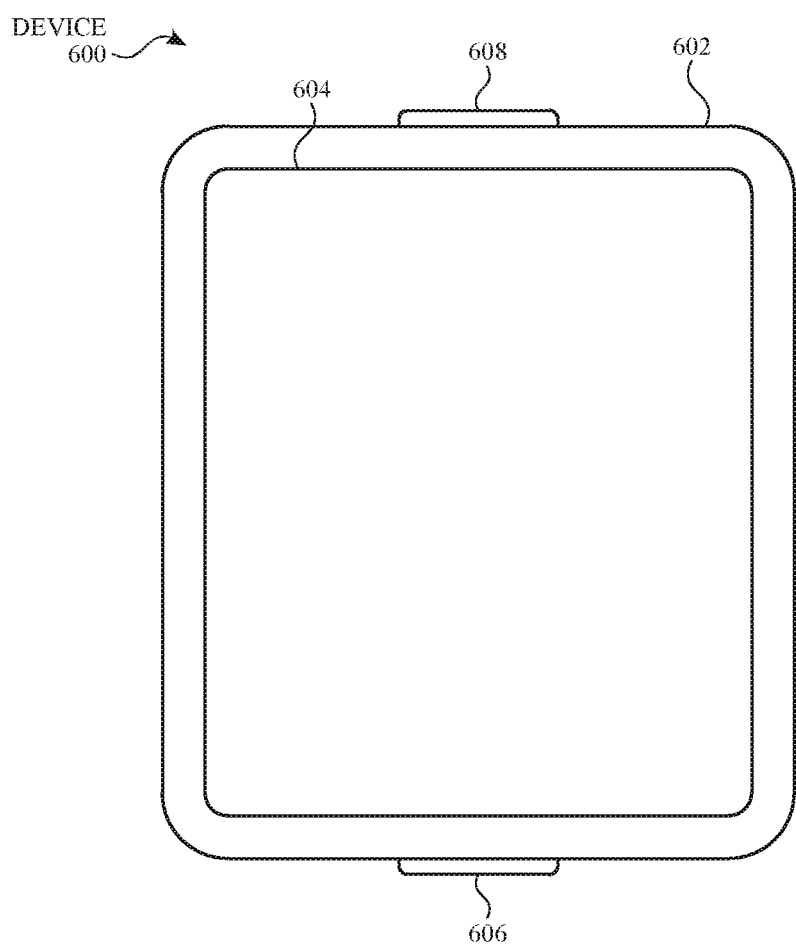
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Ser. No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
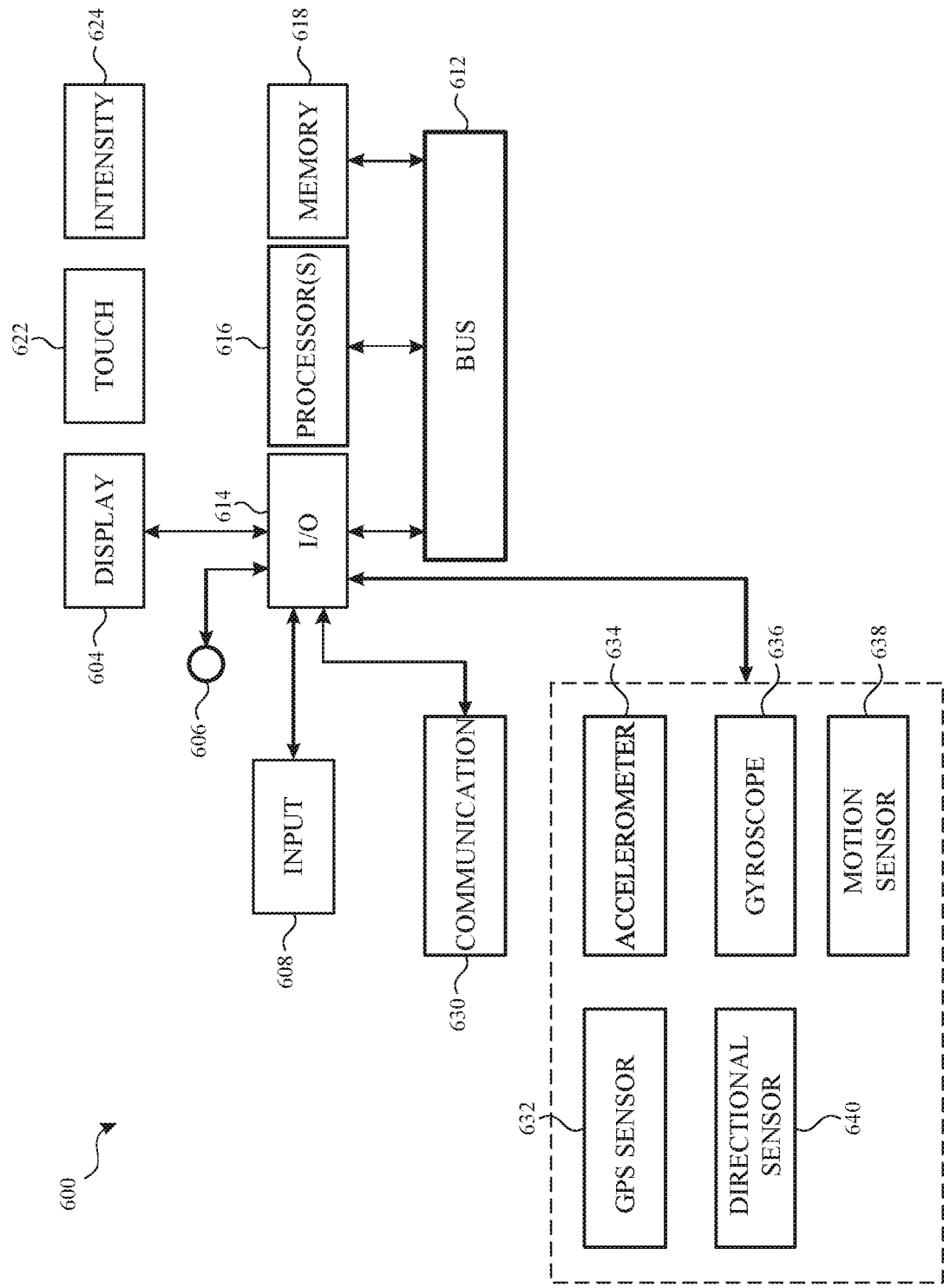
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to touch-sensitive display screen 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, and 6A-B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Digital Assistant System

Figure 7A:
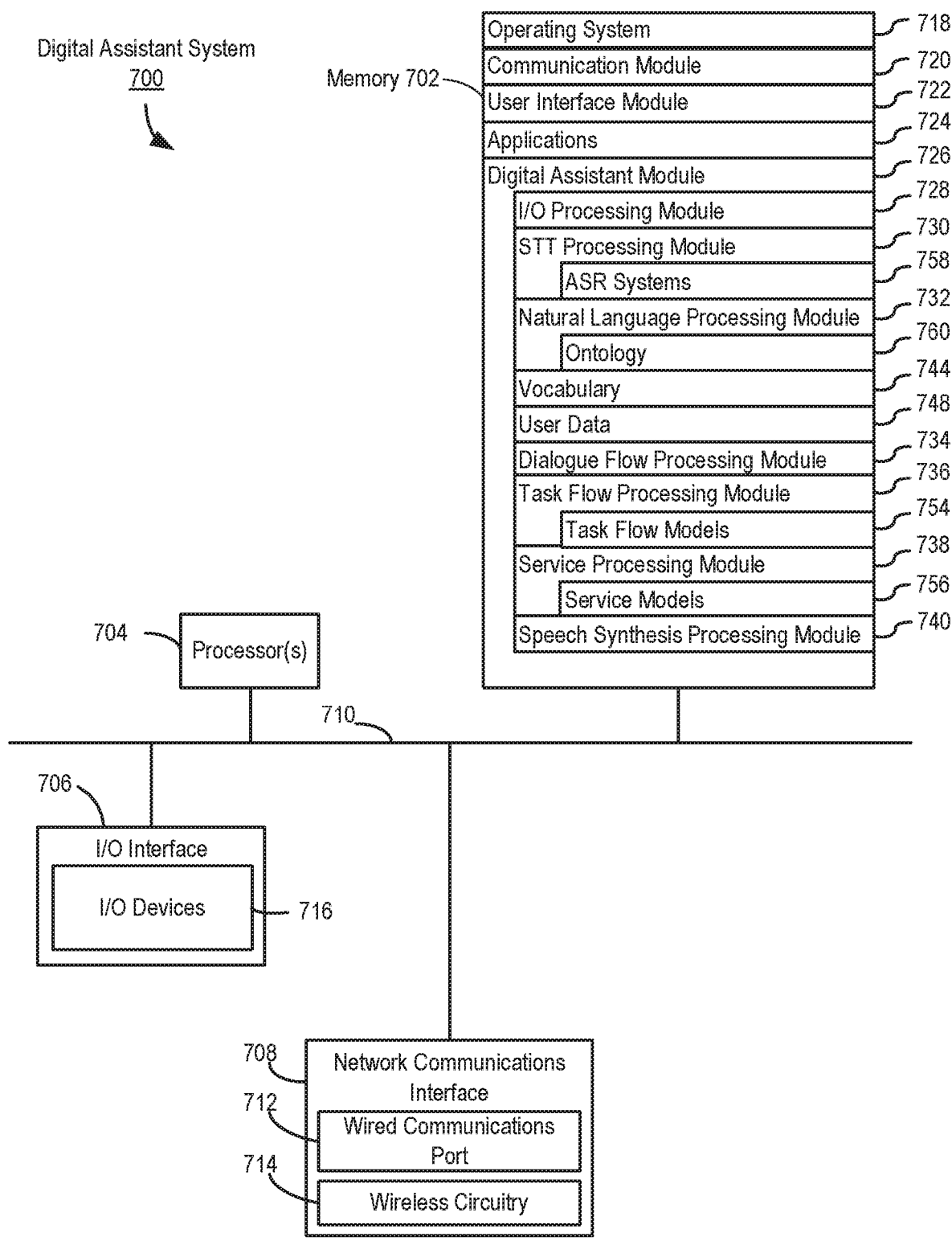
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
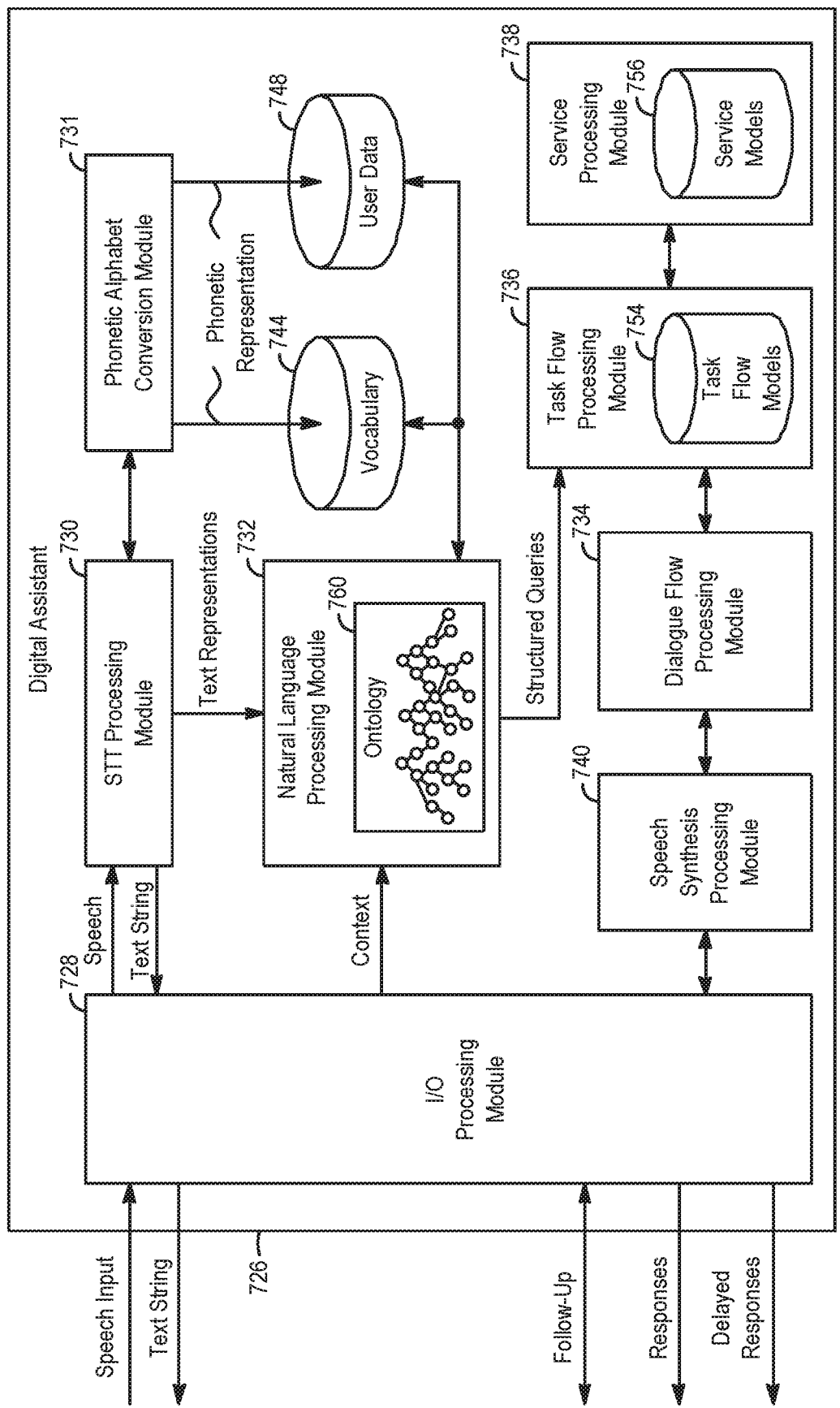
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪroʊ/ and /tə'matoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪroʊ/ is ranked higher than /tə'matoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪroʊ/ is associated with the United States, whereas the candidate pronunciation / tə'matoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) is ranked higher than the candidate pronunciation / tə'matoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes / tə'meɪroʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪroʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
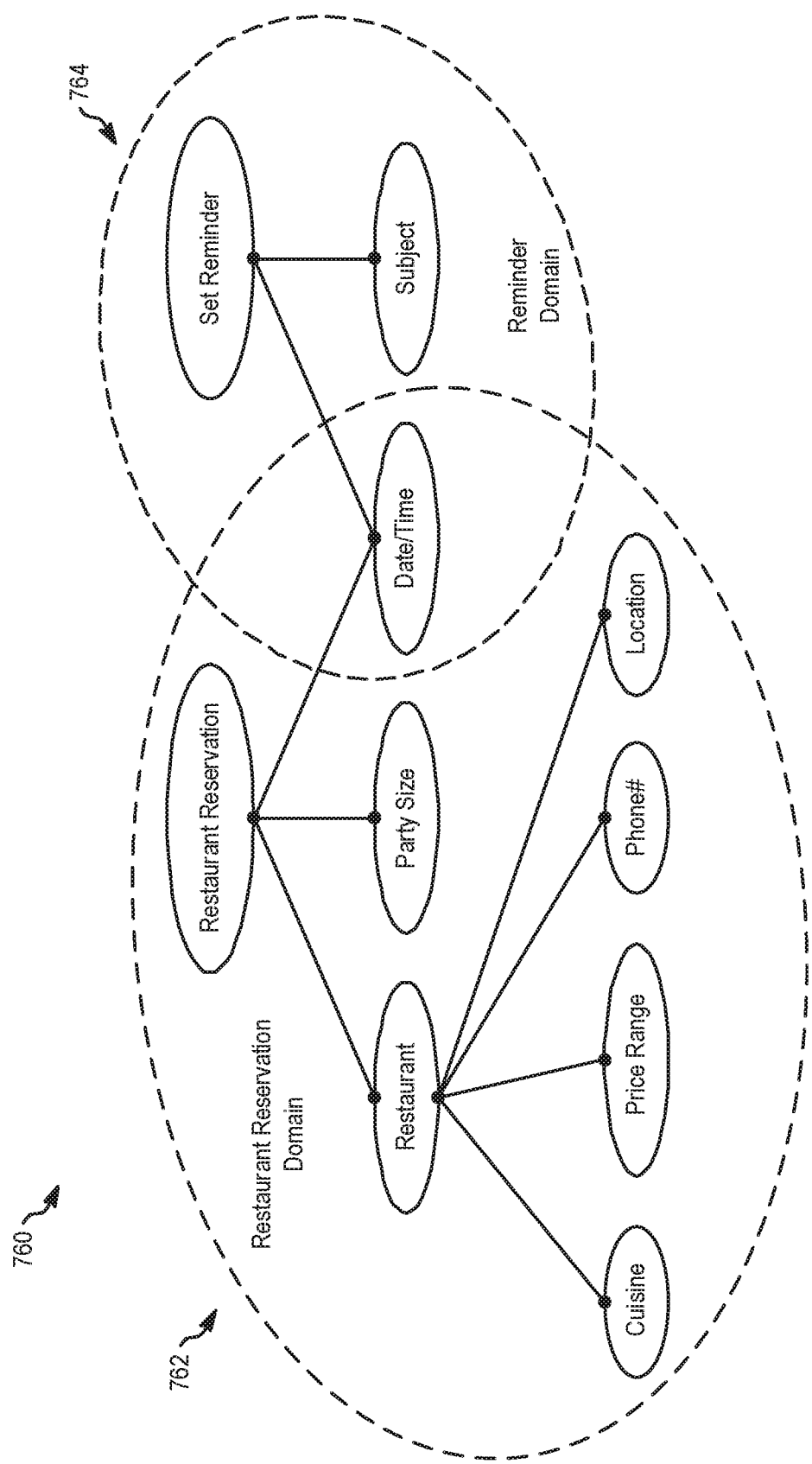
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent from Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

Content Playback on Multiple Devices

Figure 8A:
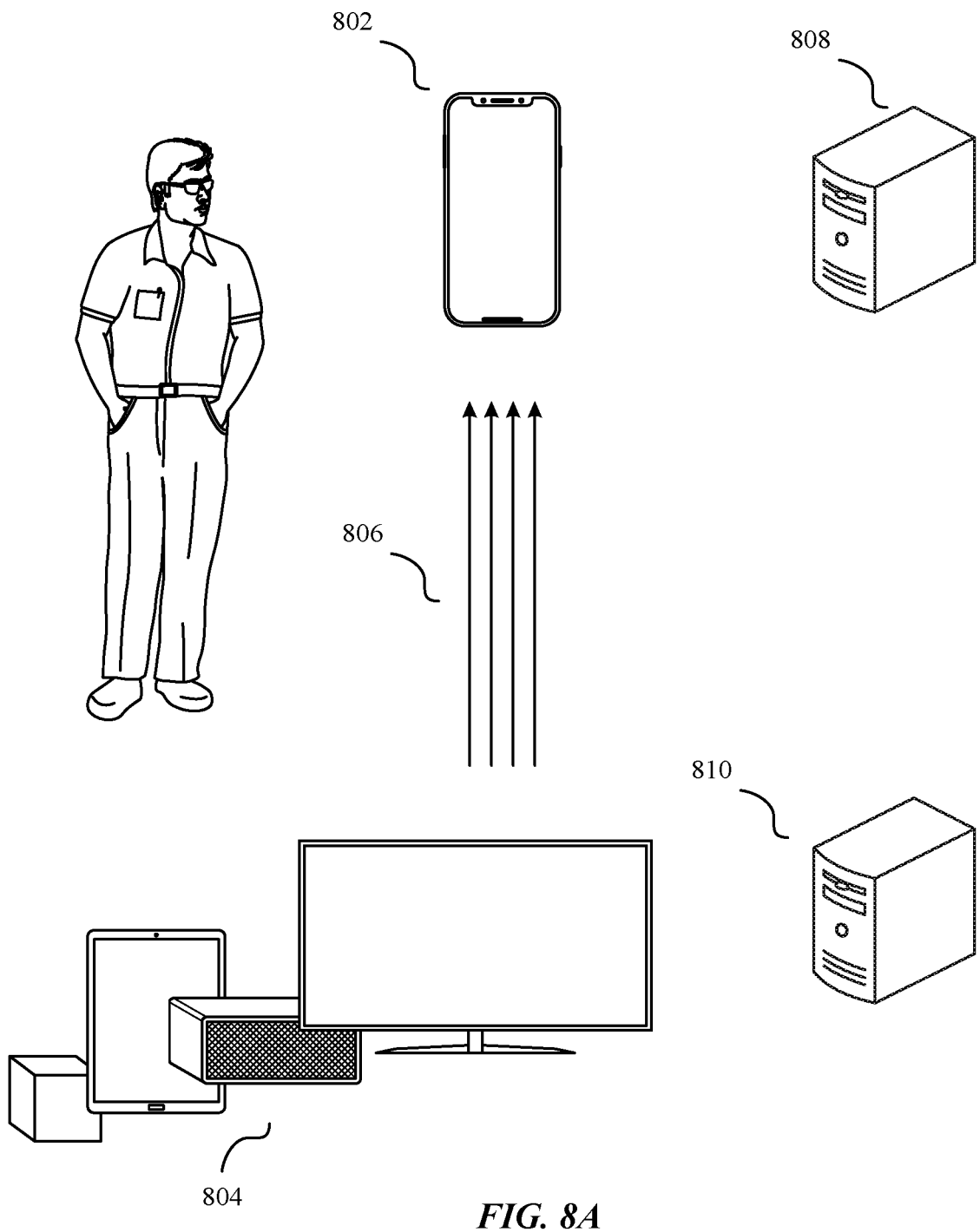
FIG. 8A-8G illustrate a system for content playback on multiple devices, according to various examples.

FIGS. 8A-8G illustrate a system 800 for facilitating content playback on multiple devices. For example, as shown in FIG. 8A, system 800 may include any device described herein, including but not limited to devices 104, 200, 400, and 600 (FIGS. 1, 2A, 4, and 6A-B). Thus, it will be appreciated that the electronic devices depicted in FIGS. 8A-8G, such as devices 802, 804, 808, and 810, may be a device of any type, such as a phone, laptop computer, desktop computer, tablet, wearable device (e.g., smart watch), set-top box, television, voice-enabled speaker, home automation device (e.g., thermostat), digital assistant server, media server, or any combination or sub-combination thereof. Furthermore, the processes described herein may be performed by a server with information delivered to and from the device, performed on the device, or a combination thereof.

FIG. 8A illustrates a system 800 for facilitating content playback on multiple devices. In some examples, system 800 includes a user device 802, such as a mobile phone. User device 802 may, for example, be associated with a user. In some examples, system 800 includes one or more secondary user devices 804, such as a television, set-top-box, voice-enabled speaker, tablet computer, laptop computer, and the like. At least the user device 802 and the one or more secondary user devices 804 may be capable of communicating with one or more servers, such as a digital assistant server 808 and a media server 810.

In operation, user device 802 may receive, from one or more secondary user devices 804, information 806 associated with media playback. The information 806 associated with media playback may include, for example, at least one identifier associated with a secondary user device 804, such as a device serial number, a network identifier, and the like. The information 806 associated with media playback may further include, for example, media information corresponding to a secondary user device 804, such as applications installed on a device, one or more owners of a device, one or more authorized users of a device, media content downloaded or stored at a device, media content owned by an owner of a device (e.g., content the user may own which is not stored on a device). In some examples, the information including media content owned by an owner includes media content previously purchased by a user of a device (e.g., purchased using an application on the device). In some examples, the information may include a viewing history of media content on a device. For example, viewing history may include identification of a plurality of viewed media items, a time and date for which the user viewed the media items, a number of times the user viewed the media items. In some examples, the information may include media rendering capabilities of a candidate secondary user device. For example, the secondary user devices 804 may include a voice-enabled speaker, such that the media rendering capabilities for the voice-enabled speaker include information regarding audio rendering capabilities, and further include an indication that the speaker is not capable of rendering video. As another example, the secondary user device 804 may include a set-top box or a television, such that the media rendering capabilities indicate video resolution capabilities (e.g., 1280×720 pixels, 3840×2160 pixels, etc.) or aspect ratio capabilities (e.g., 16:9, 4:3, etc.).

In some examples, the information may include a name of a device, such as "Living Room TV," "Bedroom TV," "Basement Speaker," and the like. In some examples, the information may include a location parameter, such as "ground floor," "main floor," "upstairs," "outside the home," or other precise location information (e.g., GPS coordinates or other spatial information). In some examples, the information may include information from a user profile including devices associated with the user's home. For example, a plurality of media devices may be included in a profile which facilitates communication among the devices within the user's home, such as a television, set-top-box, speaker, home automation equipment, and other devices. The profile may include data used as the information for media playback, such as device names, device locations, device capabilities, user permissions, device owners, authorized users, usage history, and the like.

In some examples, the information 806 associated with media playback may be received periodically by user device 802. For example, secondary user device 804 may periodically send the information to user device 802, such as daily, weekly, monthly, etc. In some examples, the information may be sent during periods when devices 802 and/or 804 are idle, such as overnight. In some examples, the information may be sent during period when a user is in proximity of the device or connected to the same network as the device. For example, a user may interact periodically with a television at a work location of the user, such as an office. In some examples, information associated with an office television may be sent to the user device when the user device is in proximity of the office television, such as within a communication range of the office television. In some examples, information associated with the office television may be sent to the user device when the user device is connected to the same network as the office television, such as a Wi-Fi network.

Figure 8B:
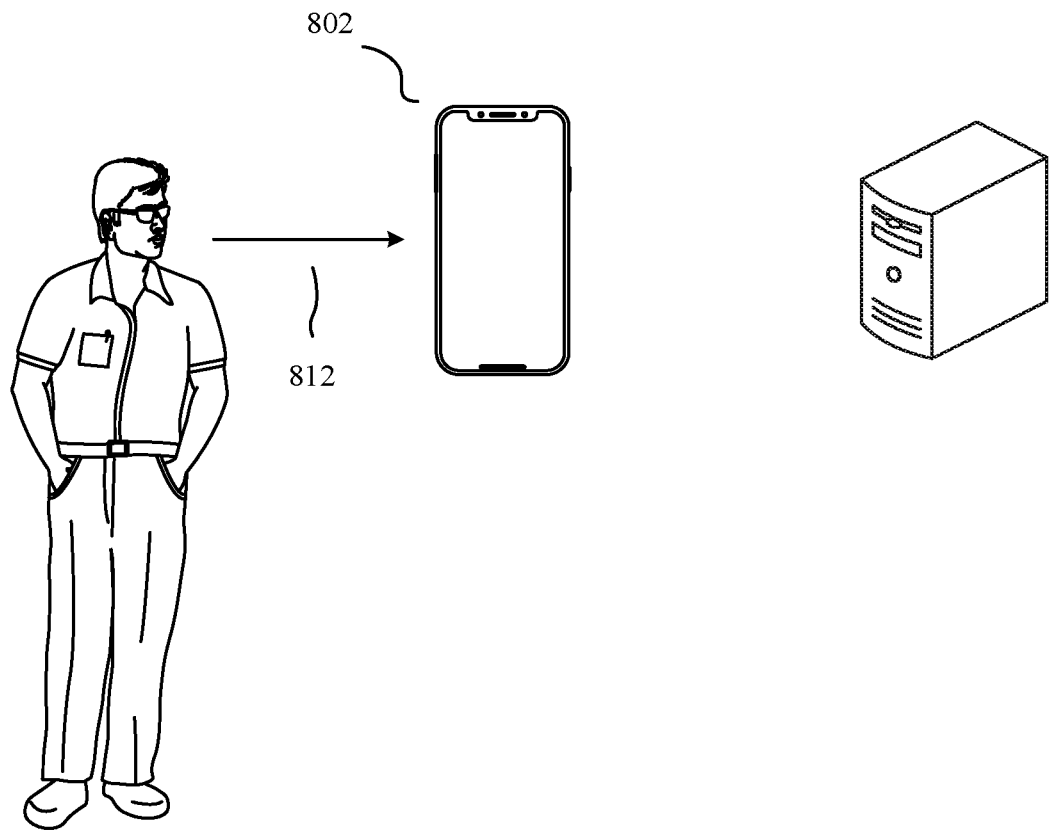
Figure 8B:
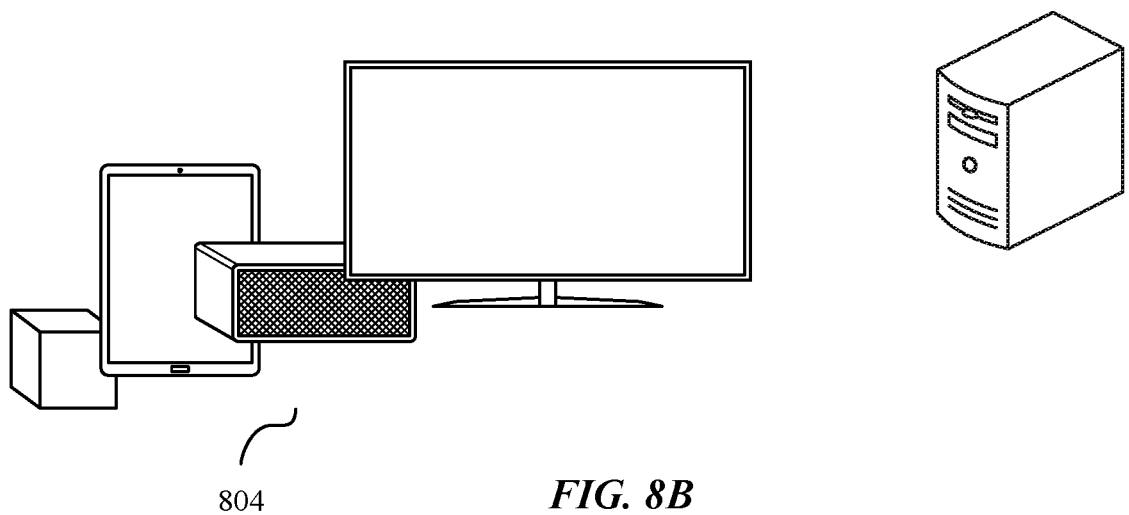

In some examples, referring to FIG. 8B, user device 802 may receive a speech input 812 from a user. For example, a user may utter natural language speech associated with playing media content on a secondary device, such as "Play Star Wars on the TV," or "Play this on the speaker," or "Play this on that." User input 812 may, for example, include a reference to a user device from user devices 804, such as user devices within the user's home. In some examples, user input 812 may include a reference to a user device not within the user's home, and/or a device that the user has not yet interacted with. For example, if the user visits an office building having a conference room TV, the user may refer to the TV as "that TV," "the conference room TV," "this TV," and the like.

Figure 8C:
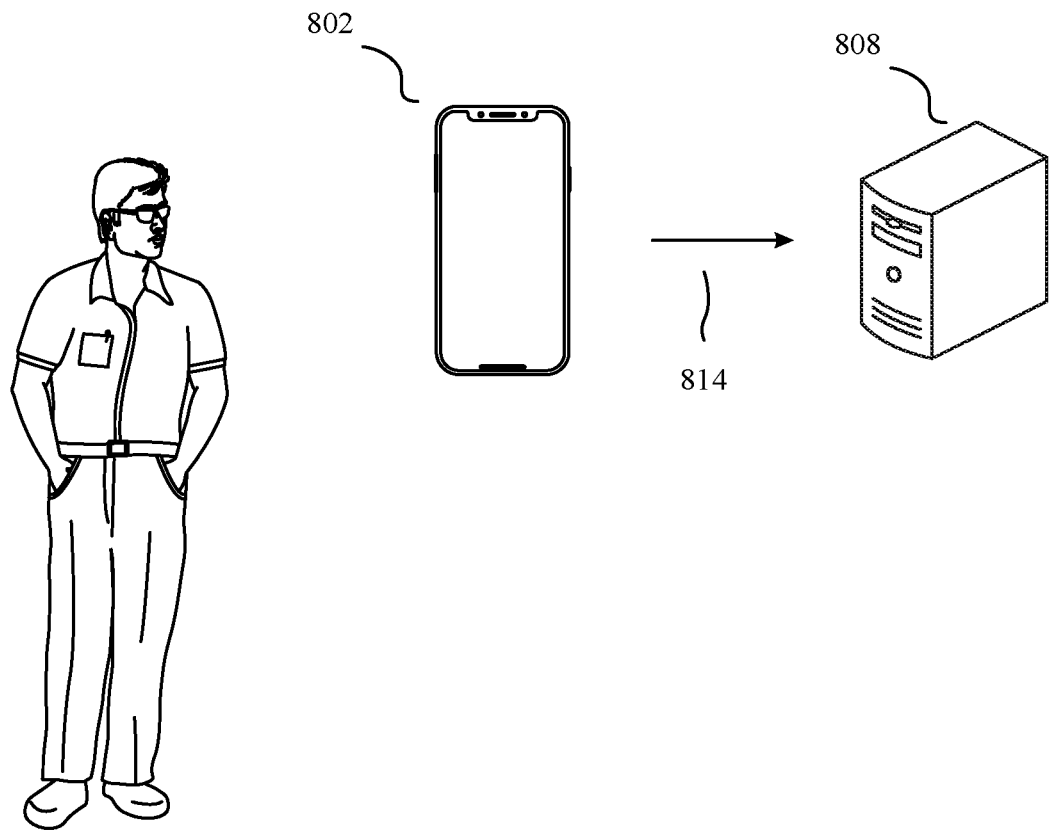
Figure 8C:
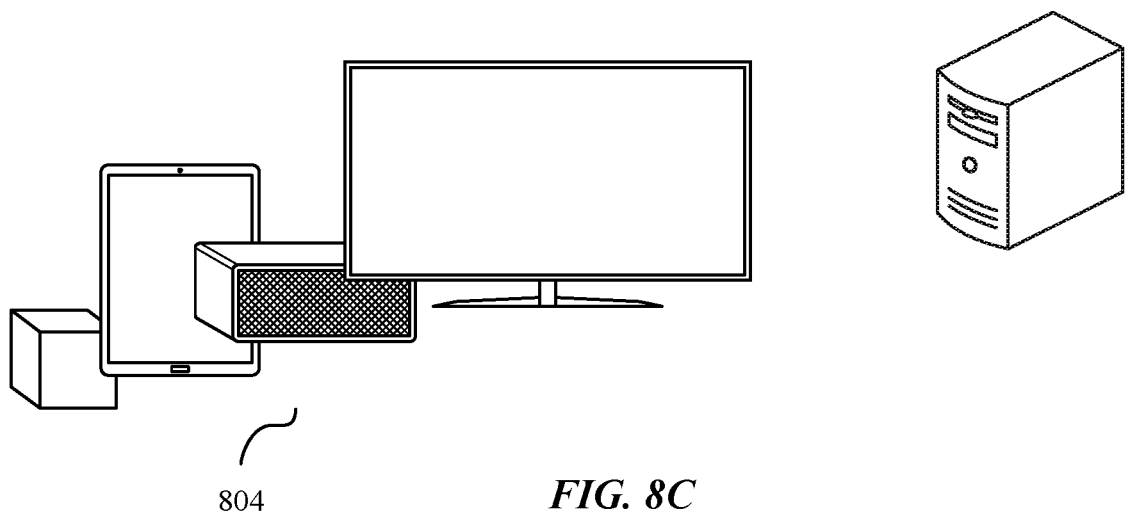
Figure 8D:
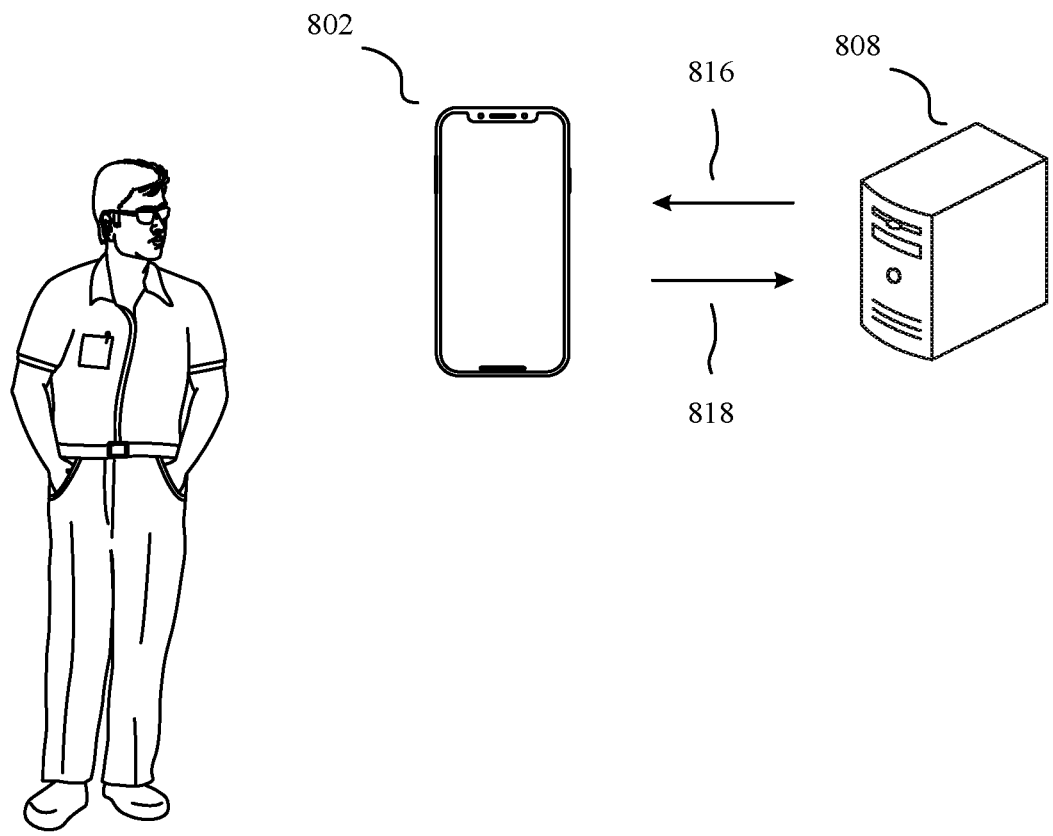
Figure 8D:
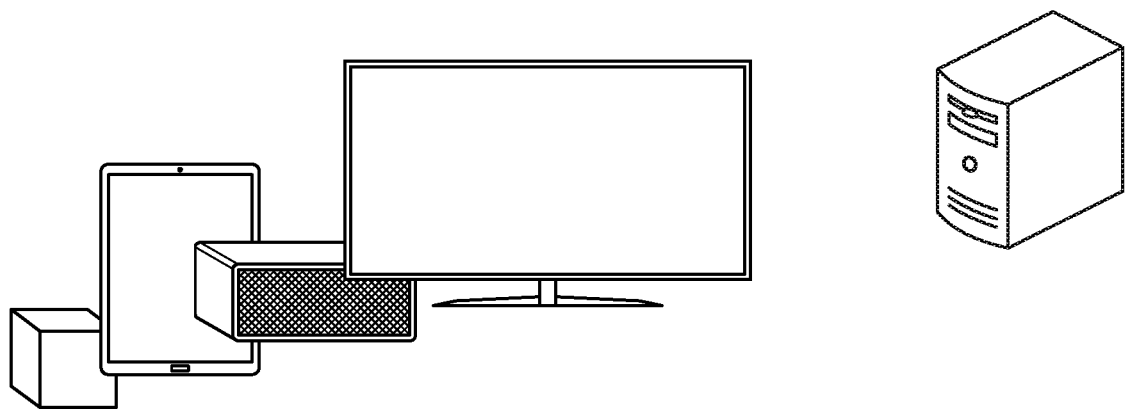

In some examples, referring to FIG. 8C, at least the speech request and the information associated with media playback is transmitted to a second electronic device. User device 802 may, for example, send transmission 814 to digital assistant server 808. In some examples, transmission 814 may include at least the speech request and the information associated with media playback. For example, the user may utter "Play Star Wars on the TV." User devices 804 may be associated with devices in the user's home, and may additionally include other devices that the user has interacted with, such as an office television, and a voice-enabled speaker owned by another user, for example. In turn, the transmission 814 may include the speech request "Play Star Wars on the TV," and may further include the information associated with media playback received from the user devices 804, including the devices in the user's home, the office television, and the speaker owned by another user, for example.

In some examples, a determination is made whether the speech request corresponds to a user intent to play media content on a secondary user device. For example, after receiving the speech request and the information associated with media playback, the digital assistant server 808 may determine whether the speech request corresponds to a user intent to play media content on a secondary user device. Determining user intent of the speech request may include, for example, performing natural language processing on the speech request, as described herein. For example, one or more processing modules may utilize data and models to process natural language input received by the digital assistant server 808 to determine the user's intent. In some examples, determining whether the speech request corresponds to a user intent to play media content on a secondary user device may include determining that the speech request include at least one reference to a playing media item, at least one reference to a media item, and/or at least one reference to a secondary user device.

In some examples, at least one reference to playing a media item may include terms such as "play," "broadcast," "start," "replay," and the like. In some examples, at least one reference to a media item may include a specific reference to media, such as a movie title, a TV show series, a live broadcast title, a sports game, a song, an album, an artist, and the like. In some examples, at least one reference to a media item may only include a general reference, such as "this" or "that." For example, if the user is currently viewing media on a first device (e.g., a mobile phone), the user may refer to the media playing on the first device as "this" or "that." In some examples, at least one reference to a secondary user device may include a specific reference to a device, such as television, set-top box, speaker, tablet computer, laptop computer, mobile phone, and the like. For example, the speech request may include references such as "Living Room TV," "Basement Speaker," "the conference room TV," and the like. In some examples, at least one reference to a secondary user device may include a general reference to a secondary user device, such as "that TV," "this speaker," "that tablet," and the like. In some examples, at least one reference to a secondary user device may only include a general reference, such as "this" or "that." For example, if the user is currently located in a living room of the user's home, the user may utter "that" in order to refer to a device named "Living Room TV." In some examples, a requested media item is determined based on the speech request. For example, digital assistant server 808 may determine a requested media item based on the speech request included in transmission 814. As an example, the speech request may include "Play Star Wars Episode One on that," such that the requested media item is determined to be associated with the movie series "Star Wars," and is determined to correspond to the movie title "Episode One" of the "Star Wars" series.

In some examples, in accordance with a determination that the speech request corresponds to a user intent to play media content on a secondary user device, digital assistant server 808 may determine an identifier associated with the secondary user device. For example, digital assistant server 808 may determine a device identifier corresponding to a device referenced by the user in the speech request. The speech request may include, for example, a reference to "Living Room TV," and the information associated with media playback may include a plurality of device identifiers. The plurality of device identifiers may be associated with a profile for devices in the user's home, including, for example "Living Room TV," "Basement TV," "Bedroom Speaker," and the like. Digital assistant server may determine that the reference "Living Room TV" included in the speech input corresponds to the device named "Living Room TV" included in the information associated with media playback, for example. In some examples, the determined identifier corresponding to "Living Room TV" may correspond to a device serial number, network identifier, and the like.

In some examples, one or more candidate user devices are determined based on the speech request and the information associated with media playback. For example, the user may utter "Play Star Wars Episode One on that." The reference to "that" may be ambiguous, for example, such that a plurality of candidate secondary devices are determined as possibly corresponding to "that." For example, the user may be located the user's home, and the user's home may have multiple media devices, such as multiple televisions and multiple speakers. Based on the media devices located in the user's home, a plurality of candidate secondary user devices are determined as possibly corresponding to "that," such as "Living Room TV," "Basement TV," "Bedroom Speaker," and "Bathroom Speaker," for example.

In some examples, an identifier associated with the secondary user device is determined based on at least the determined media item requested by the user and a plurality of candidate secondary user devices determined as possibly corresponding to a user referenced device. For example, a user may have two media devices in the user's home, including a television and a speaker. Upon determination that the user intends to view "Star Wars Episode One," and that the candidate secondary user devices include a television and a speaker, for example, determination is made with sufficient confidence that the secondary user device to which the user intends to view content is the television, rather than the speaker. As an example, in the case where the user intends to view video content, candidate secondary user devices including speakers may be eliminated from further consideration as potential devices to at which content should be played. As another example, in the case where the user intends to listen to only audio content (e.g., a song), candidate secondary user devices including televisions may be eliminated from further consideration as potential devices to which content should be played at. In response to eliminating such devices from consideration, and in the case where only one device remains as a candidate user device, for example, such device may be selected as the device to play the requested media item.

In some examples, determining an identifier associated with a secondary user device includes determining a confidence level for each candidate user device of a plurality of candidate user devices. For example, the determined confidence level may indicate a suitability for playing a requested media item at a respective candidate secondary user device. In some examples, the confidence level for each candidate secondary user device is determined at least in part based on the information associated with media playback. For example, the requested media item may include video content, and the candidate secondary user devices may include multiple televisions, such as a living room television and a bedroom television. The information associated with media playback may include, for example, usage history information indicating that the user always requests playback at bedroom television for video content, and has never requested playback at the living room television. As a result, the bedroom television may be associated with a higher confidence level than the living room television for playing the video content, for example.

As another example, the information associated with media playback may include information corresponding to media content owned by an owner of a respective device or media content stored on a respective device. The requested media item may include, for example, reference to a specific media item, such as "Star Wars Episode One," for example. As a result, devices having access to the specific media item, such as based on user ownership of the media item or the media item being stored on the device, for example, may be associated with higher confidence levels than devices that do not have access to the media item. For example, the user may have purchased and downloaded the movie "Star Wars Episode One" using a television located in the living room, such that the movie is stored on the user's living room television or a set-top box associated with the living room television. Furthermore, the user's bedroom television may not include the movie in storage and may not otherwise have access to the movie, for example. As a result, the living room television may be associated with a higher confidence level than the bedroom television.

In some examples, a determination is made whether at least one of the confidence levels exceeds a predetermined threshold, wherein a candidate secondary device having a highest confidence level of the plurality of candidate secondary devices may be selected. In accordance with a determination that at least one of the determined the confidence levels exceeds the predetermined threshold, an identifier associated with the candidate secondary user device having the highest confidence level is selected for media playback. For example, a plurality of candidate user devices may be associated with a plurality of confidence levels, such as a first television associated with a 90% confidence level, a second television associated with a 85% confidence level, and a tablet computer associated with a 50% confidence level. In some examples, the predetermined threshold may correspond to an 80% confidence threshold, such that the first television associated with a 90% confidence level and a second television associated with a 85% confidence level are considered, and an identifier associated with the first television is used for media playback based on the highest confidence level. The predetermined threshold may further be dynamically adjusted based on one or more conditions, or may be set by a user, for example.

Figure 9:
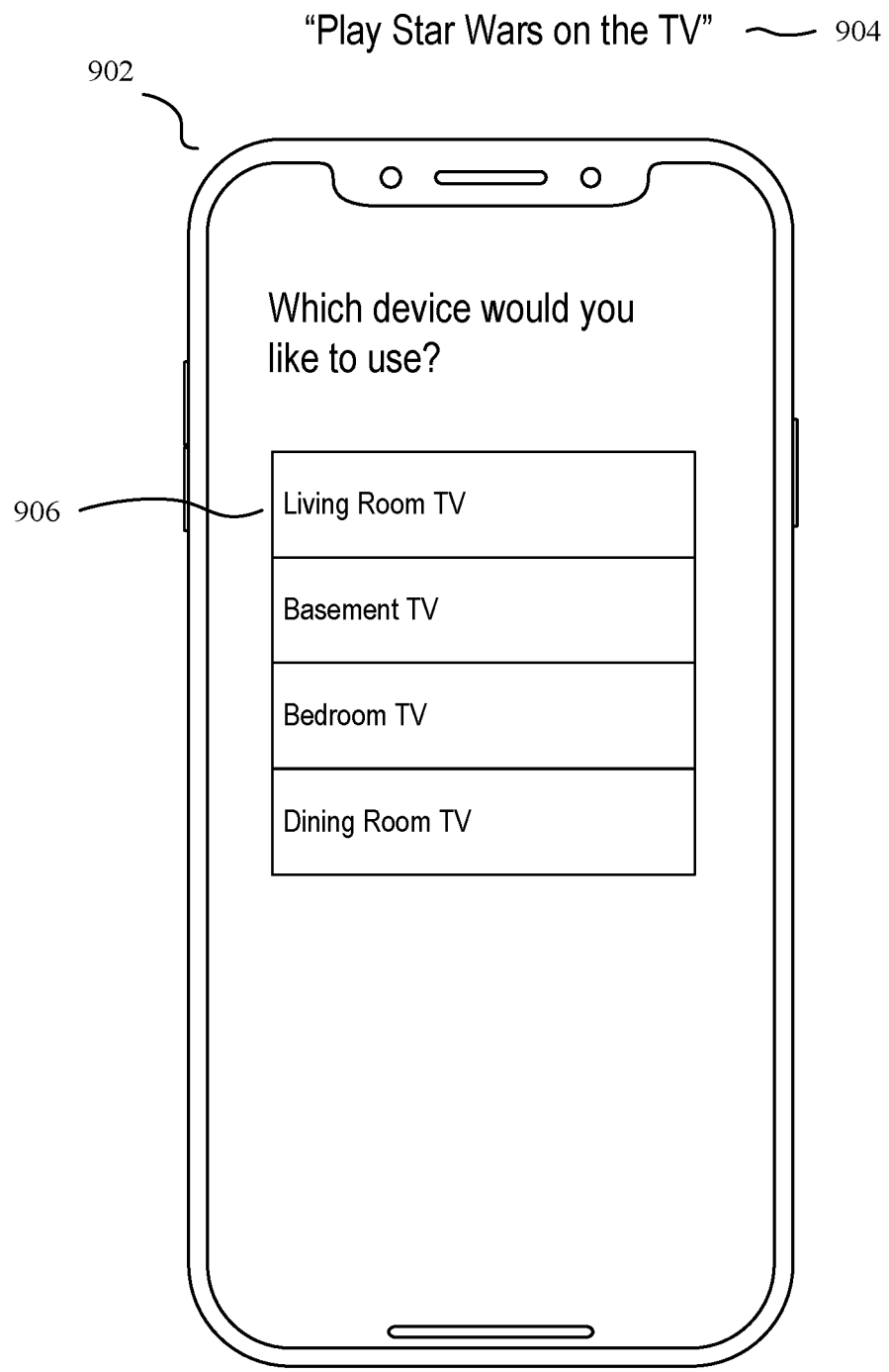
FIG. 9 illustrates a process for displaying user interfaces for content playback on multiple devices, according to various examples.

In some examples, referring now to FIG. 9, a process 900 for displaying a user interface for content playback on multiple devices is depicted. In some examples, user device 902 includes a display of a plurality of affordances corresponding to a plurality of candidate secondary user devices. In some examples, in accordance with a determination that at least one of the determined the confidence levels does not exceed a predetermined threshold, identifiers are transmitted to the user device, wherein the identifiers are associated with a plurality of candidate secondary user devices. For example, based on a speech request 904, a plurality of affordances 906 may be displayed on user device 902. As an example, a speech request 904 may include the speech "Play Star Wars on the TV." As a result, a plurality of candidate user devices may be determined, which may each be associated with a plurality of confidence levels, such as a first television associated with a 60% confidence level, a second television associated with a 50% confidence level, a third television associated with a 40% confidence level, and a fourth television associated with a 30% confidence level. In some examples, the predetermined threshold may correspond to an 80% confidence threshold, such that none of the first, second, third, or fourth televisions exceeds the 80% confidence threshold. As a result, with reference now to FIG. 8D, user device 802 may receive information 816 from digital assistant server 808, where information 816 includes identifiers corresponding to the first, second, third, and fourth televisions.

In some examples, referring back to FIG. 9, the user may activate one of the affordances 906. For example, the user may activate affordance 906 corresponding to "Basement TV" resulting in a selection of an identifier corresponding to a television located in the basement of the user's home. Referring back to FIG. 8D, in some examples, the selected identifier is sent from user device 802 to digital assistant server 808 via transmission 818. As a result, the identifier associated with the secondary user device is determined based on the selected identifier, such as an identifier associated with a television located in the basement of the user's home, for example.

In some examples, in accordance with determining the identifier associated with the secondary user device, an instruction for initiating a standby state is transmitted to the secondary user device. For example, digital assistant server 808 may determine a device having a highest confidence level, or the user device may provide a selection of an intended device to the digital assistant server 808. As a result, an instruction for initiating a standby state is sent to the secondary user device in order to prepare the secondary user device for receiving further instructions regarding media playback. For example, the instruction for initiating a standby state may cause the device to power on, may cause the device to exit an idle state and enter a playback state, and/or may otherwise cause the device to prepare for media playback. In some examples, in accordance with determining an identifier associated with the secondary user device, the information associated with media playback is at least removed from digital assistant server 808. For example, the information associated with media playback may be used in order to determine the user device to which the user intends to playback media content, and once the device is determined, the information is removed from digital assistant server 808, such as erasing the information from memory.

Figure 10:
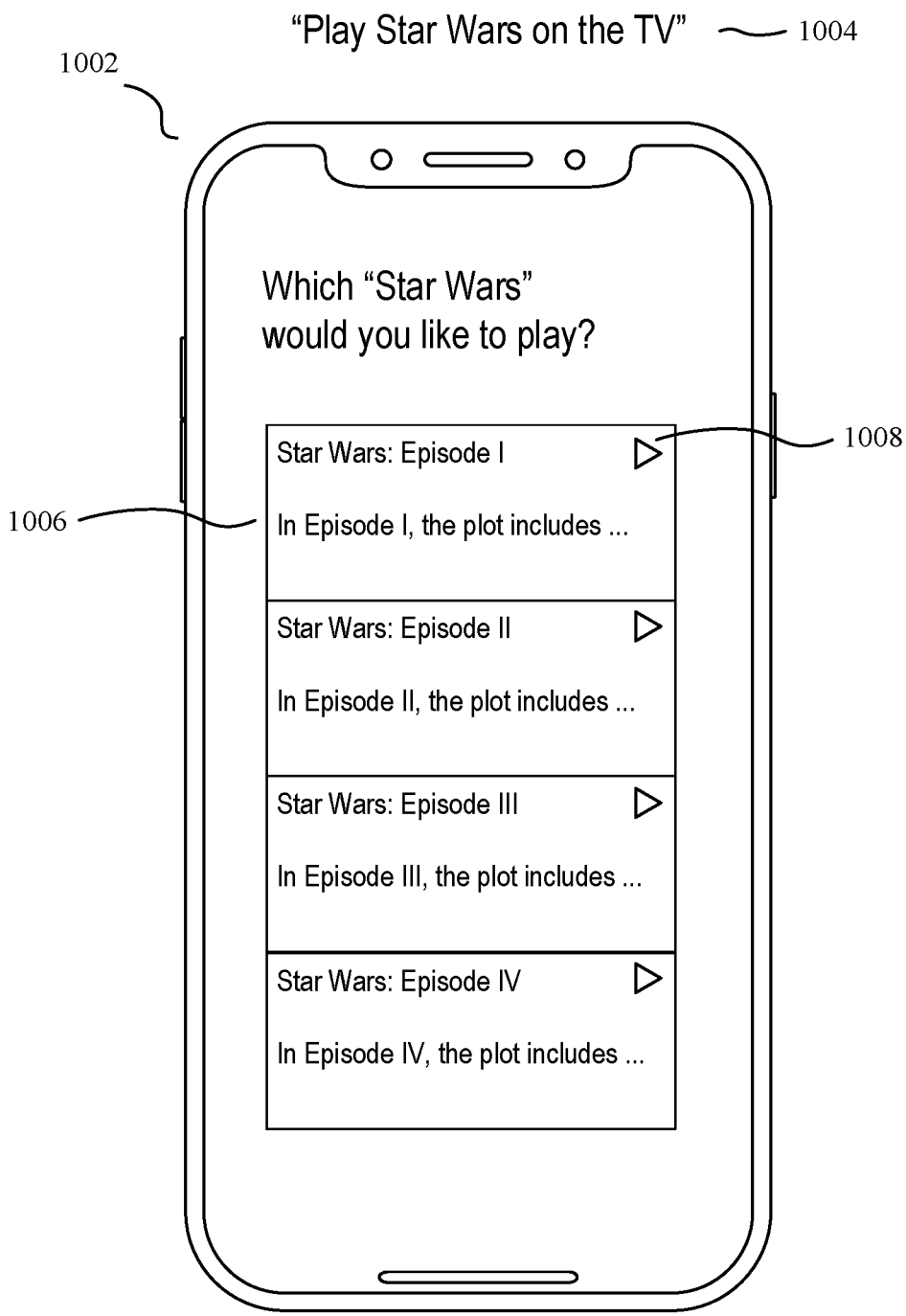
FIG. 10 illustrates a process for displaying user interfaces for content playback on multiple devices, according to various examples.

In some examples, referring now to FIG. 10, a process 1000 for displaying user interfaces for content playback on multiple devices is depicted. For example, based on a speech request 1004, a determination is made that the speech request corresponds to a plurality of candidate media items. As a result, plurality of affordances 1006 may be displayed on user device 1002 corresponding to the plurality of media items. As an example, a speech request 1004 may include the speech "Play Star Wars on the TV." As a result, a plurality of candidate media items may be determined, and each candidate media item may be associated with a plurality of confidence levels. For example, in response to determining that the speech request includes reference to media corresponding to "Star Wars," a determination is made that multiple media items correspond to the title "Star Wars," such as various movie titles in the "Star Wars" series. As a result, the plurality of media items corresponding to the various movie titles in the "Star Wars" series are each associated with a confidence level that does not exceed a predetermined confidence level for media playback. The plurality of displayed affordances 1006 may then correspond to the plurality of media items based on the speech request, for example.

In some examples, a selection of an affordance of the plurality of affordances is received from the user. For example, the user may activate an affordance via a touch input on the display screen of user device 1002. As another example, the user may provide a speech input to refer to and select the affordance. For example, the user may utter the phrase "Star Wars, Episode II," corresponding to one of the displayed affordances 1006. The user may utter an ambiguous phrase such as "the second one" or "the last one," for example. Using the displayed affordances as context, determination may be made that "the second one" refers to a second item in a list of displayed items, such as "Star Wars, Episode II" corresponding to one of the displayed affordances 1006. Based on the user selection of a displayed affordance, a media identifier corresponding to the user selection of a displayed affordance is transmitted, for example, to the digital assistant server 808.

In some examples, each of the plurality of displayed affordances 1006 is associated with a brief description, including, for example, information corresponding to the respective media item, such as a brief plot summary, rating information, actor information, album information, artist information, and the like. In some examples, each of the plurality of displayed affordances 1006 is associated with a respective indicator 1008. In accordance with a user selection of a respective indicator 1008, a user interface may be displayed corresponding to a respective media item. For example, the user interface may include additional information corresponding to a respective media item, such as a full description of the media item, and additional affordances to view further content associated with the media item, such as media previews (e.g., movie trailers or song clips), actor interviews, director's cuts, related media content, and the like. In some examples, the user interface may be displayed on a secondary user device. For example, the user may select an indicator 1008 displayed on user device 1002, such that the user interface including additional information is displayed on a previously identified secondary user device to which the user intends to play the requested media item (e.g., a living room TV). The user may further interact with the user interface displayed on the secondary user device by manipulating one or more controls (not depicted) displayed on user device 1002.

Figure 8E:
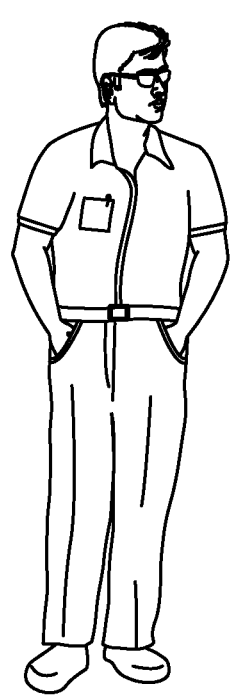
Figure 8E:
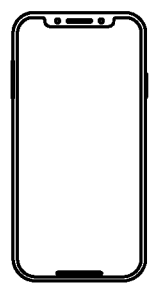
Figure 8E:
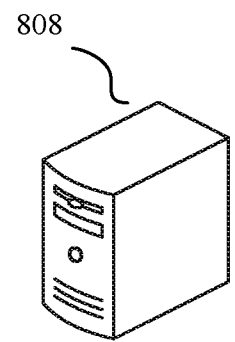
Figure 8E:
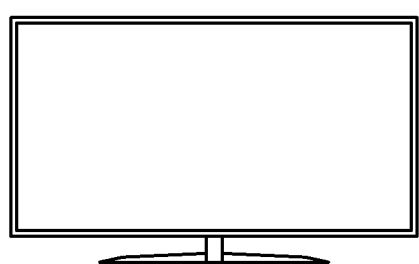
Figure 8E:
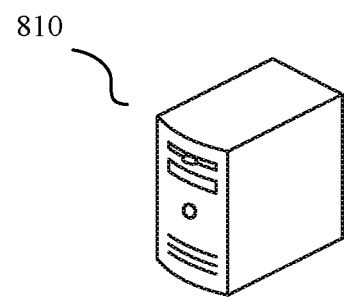

In some examples, referring now to FIG. 8E, a first media request and a second media request may be transmitted. For example, the first and second media requests may be transmitted upon determining the identifier associated with a secondary user device, such as television 804a. In some examples, a first media request 820 may include a sender identifier corresponding to the user device, such as user device 802. In some examples, the second media request 822 may include a sender identifier corresponding to the identifier associated with the secondary user device, such as television 804a. In some examples, the first media request 820 and the second media request 822 may be transmitted from the digital assistant server 808 to the media server 810. In some examples, the first media request 820 and the second media request 822 may be transmitted simultaneously, and each request may include the same requested media item based on the speech request. As a result, the first and second media requests may include parallel requests to media server 810, such that the requests emulate requests originating from the user device 802 and the secondary user device 804a, for example.

Figure 8F:
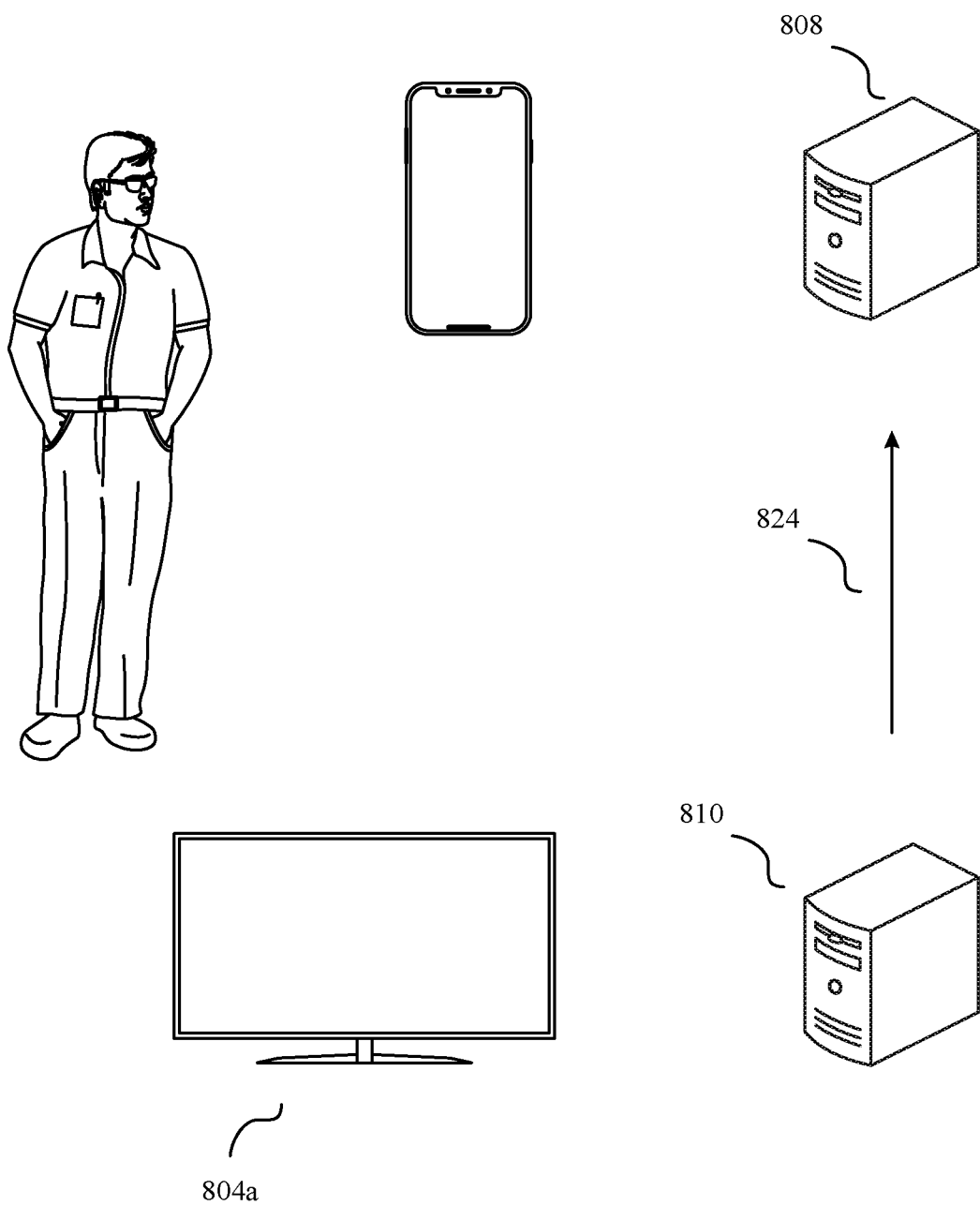

In some examples, referring now to FIG. 8F, results based on at least the first media request and the second media request are received. For example, results 824 may be received by digital assistant server 808 from media server 810. In some examples, the results include one or more parameters which indicate suitability for playing the requested media item at a secondary user device, such as secondary user device 804a. For example, the results may include a parameter indicating whether the requested media item is suitable to be played on either the user device and/or the secondary user device. For example, if the user device corresponds to a mobile phone, the parameter may indicate that video content is capable of being played on the mobile phone. The parameters may indicate further details regarding video playback capabilities, for example, whether the video content would be reduced in quality when being played back on either the mobile phone or a secondary user device (e.g., a television or a tablet computer). As another example, if the user device corresponds to a voice-enabled speaker, the parameter may indicate that video content is not capable of being played on the voice-enabled speaker, but audio is capable of being played back on the speaker. The parameters may indicate further details regarding audio playback capabilities, for example, whether the audio quality would be reduced when being played back on the voice-enabled speaker.

In some examples, the results may include a parameter indicating whether the requested media item is owned on either the user device and/or the secondary user device. For example, a user may own a media item based on a previous purchase of the media item or a transfer of the media item from another device, for example. As another example, the media item may be created by the user, such that the user owns the media item (e.g., a video created on the user's mobile phone). Ownership of a media item may include storage of the media item on a user device, for example. As another example, where the user has previously purchased a media item, ownership of a media item may include the capability of the media item to be accessed by the user device from another source, such as a media server, without requiring the user to purchase the media item.

In some example, the results may include a parameter indicating whether the requested media item is currently playing on the user device. A requested media item currently being played on the user device may include, for example, video content or audio content corresponding to the requested media item and currently being played back on a mobile device. In some examples, the user may be currently listening to a song from an album stored on the mobile device. In some examples, the user may be currently watching a movie using a third party application on a mobile device. For example, the user may provide a speech request at a mobile phone to play media content, such as "Play this on the TV." The ambiguous term "this" may have been resolved by the digital assistant server to the movie "Star Wars Episode One," based on context information on the mobile device, for example. The results 824 returned from the media server 810 may indicate that the user is currently watching the requested media item on the mobile phone, such as the movie "Star Wars Episode One."

In some examples, the user may provide a speech request at a mobile phone to play media content, such as "Play this on the speaker." The ambiguous term "this" may have been resolved by the digital assistant server to a song by the artist "Dave Matthews Band," based on context information on the mobile device, for example. The results 824 returned from the media server 810 may indicate that the user is not currently playing any media content on the mobile device, such as the requested media item, for example. In some examples, the parameter may indicate that the requested media item is not currently playing on the mobile device, although a reference to the requested media item is being displayed at the mobile device. For example, the results 824 may further indicate that the user is currently viewing a list of songs included in an album, such as an album by the artist "Dave Matthews Band."

In some examples, the results may include a parameter indicating a viewing history of the requested media item. For example, the user may provide a speech request at the user device 802 to play media content, such as "Play this on the TV." The ambiguous term "this" may have been resolved by the digital assistant server 808 to a requested media item corresponding to a specific movie. In some examples, the results may include a parameter indicating that the user typically views the requested media item on the identified secondary user device, such as a living room television. In some examples, the results may include a parameter indicating that the user typically views the requested media item, and similar media items (e.g., video content), by first watching the media item on the user device (e.g., mobile phone), and then transferring the playback of the media item to the identified secondary user device (e.g., the living room television). In some examples, the results may include a parameter indicating that the user always views content directly on the identified secondary user device, and never transfers playback of media items to the identified secondary user device.

In some examples, an instruction for media playback on the secondary user device 804a is determined, which includes comparing the parameters indicating suitability for playing the requested media item at the secondary user device 804a. The parameters included in the results 824 returned from media server 810 may, for example, be associated with different weights or other factors which assist in the determination of the instruction for media playback on the secondary user device 804a. As an example, a parameter indicating whether a requested media item is currently playing on user device 802 may be associated with a higher weight than a parameter indicating whether the requested media item is owned on either the user device 802 or the secondary user device 804a. In some examples, a parameter indicating that a requested media item is not capable of being played by transferring playback from user device 802 to the secondary user device 804a may be associated with a higher weight than a parameter indicating whether a requested media item is currently playing on user device 802.

In some examples, in accordance with a determination that the received results include a parameter indicating that the requested media item is currently playing on the user device, an instruction for media playback may include a command to play the requested media item currently playing on the user device. For example, the command to play the requested media item currently playing on the user device 802 may include a command to stream audio or video content currently playing at user device 802 to secondary user device 804. The command to stream the currently playing content may include, for example, one or more identifiers corresponding to information about the content currently playing at the user device 802. For example, the one or more identifiers may correspond to information such as universal resource locators, timestamp information, media type information, and the like. The command to play the requested media item currently playing on user device 802 may include any other information necessary in order to enable a secondary user device, such as secondary user device 804a, to stream audio or video content currently playing at user device 802.

In some examples, in accordance with a determination that the received results include a parameter indicating that the requested media item is not currently playing on the user device, an instruction for media playback may include a command to obtain the requested media item for playback at the secondary user device. For example, the command to obtain the requested media item for playback at the secondary user device may include a command to obtain the requested media item from a media server, such as media server 810 or another media server. For example, the speech request at user device 802 may include the command "Play Star Wars Episode One on the TV." In accordance with a determination that the user device 802 is not currently playing any audio or video content, the command to obtain the requested media item for playback at the secondary user device may include a command to obtain a media item corresponding to "Star Wars Episode One" from a media server which has access to the media item. As another example, the user may have previously purchased a media item corresponding to "Star Wars Episode One," such that the media item is stored on the user's television or a set-top-box associated with the television. As a result, the command to obtain the requested media item for playback at the secondary user device may include a command to obtain the requested media item from a storage on the user's television or the set-top-box associated with the television.

Figure 8G:
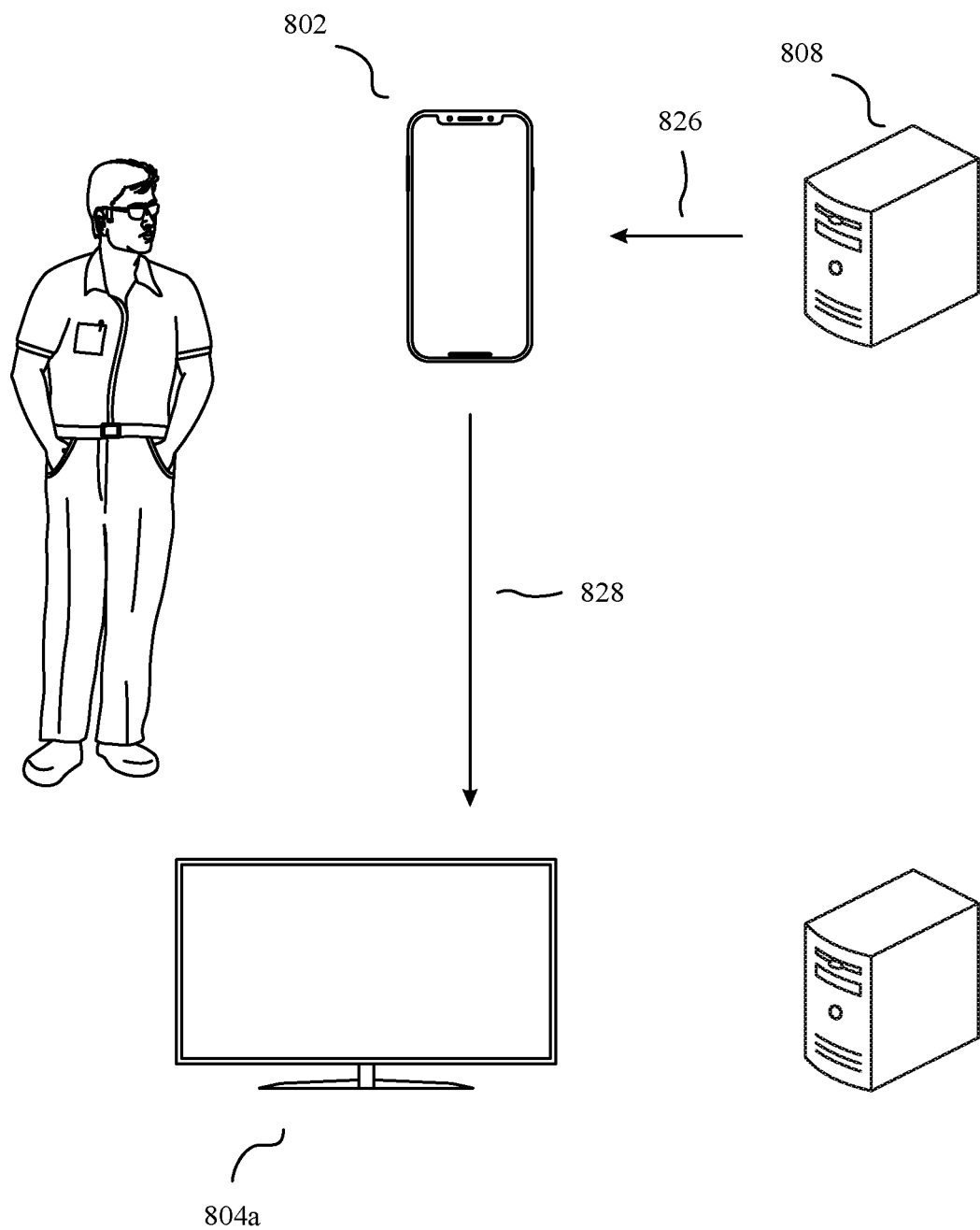

In some examples, referring to FIG. 8G, the instruction for media playback on a secondary user device is received at the user device, and a task is performed based on the instruction. For example, user device 802 may receive instruction 826 for media playback from digital assistant server 808. In some examples, at least one task is performed based on the instruction for media playback. For example, the at least one task may include transmitting command 828 from user device 802 to secondary user device 804a. In some examples, the at least one task may include generating and/or forwarding the command 828. For example, the command 828 may be generated by user device 802 based on the instruction 826 for media playback. In some examples, the command 828 may be included in the instruction for media playback and forwarded to secondary user device 804a.

In some examples, in accordance with a determination that instruction 826 for media playback includes an instruction to output a requested media item currently playing on the user device 802, user device 802 may transmit, to secondary user device 804a, a command 828 to play the requested media item currently playing on the user device 802. In some examples, in accordance with a determination that instruction 826 for media playback includes an instruction to output a requested media item not currently playing on the user device 802, user device 802 may transmit, to secondary user device 804a, a command 828 to play the requested media item at secondary user device 804a. In some examples, the command to obtain the requested media item for playback at the secondary user device may include a command to obtain a media item from a media server which has access to the media item. In some examples, the command to obtain the requested media item for playback at the secondary user device may include a command to obtain the requested media item from a storage on the user's television or the set-top-box associated with the television, for example.

In some examples, performing least one task based on the instruction for media playback includes determining whether the user is authorized to establish a connection with a secondary user device. In some examples, authorization to establish a connection with a secondary user device, such as secondary user device 804a, may be based on user permissions set by an owner of the secondary user device. For example, if an owner of the secondary user device 804a sets a parameter to indicate that the user device 802 corresponds to an authorized user of the secondary user device 804a, then determination is made that the user of user device 802 is authorized to establish a connection with the secondary user device 804*a*. In some examples, authorization to establish a connection with a secondary user device may be required if a user has not yet interacted with a secondary user device, or if the user has interacted with the secondary user device below a threshold number of times. For example, if the user device 802 has not yet interacted with secondary user device 804*a*, or if the user device 802 has interacted with the secondary user device 804 below a threshold number of times, then determination is made that the user device 802 is not authorized to establish a connection to the secondary user device 804*a*.

Figure 11:
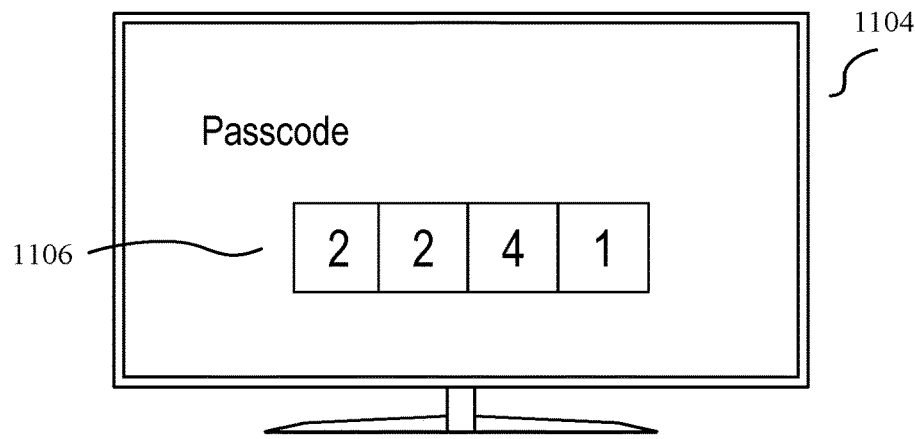
FIG. 11 illustrates a process for displaying user interfaces for content playback on multiple devices, according to various examples.
Figure 11:
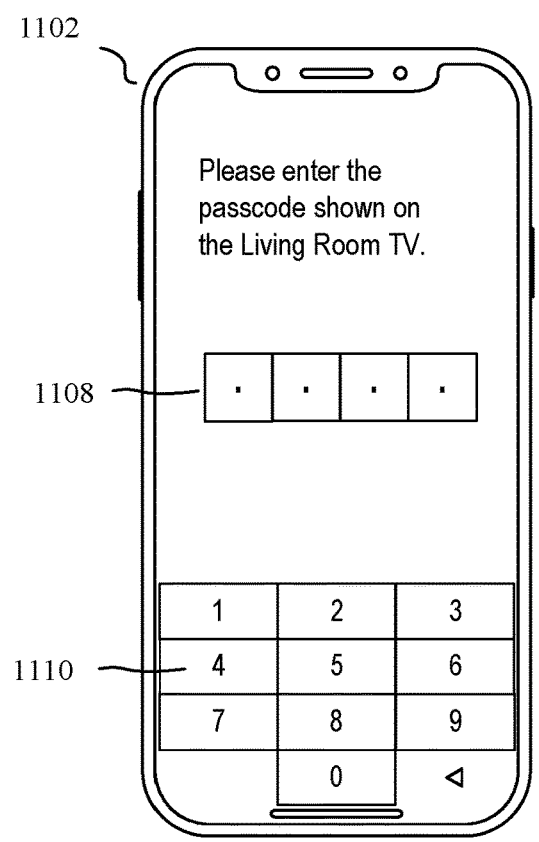

In some examples, referring now to FIG. 11, a process 1100 for displaying user interfaces for content playback on multiple devices is depicted. For example, in accordance with a determination that the user is not authorized to establish a connection to the secondary user device, a first passcode is generated at the secondary user device. The secondary user device 1104 may, for example, display passcode 1106. The passcode may be randomly generated, for example. In some examples, a user interface is generated at user device 1102, including user interface elements 1108 corresponding to a passcode entry area. For example, the user interface may include affordances 1110 representing numerical characters, such that the user may activate the affordances to cause a user-entered passcode to be generated and displayed via user interface elements 1108 corresponding to passcode entry area. For example, an input representing a passcode may be received from the user via affordances 1110. In some examples, in accordance with a determination that displayed passcode 1106 and the user-entered passcode 1108 are the same, determination is made that the user of user device 1102 is authorized to establish a connection to the secondary user device 1104. As a result of determining that the user is authorized to establish a connection to secondary user device 1104, at least one command based on the instruction for media playback is transmitted from user device 1102 to secondary user device 1104, for example.

In some examples, performing at least one task based on the instruction for media playback includes determining whether user authorization is required to view a requested media item associated with the media identifier. For example, a user may have set parental controls, such that authentication is required in order to view specific media items. For example, a requested media item may correspond to media containing one or more indications of subject matter not suitable for children, such as violence. In some examples, in accordance with a determination that user authorization is required to view a requested media item, a prompt for authentication information is displayed on a user device. For example, the prompt may include a request to provide authentication credentials, such as a passcode, a fingerprint identification, a facial recognition identification, a voiceprint identification, and the like. In response to the prompt, authorization information may be received from the user, such that playback of the requested media item commences at the secondary user device as a result of validating the authorization information. For example, in response to successful validation of the authorization information, a command corresponding to the instruction for media playback is transmitted to the secondary electronic device.

In some examples, performing at least one task based on the instruction for media playback includes determining whether a user is required to purchase a requested media item in order to commence playback of the media item. For example, certain media items may be played on various user devices without requiring the user to purchase the media item, such as content from the internet, free content from various online media stores, or user created content on a user device, for example. Certain media items may be required to be purchased by the user prior to viewing the media item, for example, such as specific movies, songs, albums, and the like. In accordance with a determination that the user is required to purchase a requested media item in order to commence playback of the media item, the user may be prompted for authorization information in order to commence playback of the media. For example, prompting the user for authorization information may include displaying a user interface on the user device, such as a media details page with information about the requested media item, including a detailed description, ratings information, media previews, and the like. The user interface may further include an option to purchase the media item, such that activating the option to purchase the media item may cause a payment user interface to be displayed. The payment user interface may further permit a user to enter payment information (e.g., credit/debit card details) in order to authorize a purchase of the media item. In some examples, the various user interfaces to facilitate payment for a media item may be displayed on the user device, on the secondary user device, or may be displayed on both the user device and secondary user device. For example, a user interface may be displayed on the user device (e.g., mobile phone) including affordances to permit a user to enter payment information, wherein a user interface is displayed on the secondary user device (e.g., television) to display media item details and display the entry of payment information corresponding to the entry of payment information at the user device.

Figure 12:
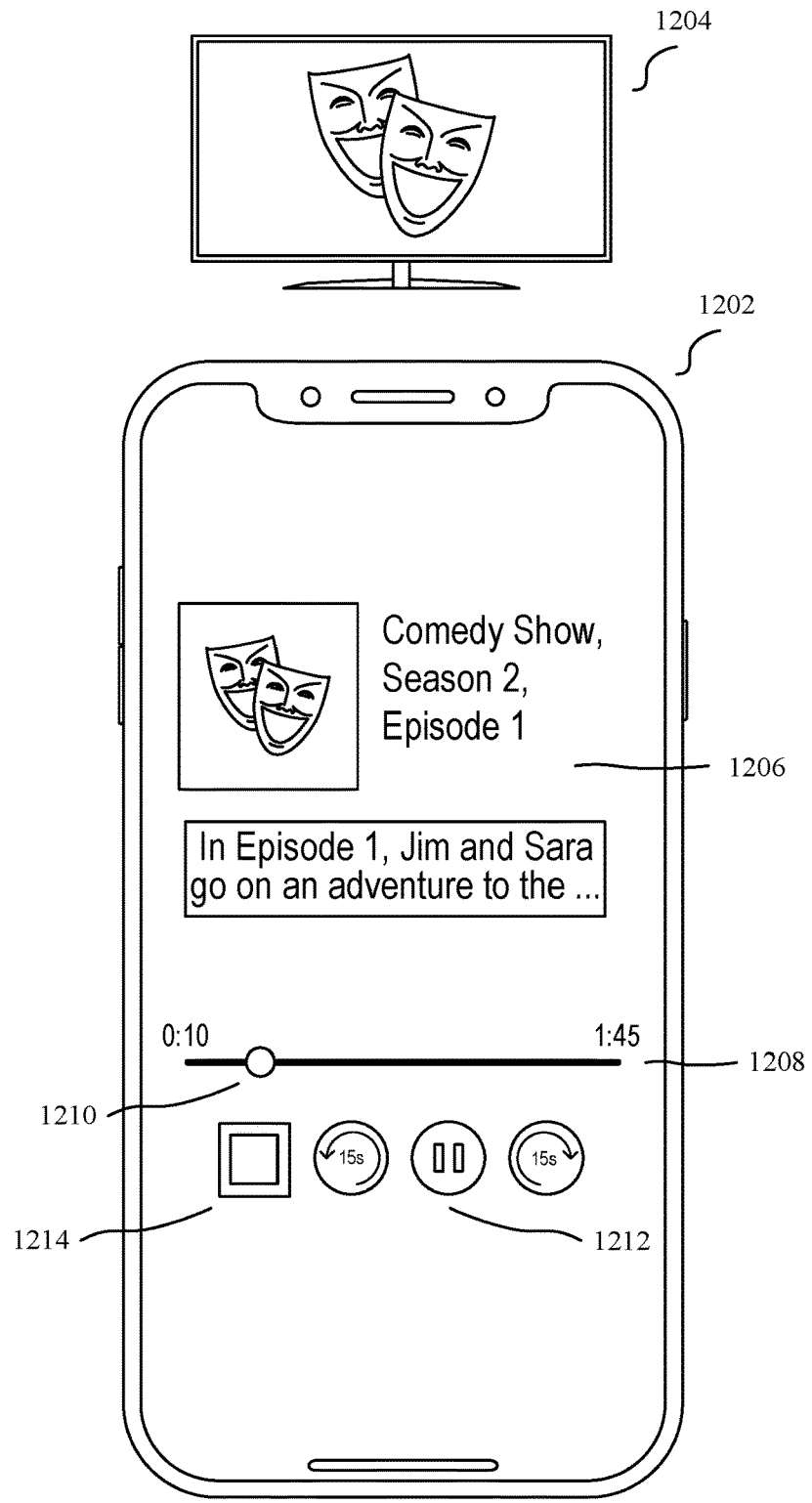
FIG. 12 illustrates a process for displaying user interfaces for content playback on multiple devices, according to various examples.

In some examples, referring now to FIG. 12, a process 1200 for displaying user interfaces for content playback on multiple devices is depicted. For example, at least one task is performed based on the instruction for media playback, including displaying a plurality of affordances based on information corresponding to media currently playing at the secondary user device. For example, a user may provide a speech request to user device 1202, such as "Play the Comedy Show on the TV." In response to transmitting a command to secondary user device 1204 to play the requested media item as described herein, playback of the requested media item may commence in accordance with the command. For example, the command may cause the secondary electronic device 1204 to play media content currently playing on user device 1202, or may cause secondary electronic device 1204 to obtain the media content from another source. In some examples, in response to playback of the media, information corresponding to media currently playing at secondary user device 1204 is transmitted to user device 1202.

In some examples, a plurality of affordances may be displayed at user device 1202 based on the received information. For example, a media details affordance 1206 may be displayed, including information regarding the media content currently playing on secondary user device 1204. The media details affordance 1206 may include, for example, one or more media items (e.g., photos) corresponding to the currently playing media, such as a movie poster, album cover, and the like. The media details affordance 1206 may further be activated by the user to cause additional information to be displayed related to the currently playing media. In some examples, a time affordance 1208 may be provided to indicate a current playback time of the media item. The time affordance 1208 may include, for example, a start time, current time, and end time of the media content. In some examples, a user may interact with time affordance

1208 in order to adjust the currently playback position of the media item on secondary user device 1204, for example, by touching and/or dragging on current time affordance 1210. In some examples, time adjustment affordances 1212 may be displayed. Activation by a user of time adjustment affordances 1212 may, for example, cause the playback position of media content being played on secondary user device 1204 to rewind, fast forward, and/or pause. In some examples, activation of time adjustment affordances 1212 may cause the playback position to rewind or fast forward a predetermined amount (e.g., 15 seconds). In some example, a remote-control affordance 1214 may cause a remote-control user interface to be displayed (not depicted). For example, the remote-control user interface may include additional affordances for adjusting media playback, viewing media information, navigating additional interfaces on the secondary user device 1204, and the like.

In some examples, performing at least one task based on the instruction for media playback includes adjusting one or more parameters associated with one or more additional devices. For example, a brightness level of at least one light source associated with the secondary user device may be adjusted. A user's home may include, for example, one or more light sources which are identified in a user profile for the user's home. Adjustment of a brightness level of a light source may include dimming the light source prior to or at the same time as the media playback commences at a secondary user device. For example, the lights within the living room of a user's home may be dimmed when playback begins at the secondary user device. In some examples, the audio level of devices located in a same room as the secondary user device may be reduced prior to or at the same time as the media playback commences at a secondary user device. For example, the volume level associated with one or more speakers in the living room of the user's home may be reduced when playback begins at the secondary device. In some examples, audio corresponding to the media being played at the secondary user device may be transmitted to speakers in a same room as the secondary user device.

Figure 13:
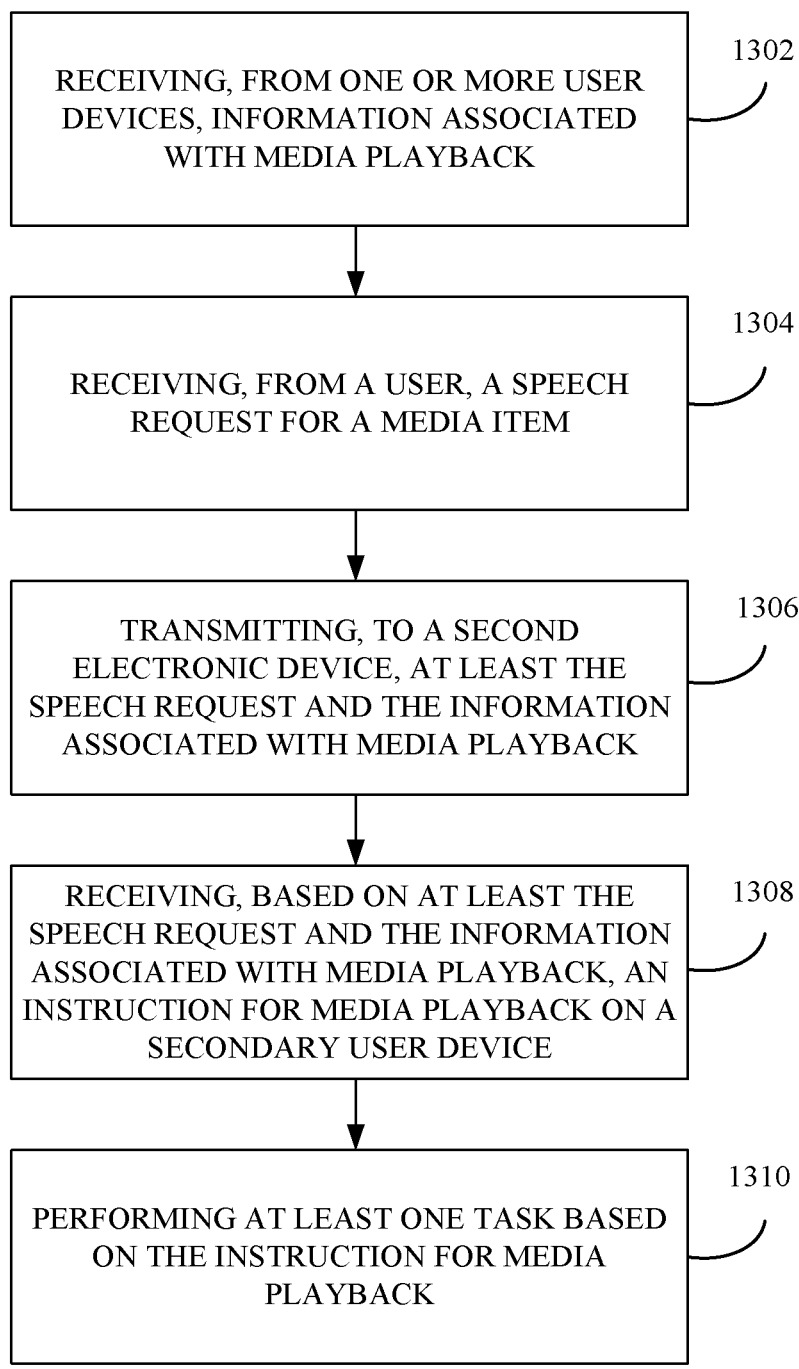
FIG. 13 illustrates a process for content playback on multiple devices, according to various examples.

FIG. 13 illustrates process 1300 for content playback on multiple devices, according to various examples. Process 1300 is performed, for example, using one or more electronic devices implementing a digital assistant. In some examples, process 1300 is performed using a client-server system (e.g., system 100), and the blocks of process 1300 are divided up in any manner between the server (e.g., DA server 106) and a client device. In other examples, the blocks of process 1300 are divided up between the server and multiple client devices (e.g., a mobile phone and a smart watch). Thus, while portions of process 1300 are described herein as being performed by particular devices of a client-server system, it will be appreciated that process 1300 is not so limited. In other examples, process 1300 is performed using only a client device (e.g., user device 104) or only multiple client devices. In process 1300, some blocks are, optionally, combined, the order of some blocks is, optionally, changed, and some blocks are, optionally, omitted. In some examples, additional steps may be performed in combination with the process 1300.

At block 1302, the electronic device receives, from one or more user devices, information associated with media playback. In some examples, the information associated with media playback includes at least one identifier associated with at least one candidate secondary user device of the one or more user devices and media information corresponding to the at least one candidate secondary user device. In some examples, the media information corresponding to the at least one candidate secondary user device includes at least one of an identification of an owner of a candidate secondary user device, an identification of media content owned by an owner of a candidate secondary device, an identification of one or more authorized users of a candidate secondary user device, a viewing history of media content on a candidate secondary user device, and media rendering capabilities of a candidate secondary user device. By receiving the information associated with media playback, the system optimizes playback of media content on a secondary device by ensuring that requisite information regarding secondary devices is received by a first device. For example, the system leverages existing networks, such as a home WiFi network, in order to determine possible devices to which a user may choose to play content to. In turn, the system ensures that information regarding such devices (e.g., a television set-top box) is received at a potential initiating device (e.g., a mobile phone) prior to reception of any playback commands at the initiating device. This improves system efficiency and user experience by ensuring that necessary information for potential playback commands is ready to be utilized once a playback command is received.

At block 1304, the electronic device receives, from a user, a speech input for a media item. At block 1306, the electronic devices transmits, to a second electronic device, at least the speech request and the information associated with media playback. In some examples, in accordance with transmitting, to the second electronic device, at least the speech request and the information associated with media playback, the electronic device receives, from the second electronic device, a plurality of device identifiers corresponding to a plurality of candidate secondary user devices, wherein the electronic device displays a plurality of affordances corresponding to the plurality of candidate secondary user devices. In some examples, the electronic device receives, from the user, a selection of an affordance from the plurality of affordances, wherein the electronic device transmits, to the second electronic device, a device identifier corresponding to the selected affordance. By displaying affordances and receiving a user selection of an affordance corresponding to a candidate secondary device, the system ensures that a correct candidate secondary device is selected for playback in the event that a candidate user device cannot be chosen with a predetermined confidence. For example, when the user asks to play content on a television, although there are two televisions that the user regularly plays to, the system may be unable to determine which television the user intends to play content to. Thus, the system improves user experience by verifying with the user which device the user intends to play content to. These features avoid scenarios where an incorrect device is chosen for playback, and thus improve user experience when playing content to a secondary device.

In some examples, in accordance with transmitting, to the second electronic device, at least the speech request and the information associated with media playback, the electronic device receives, from the second electronic device, a plurality of media identifiers corresponding to a plurality of media items, wherein the electronic device displays a plurality of affordances corresponding to the plurality of media items. In some examples, the electronic device receives, from the user, a selection of an affordance from the plurality of affordances corresponding to the plurality of media items, wherein the electronic device transmits, to the second electronic device, a media identifier corresponding to the selected affordance. In some examples, each of the displayed affordances include an indicator, wherein the electronic device receives, from the user, a selection of an indicator corresponding to a displayed affordance, wherein in accordance with receiving the selection of the indicator corresponding to the displayed affordance, the electronic device displays a user interface associated with a media item corresponding to the selected indicator. By displaying affordances corresponding to a plurality of media items, the system improves media playback if a user reference to a media item is ambiguous. For example, if a user generally refers to a series title without specifying a season and episode, the system provides the user with options to further refine the user request. Furthermore, the system provides the user with additional options to view details about each specific media item (e.g., a plot summary for a specific episode). These features improve media content delivery and user experience by allowing a user to choose specific media items based on a general request, and to learn more about media content.

At block 1308, the electronic device receives, based on at least the speech request and the information associated with media playback, an instruction for media playback on a secondary user device. In some examples, the electronic device determines whether the instruction for media playback includes an instruction to output, at the secondary user device, a requested media item currently playing on the electronic device, wherein in accordance with a determination that the instruction for media playback includes an instruction to output, at the secondary user device, a requested media item currently playing on the electronic device, the electronic device transmits to the secondary user device, a command to play the requested media item currently playing on the electronic device. In some examples, the electronic device determines whether the instruction for media playback includes an instruction to output, at the secondary user device, a requested media item not currently playing on the electronic device, wherein in accordance with a determination that the instruction for media playback includes an instruction to output, at the secondary user device, a requested media item not currently playing on the electronic device, the electronic device transmits, to the secondary user device, a command to play the requested media item at the secondary user device. In some examples, the command to play the requested media item at the secondary user device includes a command to obtain the requested media item from a media server. In some examples, the command to play the requested media item at the secondary user device includes a command to obtain the requested media item from a storage on the secondary user device. By determining whether the instruction includes a command to play media currently playing on the electronic device, the system intelligently handles media playback based on various scenarios. For example, if the user is currently watching the requested media on a first device (e.g., mobile phone), the system may determine that the user desires to continue watching such media content on a secondary device (e.g., television). As another example, if the user is not currently watching the requested media on a first device, the system may determine that the user desires to begin watching such media content on a secondary device, and thus facilitates obtaining the media for playback on the secondary device (e.g., purchasing the media content, obtaining the content from storage, etc.). These features improve user experience and system efficiency by intelligently obtaining media from various sources depending on the state of multiple devices.

At block 1310, the electronic device performs at least one task based on the instruction for media playback. In some examples, performing at least one task based on the instruction for media playback comprises determining whether the user is authorized to establish a connection with the secondary user device, wherein in accordance with a determination that the user is not authorized to establish a connection to the secondary user device, the electronic device causes a first passcode to be generated at the secondary user device. In some examples, the electronic device receives, from the user, an input corresponding to a second passcode, wherein in accordance with a determination that the first passcode and the second passcode are the same, the electronic devices transmits, to the secondary user device, at least one command based on the instruction for media playback. By determining whether a user entered passcode is the same as a passcode displayed on a secondary device, the system provides verification that the user attempting to play content on the secondary media device is a user who is able to view the secondary user device. For example, the system eliminates the possibility of a user who is not able to view the device (e.g., a user in another room or another home) being able to control playback on such device. In turn, the system improves user experience by ensuring that certain users are not able to remotely control a secondary device.

In some examples, the instruction for media playback on a secondary user device includes a media identifier, wherein performing at least one task based on the instruction for media playback comprises determining whether user authorization is required to view a requested media item associated with the media identifier, wherein in accordance with a determination that user authorization is required to view a requested media item associated with the media identifier, the electronic device prompts the user for authentication information. In some examples, the electronic device receives, from the user, authorization information in order to commence media playback of the requested media item, wherein the electronic device causes playback of the requested media item to commence at the secondary user device based on the authorization information. By prompting the user for authentication information when required to view media content, the system improves user experience by ensuring that only authorized users can facilitate playback on media content on a secondary device. For example, the features may permit certain users to enter parameters, such as parental controls, in order to prohibit other users, such as children, from accessing inappropriate content.

In some examples, the instruction for media playback on a secondary user device includes a media identifier, wherein performing at least one task based on the instruction for media playback comprises transmitting, to the secondary user device, the media identifier, wherein the electronic device receives, from the secondary user device, information corresponding to media currently playing at the secondary user device. In some examples, the media currently playing at the secondary user device corresponds to the media identifier, wherein the electronic device displays a plurality of affordances based on the information corresponding to media currently playing at the secondary user device. By displaying a plurality of affordances corresponding to media currently playing at a secondary user device, the system provides the user with the ability to control and view information about media playing at a secondary user device. For example, the plurality of affordances allow the user to control playback of the media currently playing at the secondary user device, such as pausing, rewinding, or fast forwarding. User experience is thus improved by providing additional options to interact with the media content playing on a secondary device.

In some examples, the instruction for media playback on a secondary user device includes a media identifier, wherein performing at least one task based on the instruction for media playback comprises determining, based on the media identifier, whether the user is required to obtain a requested media item in order to commence playback of the requested media item. In some examples, in accordance with a determination that the user is required to obtain a requested media item in order to commence playback of the requested media item, the electronic devices receives, from the user, authorization information in order to commence media playback of the requested media item, wherein the electronic device causes playback of the requested media item to commence at the secondary user device based on the authorization information. In some examples, receiving, from the user, authorization information in order to commence media playback of the requested media item further comprises displaying a user interface associated with obtaining the requested media item, wherein the electronic devices receives, from a user, a plurality of inputs including the authorization information. In some examples, receiving, from the user, authorization information in order to commence media playback of the requested media item comprises causing display, on the secondary user device, of a user interface associated with obtaining the requested media item, wherein the electronic device receives, from a user, a plurality of inputs including the authorization information, wherein the electronic device causes display, on the secondary user device, of at least a portion of the plurality of inputs. In some examples, performing at least one task based on the instruction for media playback comprises adjusting a brightness level of at least one light source associated with the secondary user device. By receiving authorization information from a user in order to commence media playback of a requested media item, the system facilitates the purchase of a requested media item among multiple devices. For example, if a user is required to purchase a media item prior to commencing playback of the media item, the user may enter payment information on a first device (e.g., mobile phone), where a user interface associated with the transaction is displayed on a second device (e.g., television display). These features improve user experience by intuitively facilitating entry of payment information on a device the user is currently interacting with, while displaying information on the device that media will ultimately be played on.

The operations described above with reference to FIG. 13 are optionally implemented by components depicted in FIGS. 1-4, 6A-B, and 7A-C. For example, the operations of process 1300 may be implemented by one or more of operating system 718, applications module 724, I/O processing module 728, STT processing module 730, natural language processing module 732, vocabulary index 744, task flow processing module 736, service processing module 738, media service(s) 120-1, or processor(s) 220, 410, 704. It would be clear to a person having ordinary skill in the art how other processes are implemented based on the components depicted in FIGS. 1-4, 6A-B, and 7A-C.

Figure 14:
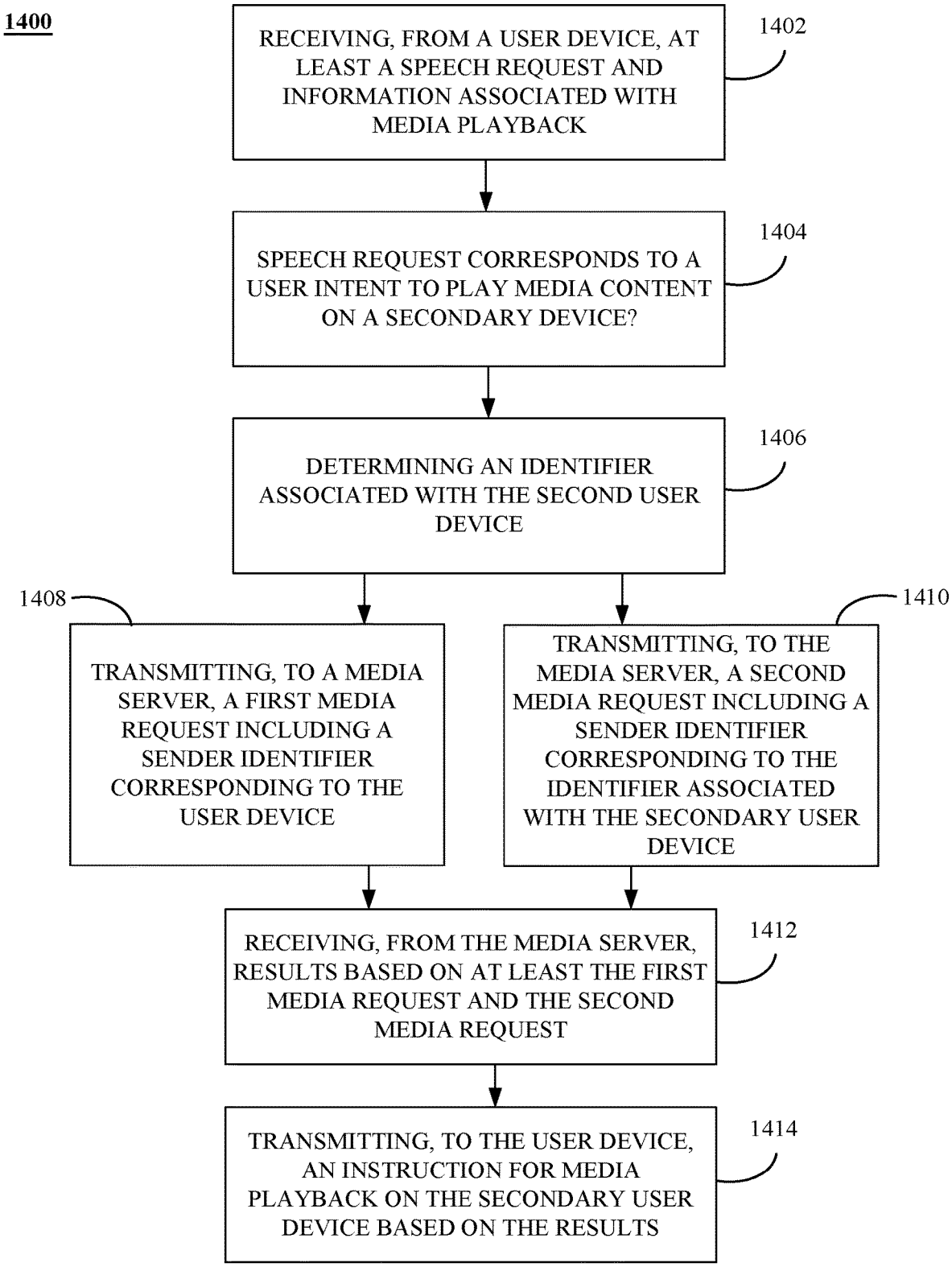
FIG. 14 illustrates a process for content playback on multiple devices, according to various examples.

FIG. 14 illustrates process 1400 for content playback on multiple devices, according to various examples. Process 1400 is performed, for example, using one or more electronic devices implementing a digital assistant. In some examples, process 1400 is performed using a client-server system (e.g., system 100), and the blocks of process 1400 are divided up in any manner between the server (e.g., DA server 106) and a client device. In other examples, the blocks of process 1400 are divided up between the server and multiple client devices (e.g., a mobile phone and a smart watch). Thus, while portions of process 1400 are described herein as being performed by particular devices of a client-server system, it will be appreciated that process 1400 is not so limited. In other examples, process 1400 is performed using only a client device (e.g., user device 104) or only multiple client devices. In process 1400, some blocks are, optionally, combined, the order of some blocks is, optionally, changed, and some blocks are, optionally, omitted. In some examples, additional steps may be performed in combination with the process 1400.

At block 1402, the electronic device receives from a user device, at least a speech request and information associated with media playback. In some examples, the electronic device determines, based on the speech request, a requested media item. In some examples, the electronic device determines, based on the speech request and the information associated with media playback, one or more candidate secondary user devices, wherein the electronic device determines the identifier associated with the secondary user device based on at least the requested media item and the one or more candidate secondary user devices. In some examples, determining the identifier associated with the secondary user device further comprises determining a confidence level for each candidate secondary user device of the one or more candidate secondary user devices, wherein each confidence level indicates a suitability for playing the requested media item at each candidate secondary user device. By determining a confidence level for candidate secondary user devices, the system improves accuracy for selecting a device to which the user intends to play media content. For example, if the user frequently plays media content to a specific television, the system may determine that the specific television is very suitable for playing a requested media item, and thus is associated with a high confidence. As another example, if a user rarely plays media content to a different device, the system may determine that the specific television is not very suitable for playing a requested media item, and thus is associated with a low confidence. Thus, the system improves efficiency in selecting candidate user devices by considering relevant information to determine device playback suitability.

In some examples, the electronic device determines whether at least one of the confidence levels exceeds a predetermined threshold, wherein in accordance with determination that at least one of the determined the confidence levels exceeds the predetermined threshold, the electronic device selects a candidate secondary user device having a highest confidence level and determines the identifier associated with the secondary user device based on the selected candidate secondary user device, and wherein in accordance with a determination that at least one of the determined the confidence levels does not exceed the predetermined threshold, the electronic device transmits, to the user device, a plurality of identifiers associated with candidate secondary user devices. In some examples, the electronic device receives, from the user device, a selection of an identifier from the plurality of identifiers and determines the identifier associated with the secondary user device based on the selected identifier. By transmitting identifiers for candidate secondary user devices to the user, the system improves efficiency and user experience by accurately selecting the correct secondary user device with user assistance when necessary. For example, in the case where a user frequently plays content on two different televisions, such as a living room television and a bedroom television, resulting in a difficult determination for which device content should be played on. Thus, verifying the correct device with the user avoids the scenario where media playback commences on a device the user does not intend to interact with.

At block 1404, the electronic device determines whether the speech request corresponds to a user intent to play media content on a secondary user device. In some examples, in accordance with a determination that the speech request corresponds to a user intent to play media content on a secondary user device, the electronic device determines whether the speech request corresponds to a plurality of candidate media items, and in accordance with a determination that the speech request corresponds to a plurality of candidate media items, the electronic device transmits, to the user device, a plurality of identifiers associated with at least a portion of the plurality of candidate media items. In some examples, the electronic device receives, from the user device, a selection of an identifier from the plurality of identifiers, wherein the electronic device determines a referenced media item based on the selected identifier. By transmitting identifiers for candidate media items to the user, the system improves efficiency and user experience by accurately selecting the correct media item to playback when necessary. If the user provides an ambiguous request to play media, for example, by only referring to a series title, the system may efficiently narrow the playback options for the user such as by presenting specific episodes of the series to the user. Thus, verifying the media item with the user improves efficiency and user experience by permitting a user to select a specific media item from a narrowed list of options.

At block 1406, in accordance with a determination that the speech request corresponds to a user intent to play media content on a secondary user device, the electronic device determines an identifier associated with the secondary user device. In some examples, in accordance with determining the identifier associated with the secondary user device, the electronic device transmits an instruction for initiating a standby state on the secondary user device. In some examples, in accordance with determining an identifier associated with the secondary user device, the electronic device removes, from the device, the information associated with media playback. By initiating a standby state on the secondary user device, the system improves efficiency and user experience by preparing a device to play media content upon reception of a command to commence playback. For example, the device may be turned on and entered into an idle state, such that media plays immediately upon receiving a command. Furthermore, by removing the information associated with media playback from the electronic device, such as the digital assistant server, the system improves user experience by protecting user information and thus enhancing user privacy.

At block 1408, the electronic device transmits, to a media server, a first media request including a sender identifier corresponding to the user device. At block 1410, the electronic device transmits, to the media server, a second media request including a sender identifier corresponding to the identifier associated with the secondary user device. In some examples, the first media request includes a requested media item and the second media request includes the requested media item. In some examples, the first media request and the second media request are transmitted simultaneously. By transmitting parallel requests including the first and second media request, the system improves efficiency by causing the electronic device, such as the digital assistant server, to emulate signals sent by user devices, such as a mobile phone and television, for example. These features further improve efficiency by leveraging existing media systems and causing the systems to function as if the user devices were originating the requests, thus reducing the need to further modify existing systems and protocols.

At block 1412, the electronic device receives, from the media server, results based on at least the first media request and second media request. In some examples, the received results comprise one or more parameters indicating suitability for playing the requested media item at the secondary user device, the one or more parameters including at least one of a first parameter indicating whether the requested media item is capable of being played on at least one of the user device and the secondary user device, a second parameter indicating whether the requested media item is owned on at least one of the user device and the secondary user device, a third parameter indicating whether the requested media item is currently playing on the user device, a fourth parameter indicating a viewing history of the requested media item. In some examples, the electronic device determines the instruction for media playback on the secondary user device based on a comparison of at least two of the parameters indicating suitability for playing the requested media item at the secondary user device. By receiving and comparing parameters indicating suitability for playing media at a secondary user device, the system improves efficiency for media playback by determining the optimal procedure for performing media playback across multiple user devices. For example, the system takes into consideration many factors regarding how the user has previously interacted with the media, and device playback capabilities for playing such media. In turn, these features improve user experience and system efficiency by providing a consistent user experience and selecting appropriate devices for playing desired media.

In some examples, the electronic device determines whether the received results include an indication that the requested media item is currently playing on the user device, wherein in accordance with a determination that the received results include an indication that the requested media item is currently playing on the user device, the electronic device transmits, as the instruction for media playback on the secondary device, a command to play the requested media item currently playing on the user device. In some examples, the electronic device determines whether the received results include an indication that the requested media item is currently playing on the user device, wherein in accordance with a determination that the received results include an indication that the requested media item is not currently playing on the user device, the electronic device transmits, as the instruction for media playback on the secondary device, a command to obtain the requested media item for playback at the secondary user device. In some examples, the command to obtain the requested media item for playback at the secondary user device includes a command to obtain the requested media item from a media server. In some examples, the command to obtain the requested media item for playback at the secondary user device includes a command to obtain the requested media item from a storage on the secondary user device. At block 1414, the electronic device transmits, to the user device, an instruction for media playback on the secondary user device based on the results. By determining whether to play media currently playing on a user device, the system improves user experience by proving seamless transitions when transferring playback of media to a different device. These features further improve system efficiency by obtaining media from other sources, such as a media server or device storage, when necessary.

The operations described above with reference to FIG. 14 are optionally implemented by components depicted in FIGS. 1-4, 6A-B, and 7A-C. For example, the operations of process 1400 may be implemented by one or more of operating system 718, applications module 724, I/O processing module 728, STT processing module 730, natural language processing module 732, vocabulary index 744, task flow processing module 736, service processing module 738, media service(s) 120-1, or processor(s) 220, 410, 704. It would be clear to a person having ordinary skill in the art how other processes are implemented based on the components depicted in FIGS. 1-4, 6A-B, and 7A-C.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

Secure Device to Device Communication System and Framework

Additional embodiments described herein provide for a network system to enable content playback on multiple devices. In one embodiment, content playback on the multiple devices is enabled via a companion link system, which provides for a transport agnostic communication system in which device to device connections can be performed over a common network connection, such as a LAN connection, or performed via direct wireless connections, such as a Wi-Fi direct or Bluetooth connection. Devices that communicate via the companion link can discover and pair with each other via a discovery and pairing process described herein. Once devices have discovered and paired with one another, encrypted data channels can be established between those devices that provide additional security and authentication services over and beyond those provided by the underlying transport.

Figure 15:
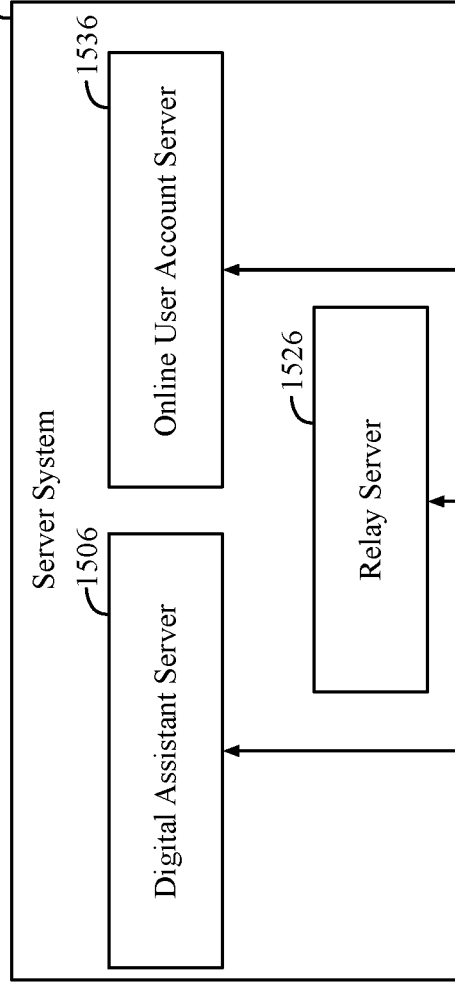
FIG. 15 illustrates a system that enables communication between devices within a digital assistant system.
Figure 15:
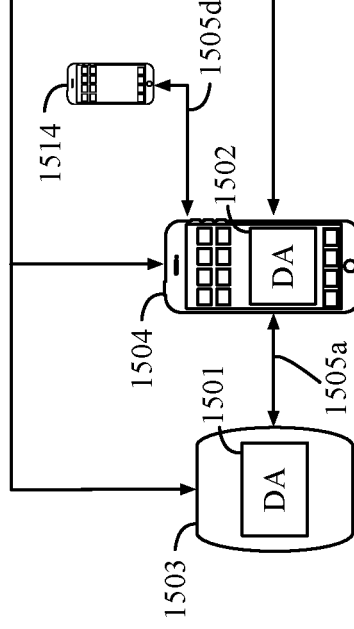

FIG. 15 illustrates a system 1500 that enables communication between devices within a digital assistant system. The components of system 1500 can be variants or versions of system 100 of FIG. 1. In various embodiments, the system 1500 enables secure and authenticated message exchange between multiple devices. The multiple devices can include one or more user devices (e.g., user device 1504, user device 1515), which each may be a portable multifunctional device. The multiple user devices may be versions or variants of user device 104 and/or second user device 122 as in FIG. 1. The multiple devices can also include one or more stationary devices, such as one or more smart home devices (e.g., smart home device 1503, smart home device 1533) that may be used by multiple users. In one embodiment, smart home device 1503 may be a digital assistant enabled (DA client 1501) smart speaker device, while smart home device 1533 may be a digital assistant enabled (DA client 1531) television or television set top box. In one embodiment a set of companion links 1505a-1505b can enable message-based communication between a user device and one or more communal smart home devices. A companion link 1505c can also be established between communal smart home devices to enable communication between those devices. In one embodiment, a companion link 1505d can also be established between user devices to enable peer-to-peer exchange of device data.

A companion link 1505c can enable general purpose messaging that enables communication between communal devices, such as smart home device 1503 and smart home device 1533. Such link enables the communal devices to work in concert to coordinate operation. For example, smart home device 1503 and smart home device 1533 may be configured as part of a distributed media playback system that can play music or other media. The companion link 1505c established between smart home device 1503 and smart home device 1533 can be used to coordinate media playback or to coordinate multi-channel audio playback over the multiple devices. When a user speaks a query to one of the smart home devices, the devices can exchange messages to coordinate ducking of audio playback for the duration of the spoken request and any associated audio responses. Any number of communal smart home devices and user devices can communicate using the system 1500 to exchange audio data, media playlists, configuration data, and other information used to enable a connected digital home system.

In one embodiment, companion links 1505a-1505d can be established over a local network connection (e.g., LAN) via a local wired and/or wireless network connection. In one embodiment, the companion links 1505a-1505d can also be established over a WAN connection, such as an Internet connection, although policy and configuration determinations may optionally be configured to limit the companion link 1505c between smart home devices 1503, 1533 to a single network. In one embodiment, in addition to the digital assistant server 1506, the server system 1508 can include an online user account server 1536 to which user devices 1504, 1515 and smart home devices 1503, 1533 can connect via the one or more networks 1510. The online user account server 1536 can include information associated with an online user account of a user associated with the various devices. In some embodiments, the online user account server 1536 can also include or be associated with server hardware and software logic to provide online services including online storage, messaging, e-mail, media and streaming services, or navigation services. In one embodiment, the online user account server 1536 can also provide or facilitate access to one or more of the external services 1520 of FIG. 15. In one embodiment, the online user account server 1536 can also provide or facilitate access to an online store, such as an online application store (e.g., app store) and/or an online media store, such as a music, video, or e-book store.

In one embodiment, a companion link 1505d between user devices 1504, 1515 can be used to enable peer-to-peer data exchange. In one embodiment, automatic data exchanges between the devices can be configured to be performed over the companion link 1505d. For example, where user device 1504 and user device 1515 are each associated with the same account on the online user account server 1536, a credential exchange can be performed via the online account server to enable the automatic establishment of an encrypted communication channel between the devices whenever the devices are within direct communication range. In one embodiment, data for cloud services associated with the online user account server 1536 can be exchanged between devices over the companion link 1505*d* instead of over the one or more networks 1510. In one embodiment, the online user account server 1536 can maintain a list of devices associated with a single account or a list of devices associated with a family of associated accounts. The list of devices associated with an account of family of accounts can be used to facilitate device discovery and the establishment of companion link connections between devices. The accounts on the online account server can enable mutual authentication between the electronic devices via an exchange of authentication credentials.

In one embodiment, the online user account server 1536 includes or is associated with a registration server to register a unique device identifier associated with each device with an online account associated with a user. Once a device has been registered with an online account of a user, an identifier token can be created that enables the device to be located and identified over the networks 1510. The identifier token can include one or more cryptographic keys, tokens, certificates, or other data that allows the digital assistant server 1506, online user account server 1536, and other servers within the server system 1508 to locate and identify a device across the one or more networks 1510. In some embodiments a smart home device 1503, 1533 can use the identifier token to establish a remote connection with the user device 1504 if the user device is outside of the home or is not connected to the home network of the smart home devices. The smart home devices 1503, 1533 can use the identifier token to locate the user device 1504 on a mobile wireless network and establish a secure remote companion link connection with the user device 1504. Locating the user device 1504 and establishing the connection to the user device can be facilitated in part via the digital assistant server 1506 and the online user account server 1536. In such embodiments, at least a subset of the companion device functions of the user device 1504 can continue to operate when the user device 1504 is away from home, or if the user is at home but is not connected to the home network.

In some embodiments each digital assistant client (DA client 1501, DA client 1502, DA client 1531) executing on a device can be associated with a digital assistant identifier. In various embodiments, the digital assistant identifier can be associated with or derived from the identifier token for the host device, an account identifier associated with an online account of a user of the device, and/or another token associated with or derived from the account or device identifiers. The digital assistant identifier of a digital assistant client can uniquely or quasi-uniquely identify the DA client 1501, 1502, 1531 on the various devices when the digital assistant clients are communicating with each other or the digital assistant server 1506. The digital assistant identifier can be associated with identification or location information of the host device of the digital assistant, such as the identification token of the host device. After a paring relationship is created between a smart home device 1503, 1533 and the user device 1504, the digital assistant clients (DA client 1501, DA client 1531) on the smart home device can store the digital assistant identifier and use the digital assistant identifier to locate, identify, and communicate with the DA client 1502 on the user device 1504. The digital assistant identifier for the DA client 1502 can also be sent to the digital assistant server 1506 and stored as a companion digital assistant identifier. Should the digital assistant server 1506 require access to private information of a user to perform processing operations for a request received at the DA client 1501, 1531 of the smart home device 1503, 1533, the digital assistant server 1506 can contact the DA client 1502 of the user device 1504 on behalf of the DA client 1501, 1531. The digital assistant server 1506 can then receive from the DA client 1502 on the user device 1504, in various embodiments, private information from the user device 1504, processing results of an information processing task dispatched to the user device 1504, or permission and/or access credentials to access private data on behalf of the user device 1504.

In some embodiments, the server system 1508 includes a relay server 1526 that can be used to facilitate remote connections between a smart home device 1503, 1533 and the user device 1504. The relay server 1526 can enable a relay service that can relay companion link messages between devices in the event a local connection or another form of remote connection, such as a remote peer-to-peer connection, cannot be established. The relay server 1526 can enable remote companion link message passing based on a relay pairing established between the smart home devices 1503, 1533 and the user device 1504. Keys, certificate, and other identification and verification data associated with the various devices can be exchanged during the local pairing process that can be used to establish a relay pairing between devices. Once a relay pairing has been established between devices, the smart home devices 1503, 1533 can send messages to the relay server 1526 with a unique relay identifier associated with the user device 1504.

Each device that can connect with the relay server 1526 can have an associated relay identifier, which is a persistent pairing token the can be used to identify and authenticate the connecting devices. The relay identifier can be, include, or be derived from a device identifier or identifier token that uniquely identifies the device and can include certificates and/or signatures that enable verification of the relay token. The relay server 1526 can then relay the messages to the user device 1504. In one embodiment, a persistent and bidirectional connection can be established, enabling the user device 1504 to send return messages to the smart home device 1503, 1533 via the relay server 1526. In one embodiment, the user device 1504 can also initiate a connection with a smart home device 1503, 1533 using a relay identifier associated with the device. In one embodiment, relay identifiers are used for each message exchanged over the relay server 1526, enabling the relay server 1526 to verify the authenticity of each message relayed though the server and to prevent unauthorized devices from transmitting messages via an established relay server connection.

Figure 16:
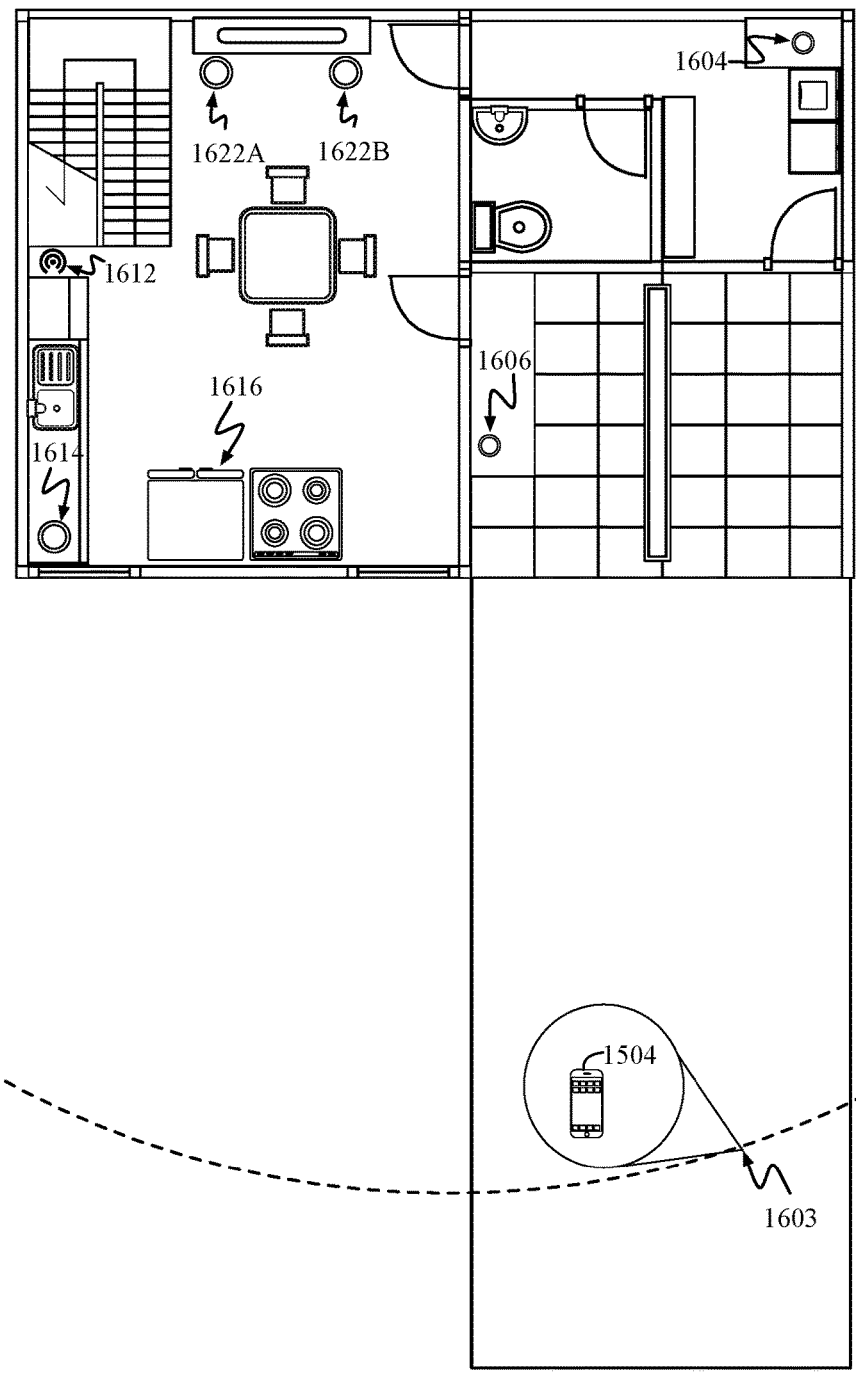
FIG. 16 illustrates a home network environment including multiple smart home devices, according to embodiments.

FIG. 16 illustrates a home network environment 1600 including multiple smart home devices, according to embodiments. The home network environment 1600 can include a wireless access point 1612 to provide access to a wireless network that services the home network environment. The home network environment 1600 can be part of a smart home environment. Multiple smart home devices 1604, 1606, 1614, 1616, 1622A-1622B can be connected to the home network environment 1600 via the wireless network, or optionally a wired network connection. In various embodiments, the home network environment can include various types of smart home devices. For example, smart home device 1604, 1606, 1614, can be smart speaker devices that are configured to distributed media playback. Additionally, smart home device 1616 can be a smart appliance device, such as a smart refrigerator device. Each of the smart home devices 1604, 1606, 1614, 1616, 1622A-1622B can use the network of the home network environment 1600 to establish interconnecting companion links to enable the devices to exchange configuration information. For example, smart home devices 1622A-1622B can be configured as multi-channel smart speaker devices, which can use the companion link to configure multi-channel (e.g., stereo, surround, etc.) audio playback. Additionally, each of the smart home devices 1604, 1606, 1614, 1616, 1622A-1622B can include digital assistant clients. User devices such as a mobile instance of the user device 104, via or on behalf of a connected vehicle infotainment system, can also be configured to connect to the home network environment when in proximity to the wireless access point 1612. In one embodiment the user device 1504 can also create a companion link connection to any other user devices that may be connected to the home network environment 1600 or within direct radio range of the user device 1504.

Device Discovery and Pairing

Before a companion link communication channel is established, a discovery and pairing process is performed. The device discovery process enables a smart home device to locate a companion device through which the digital assistant client on the smart home device is to access private user information that may be used to process and/or respond to a user request. The device discovery process, in some instances, can also include user verification that communication between the smart home device and the companion device should occur. In some embodiments, device discovery can leverage existing service discovery protocols that facilitate locating devices and/or services on a wireless or other network, such as the Simple Service Discovery Protocol (SSDP) developed by the UPnP Forum or the Bonjour networking technology developed by Apple Inc. (published as IETF RFC 6762 and IETF RFC 6763 and referred to herein as "Bonjour"). In a device discovery service, a device can advertise information indicating its existence, address, and optionally additional information about its capabilities. Other devices, including other smart home devices or user devices, can browse the advertisements and identify devices of interest based on the broadcast information. Using the advertised address, a browsing device can initiate communication with the advertiser.

Depending on the network and discovery service, advertising can optionally include real-time broadcasting of information (e.g., through a multicast or beacon signal) and/or providing advertisement information to a central repository (e.g., at a network access point) from which other devices can retrieve the information. Browsing of advertisements can include detecting broadcast advertisements and/or retrieving advertisement information from the central repository. In some embodiments, communal smart home devices that are stationary attached to a power source, such as an electrical outlet, can continuously perform advertisement and discovery for the companion link service. Mobile user devices can enable discovery of the companion link service based on the location of the user device. For example, and in one embodiment, a geo-fence boundary 1603 is configured on the mobile device, such that companion link discovery is enabled when the mobile device is within a geographic proximity to a location designated as the home location of the user device 1504.

When a smart home device or another secondary device is discovered by a user device 1504, a network data connection (e.g., TCP, UDP, etc.) can be established between the smart home device and the companion device. The network data connection can be established using any network layer protocol. To avoid connection races between devices that are both advertising and discovering, the device with the lexicographically lower persistent identifier initiates the connection between devices. The persistent identifier of a device is derived from an anonymized identifier that is advertised via the discovery service. In one embodiment, to derive the persistent identifier based on advertised information make use of data exchanged via a previously performed pairing process. In such embodiment, a data connection cannot be established with a smart home device until the smart home device is paired with a user device, as the persistent identifier used to connect with a communal smart home device is otherwise unknown. Once a data connection is established, a secure communication session can be established between the communal smart home device and the companion device. The communal smart home device and the connected companion device can then exchange presence and reachability information. Where the companion device is a mobile device, the companion device can then enter a wake-on-wireless (WoW) state as needed, when data is not being exchanged over the companion link, while communal devices that are connected to a power source can remain active to reduce first-message latency.

In the event connectivity is lost between devices, the discovery service can be re-enabled and used to search for the device on the local network. If the missing device is re-discovered, the data connection between devices can be re-established. If the missing device cannot be discovered, state discovery service information in the records of the missing device is reconfirmed and cleaned. The searching device can then attempt to establish communication with the missing device via a secure internet session. In one embodiment, part of the presence and reachability information exchanged when establishing a data connection includes a device identifier, identifier token, relay identifier, or another form of identification token that can be used to reach or enable message exchange with the missing device, for example via a peer-to-peer or relayed Internet connection. If a secure Internet connection can be successfully established with the previously missing device, companion link messages can be exchanged over the secure Internet connection.

In the event a companion device is connected to a smart home device via an Internet-based connection and a local connection becomes available, the companion link connection can be switched to the local connection. For example, user device 104 can cross a geo-fence boundary 1603 an enable a discovery protocol (e.g., SSDP, Bonjour, etc.) to search for devices (e.g., smart home devices 1604, 1606, 1614, 1616, 1622A-1622B). Should the user device 104 discover the availability of a local connection to the smart home device to which the user device 104 is connected to over the Internet connection, the user device can transition the Internet connection to a local (e.g., Wi-Fi) connection. In one embodiment, connection switching can be performed whenever connectivity is lost between connected devices (e.g., the user device 104 leaves the home network environment 1600) or if the devices determine that a better connection is available (e.g., the user device 104 returns to the home network environment 1600). Local connections may be preferred to Internet connections, as local connections presumably are lower latency. Additionally, it may be less resource intensive from a device and infrastructure standpoint to maintain a local connection instead of an Internet connection.

Figure 17:
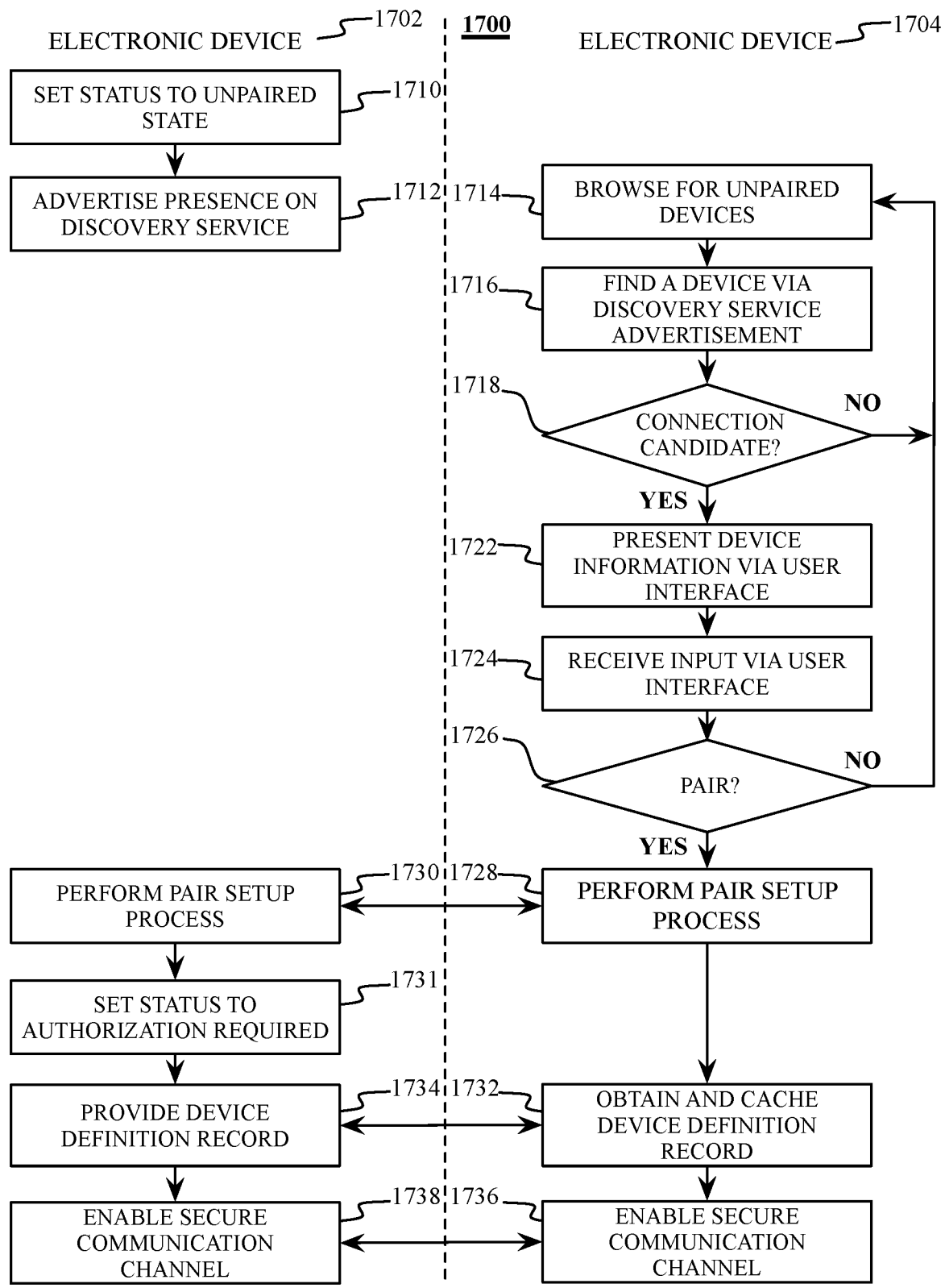
FIG. 17 is a flow diagram of operations of a discovery process used to discover and pair electronic devices, according to embodiments described herein.

FIG. 17 is a flow diagram of operations of a discovery process 1700 used to discover and pair electronic devices, according to embodiments described herein. The illustrated discovery process 1700 includes operations performed on electronic device 1702 and electronic device 1704. Electronic device 1702 and electronic device 1704 can each be any smart home device described herein or any personal user device described herein, such as, but not limited to, a smart speaker device, a television, a television set top device, a smartphone device, tablet computer device, or another user device that can connect with another device via a companion link described herein.

In one embodiment, as shown at block 1710, electronic device 1702 can set a status bit to indicate that the device is currently unpaired or is otherwise looking for a companion device with which to pair. The status bit can be a bit in a status flag indicator that listed in the status information advertised by electronic device 1702. At block 1712, electronic device 1702 can advertise its presence via a discovery protocol (e.g., SSDP, Bonjour, etc.) as having support for the companion link service. For instance, using Bonjour, electronic device 1702 can advertise itself with a name and a service type. The name can be a user-readable name for the companion discovery (e.g., "Speaker"); in some instances, the advertised name can be the name specified in the companion discovery information service instance of a device definition record. The service type can be defined for the uniform accessory protocol (e.g., service type "_companion-link._tcp"). The advertisement can also include additional information. Similar information can be distributed using other service discovery protocols and techniques. For instance, using SSDP, companion discovery can include advertising a name and service type URI using a multicast HTTP NOTIFY message. The URI can be used by the electronic device 1704 to retrieve additional information via a unicast request to electronic device 1702.

After electronic device 1702 begins advertising the companion link service via a service discovery protocol, the electronic device 1704 can discover the communal device when browsing for unpaired devices, as shown at block 1714. No particular timing is required between the beginning of advertisement and the beginning of service browsing, although the electronic device 1704 will be unable to discover electronic device 1702 unless discovery advertisement is detectable when electronic device 1704 browses.

In one embodiment, the electronic device 1704 can browse for unpaired devices in response to a trigger, such as a trigger provided by an application execution on the electronic device 1704. In one embodiment, the electronic device 1704 can browse for unpaired devices when the electronic device 1704 is placed in physical proximity to an unpaired device. For example, an out-of-box proximity setup for the communal device can include a data exchange over a short-range wireless communication mechanism (e.g., using Bluetooth and/or Bluetooth Low Energy, NFC, etc.), which can trigger the electronic device 1704 to browse for unpaired devices.

At block 1716, electronic device 1704 can find a device via the discovery service advertisement, for example, by detecting the advertisement performed at block 1712. At block 1718, the electronic device 1704 can determine, based on the advertisement, whether the discovered device is a connection candidate, such as the unpaired electronic device 1702. In one embodiment, the electronic device 1704 can determine the discovered device is a connection candidate when the discovered device is advertising the companion link service. The electronic device 1704 can check the discovery status flags to determine whether electronic device 1702 is already configured or paired with a companion device. As another example, the electronic device 1704 can check the advertised protocol version to determine whether the companion link protocol version of electronic device 1702 is compatible with the companion link protocol supported by electronic device 1704. If electronic device 1704 determines that the accessory is not advertising for a companion device with which to establish a companion link, electronic device 1704 can return to block 1714 and continue to browse. In one embodiment, after a period of time in which a communal device is not discovered, the browsing operations may timeout and browsing for unpaid devices may discontinue for a time.

At block 1722, electronic device 1704 can present information about electronic device 1702 to the user via a user interface, such as a display device of electronic device 1704. At block 1724, electronic device 1704 can receive input from the user via the user interface regarding actions to perform with the detected device. For example, the user can provide input indicating whether electronic device 1704 should establish a pairing with the communal device. Electronic device 1704 can present any or all of the information obtained from the advertisement data provided by the communal device and prompt the user to indicate whether electronic device 1704 should connect to electronic device 1702. Requesting user confirmation can help to avoid spurious or unwanted pairings between a communal device and a personal device. At block 1726, electronic device 1704 can interpret the user input received at block 1724 and determine whether to pair with electronic device 1702. In addition to user approval to initiate a pairing operation, other operations can be performed to complete the pairing operation to minimize risk of a pairing occurring without approval of the rightful owner/operator of electronic device 1704. For example, electronic device 1704 and/or electronic device 1702 may request the input of a passcode known to the user of electronic device 1704. In one embodiment, biometric verification (e.g., fingerprint, facial recognition, etc.) can be requested by electronic device 1702 and/or electronic device 1704 to complete the paring operation at block 1726.

If the user directs electronic device 1704 to decline the pairing or a user verification operation fails, electronic device 1704 can return to block 1714 to look for other accessories or devices. If electronic device 1704 and electronic device 1702 are to pair, at block 1728 and block 1730, electronic device 1704 and electronic device 1702 can respectively execute a pair setup process. In some embodiments, the pair setup process can be used to establish encryption keys to facilitate secure communication between electronic device 1704 and electronic device 1702. In some embodiments, user confirmation can be incorporated into the pair setup process, and a separate user confirmation prior to initiating pair setup is not required. In one embodiment, the pair setup process enables the establishment of a trusted relationship between electronic device 1702 and electronic device 1704. The established trust relationship can be later verified during setup of a secure communication session.

If the pair setup process completes successfully, at block 1731 electronic device 1702 can update device status information to indicate that authorization is now required to communicate with the accessory and/or that the accessory is now paired with at least one personal device, for example, by updating a status flag indicator within the advertised device data.

At block 1732, electronic device 1704 can obtain and cache a device definition record from electronic device 1702, which can provide the record upon request at block 1734. The device definition record can include a set of services supported by the device and/or other relevant characteristics that can enable other electronic device 1704, as well as other connected devices, to determine how to control, connect with, or otherwise interact with electronic device 1702. Where electronic device 1704 caches the device definition record, the information can be used to facilitate detecting state changes in electronic device 1702. In some embodiments, electronic device 1704 can also cache information from the advertisement data provided by electronic device 1702, which can also be used to detect state changes in the communal device.

At blocks 1736 and 1738 electronic device 1704 and electronic device 1702 can begin to exchange data used to establish a secure communication channel. The data exchange can include a key or certificate exchange between the devices. The key exchange can be protected via a shared secret exchanged between devices, where the shared secret can be exchanged using an out-of-band communication method. Additionally, the data exchange can include the exchange of one or more long term keys between the devices, which may themselves be protected by one or more short-term keys. Once a pairing is established, the pairing can be leveraged to provide end-to-end message encryption such that only paired devices can read messages exchanged between the devices. In one embodiment, the secure communication channel is a bidirectional channel, enabling either device communicating not the channel to initiate a message exchange. During a message exchange, whichever device initiates the communication session is referred to as the client device, while the device accepting the session is referred to as the server device. In one embodiment, the first message exchanged between devices is an information exchange message. The client device can send an initial information message including feature flags or other device information. The server device can then respond with an information message as to supported features. Once the secure communication channel is established and the information exchange occurs, the communicating devices can enter an idle state if there are no immediate operations pending.

It will be appreciated that the discovery and pairing process described herein is illustrative and that variations and modifications are possible. Operations described as sequential may be executed in parallel, order of steps may be varied, and steps may be modified, combined, added or omitted. Furthermore, while the SSDP and Bonjour services are used as examples of a device discovery service, similar concepts can be applied in the context of other device discovery services. In some embodiments, prior to determining whether to pair with electronic device 1702 or any other discovered device, the electronic device 1704 can request a definition record (or a portion thereof) from the paring candidate device, which can be requested, for example, via an HTTP request). Depending on configuration, the paring candidate device can provide all, some, or none of its accessory definition record in response to a request from an unpaired electronic device. Alternatively, definition records may be accessible before a pairing is established and the decision whether to pair can be based on the advertisement information provided by the paring candidate device. The advertisement data can include, for example, a local name for the device; a unique accessory identifier; flags indicating that the accessory is discoverable; a universally unique identifier (UUID) for at least some of the services; an indicator of the device state; and an indication of whether the device has performed pair setup with any other electronic devices.

In some embodiments, the discovery process 1700, or a similar process, can be used to detect state changes in paired devices. For example, a state number value that is advertised by a device can be incremented when device state changes. When a device (e.g., electronic device 1702) advertises a state change, other paired devices (e.g., electronic device 1704) can advertise the state change, for example, by broadcasting an updated Bonjour TXT record, and a paired electronic device that has previously cached the device record can detect the change by comparing the broadcast values of the state number with the cached value.

The secure communication channel established between the devices at block 1736 and block 1738 can be used to exchange companion link messages. In one embodiment, before companion link messages are exchanged over a companion link, a secure session is established or re-established between electronic device 1702 and the electronic device 1704. In one embodiment, establishing a session includes performing a pair-verify process to verify the pairing between devices. The pair-verify process relies upon a previously established paring relationship between electronic device 1702 and electronic device 1704. For example, and in one embodiment, establishing a companion link session between devices can require the persistent identifier of the devices, which can be derived from an anonymized identifier that is advertised via the discovery service. However, to derive the persistent identifier based on the advertised information can make use of one or more elements of data that were exchanged during the pairing process between the devices. In one embodiment, the pair-verify process can include the generation of short-term public key pairs that are used to encrypt or sign messages exchanged during the verification process, as well as a verification of previously exchanged long-term key pairs that were exchanged during the initial pairing of the devices. The pair-verify process can be performed each time a secure session is established between devices using a companion link connection.

Figure 18:
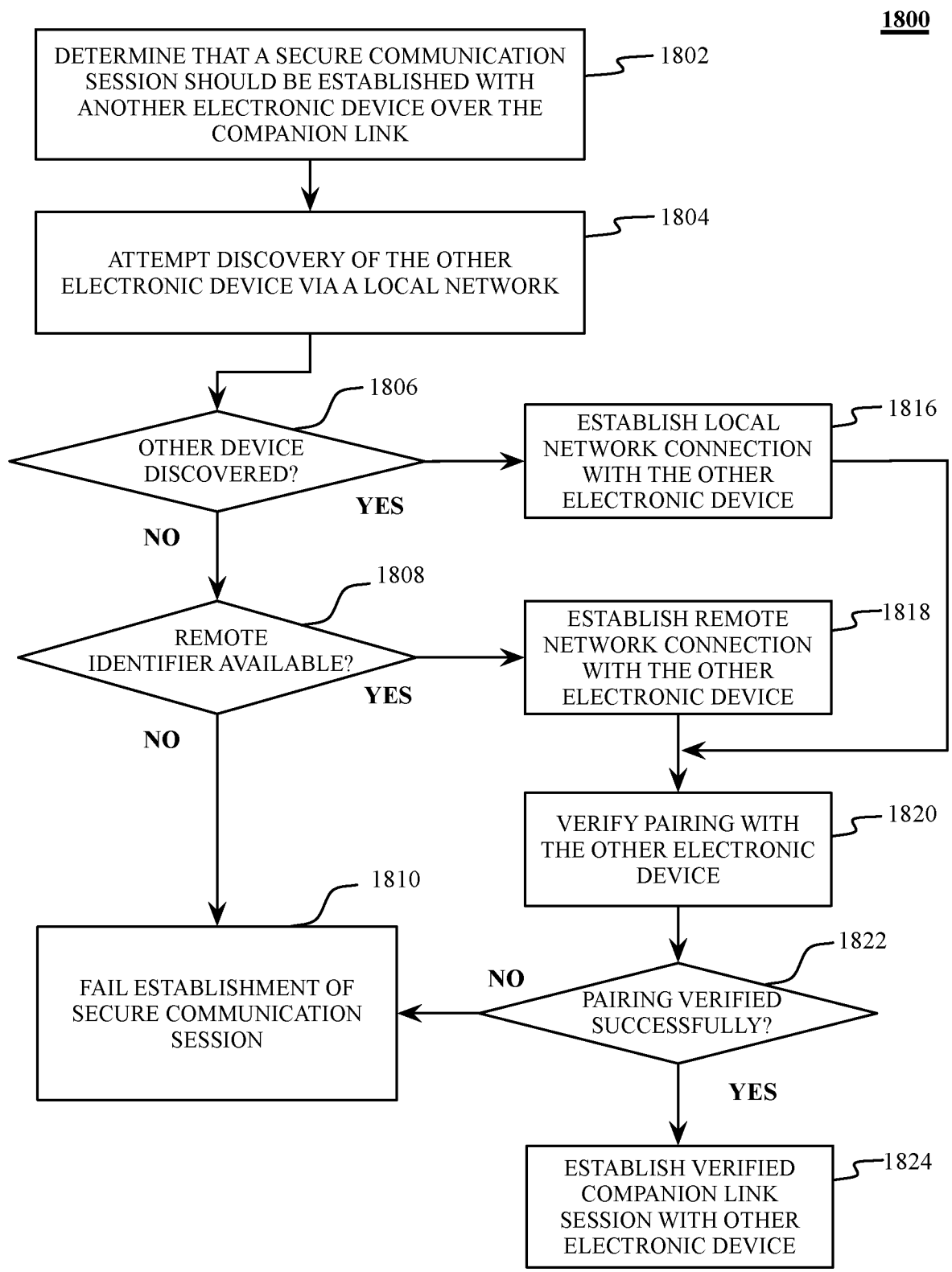
FIG. 18 illustrates a process for an electronic device to establish a companion link connection with a paired device, according to embodiments described herein.

FIG. 18 illustrates a process 1800 for an electronic device to establish a companion link connection with a paired device, according to embodiments described herein. The process 1800 illustrates operations in which an electronic device is to initiate a connection with another electronic device over the companion link. In one embodiment, during message exchange over the companion link, whichever device initiates the communication session is a client device with respect to the companion link, while the device accepting the session is a server device with respect to the companion link, accordingly, any electronic device that can connect over the companion link may each initiate or accept a companion link connection.

At block 1802, a determination can be made at a client electronic device that a communication session should be established with another electronic device (e.g., server electronic device) over the companion link. The determination can be made by any companion-link capable electronic device described herein to initiate a data transmission session between devices. The connection can be established at device initialization on a client device, to re-establish a connection that has been disconnected, or a connection that has timed-out due to non-use.

At block 1804, the client electronic device can attempt discovery of the other electronic device via the local network. The discovery can be performed using a discovery service as described herein, including but not limited to Bonjour or SSDP. If the other device is discovered locally at block 1806, the process 1800 continues at block 1816, where the client electronic device can attempt to establish a local network connection with the other electronic device. The local network connection can be established via a network protocol such as, but not limited to, the transmission control protocol (TCP). If the other electronic device is not discovered locally, the client electronic device can determine if a remote identifier is available at block 1808. The remote identifier can be an identifier or identification token that enables the electronic device, or another companion link client, to locate, connect, and established a companion link session with a paired device that does not reside on the same network or is otherwise unable to be discovered via a discovery service protocol. One or more remote identifiers can be exchanged between companion link devices during the presence and reachability information exchange that occurs during a local device discovery and/or pairing process (e.g., discovery process 1700 as in FIG. 17). Exemplary remote identifiers include the digital assistant identifier associated with a digital assistant client on the other electronic device, which can be used to communicate via a digital assistant server; an identifier token established via registration with an online user account server; and a relay identifier associated with a relay server. The electronic device can use an available remote identifier to query for a network address, such as an Internet IP address, that can be used to connect to the other electronic device, or to enable a relayed message exchange with the other electronic device via a relay service. At block 1818, the electronic device can use a remote identifier to establish a remote network connection with the other electronic device.

Whether the connection is established via a local network connection at block 1816 or a remote network connection at block 1818, the client electronic device can verify the pairing with the other electronic device at block 1820. Verifying the pairing establishes that a genuine pair relationship exists between the devices commenting over the companion link and makes uses of data exchanged during a previous local pairing. In one embodiment, a pair-verify process is performed in which each device demonstrates possession of a long-term private key corresponding to a long-term public key that was exchanged during pair setup. The pair-verification process can additionally include establishing a new shared secret or session key, which can be used to encrypt communications that occur during a pair-verified session.

At block 1822 the other electronic device can determine whether the pair-verify process was successful. If the pair verification process at block 1820 fails to verify a pair relationship between the electronic devices, the client electronic device will fail the establishment of the secure communication session, as the security of the communication link may have been compromised. In one embodiment, the client electronic device can inform the user of when a secure connection with another electronic device has failed to validate.

If at block 1822 the electronic device determines that the pairing has been successfully verified, the client electronic device can establish a verified companion link session with the other electronic device at block 1824. The verified session can enable end-to-end encrypted message exchange between the devices, such that messages and data can be exchanged between devices in a privacy-preserving manner. The encrypted message exchange can be performed to enable, for example, the relay of commands or responses for a digital assistant with respect to personal or private user data, synchronize device data between the electronic devices, or establish a secure intercom media stream with the other electronic device.

As indicated above, while process 1800 is described and illustrated with a client electronic device initiating a connection with another (e.g., server) electronic device, a verified companion link session is a bidirectional connection once established, enabling two-way message exchange between the devices. Furthermore, any mobile devices that participate in the session can enter a wake-on-wireless state when data is not being exchanged over the companion link, such that the device may enter a low power state while the wireless radio and associated processors maintain the connection associated with the session.

Network Framework for Content Playback on Multiple Devices

In some embodiments, content playback on multiple devices as depicted in FIG. 8-14 and implemented by the systems and devices of FIG. 1-7C can be further implemented using the network systems and frameworks as depicted in FIG. 15-18. The companion link framework can provide an underlying implementation layer for network functionality accessed by techniques described herein. The companion link network framework can enable automatic connections between user devices and secondary devices that are used for playback. Once connected, the companion link can facilitate the exchange of media information between digital assistant clients on the user devices and the secondary devices. The companion link can then facilitate the determination of the playback mode based on the availability of requested media items. For example, a requested media item may not be available at all player systems, depending on the media stored on the player and/or whether the player has access to a music streaming service. The companion link can be used to stream content from a first player to a second player in the event that content is not directly available on the first player.

In a further embodiment, the digital assistant client functionality is extended beyond that which is depicted above in FIG. 8-14. In one embodiment, if playback of media content requires the use of an application that is available on an application store, the digital assistant client can facilitate the acquisition of the application from the application store to streamline the process of media playback. For example, the digital assistant client can offer the user the option to download the application and begin playback via the downloaded application.

In one embodiment, a digital assistant client on player devices (e.g., secondary user devices such as televisions, set top boxes, and/or voice activated speaker systems) can provide identifying information, including an identification token, to companion link framework logic on the secondary user devices. Companion link framework logic on a user device can auto-connect to the player devices when the user device joins the same network as the player devices or when the user device comes within direct wireless communication range of the player devices. Once connected, the companion link framework logic can synchronize digital assistant client information between the player devices and the user devices, to reduce response latency when a command is received at the digital assistant of a user device. The synchronization can be a two-way synchronization in which the user device receives information from the player devices and the player devices receive information from the user device. Synchronized information can include for information to facilitate the playback of media on the player device.

Figure 19:
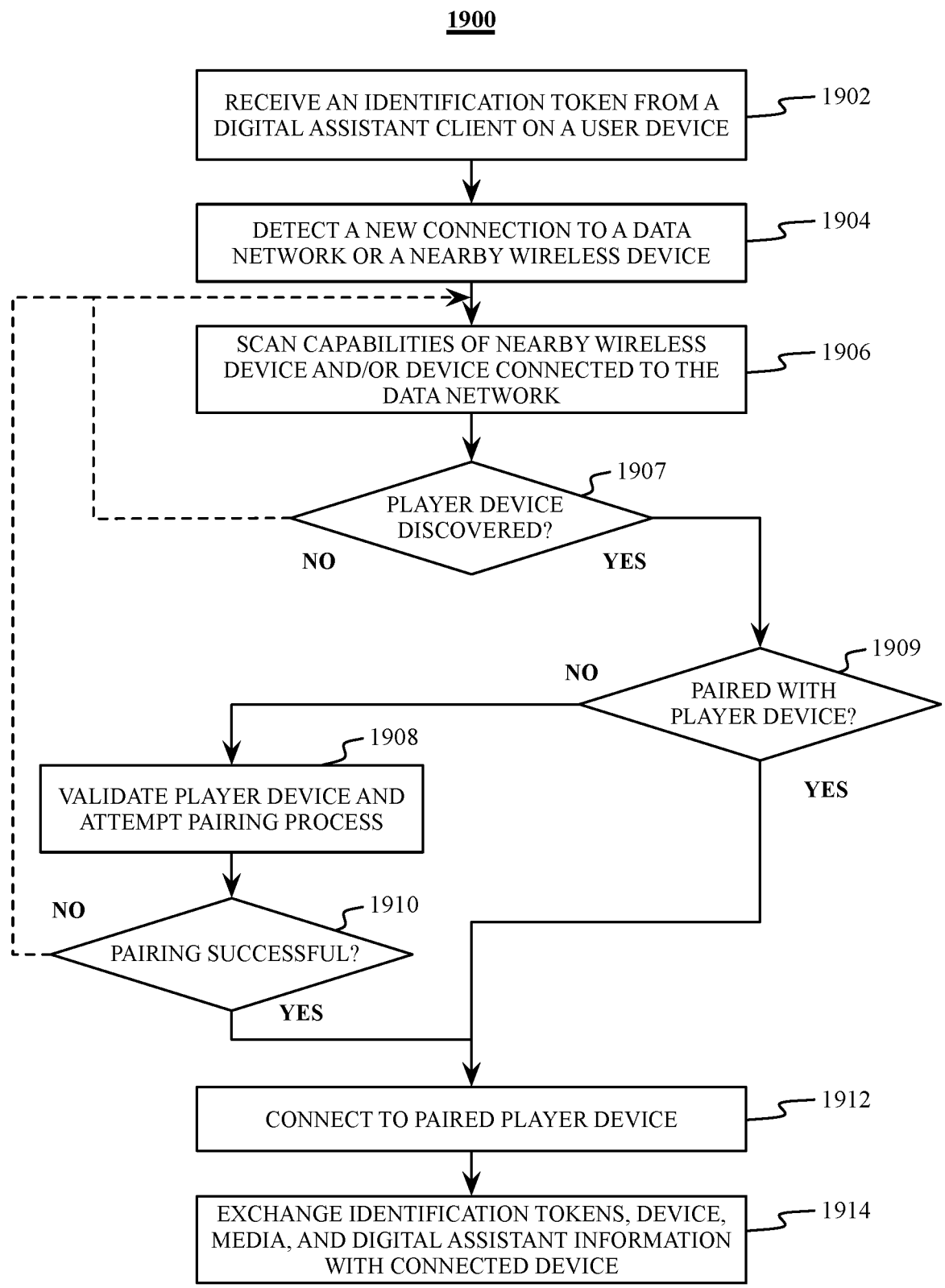
FIG. 19 illustrates process at a network framework for content playback on multiple devices, according to embodiments.

FIG. 19 illustrates process 1900 at a network framework for content playback on multiple devices, according to embodiments. Process 1900 is performed, for example, using one or more electronic devices, such as the devices of system 1500 of FIG. 15. The illustrated electronic devices can additionally include a companion link framework that provides network connection services. In one embodiment, the operations of process 1900 are performed at least on part via software logic (e.g., a library or daemon) associated with the companion link framework.

Process 1900 includes, as shown at block 1902, companion link logic can receive an identification token from a digital assistant client on a user electronic device. The companion link logic can then detect, via one or more network or data interfaces, a new connection to a data network, as shown at block 1904. Instead of detecting a new network connection, the companion link logic can also detect the presence of a nearby wireless device capable of a direct wireless connection. As shown at block 1906, the companion link logic can scan the capabilities of a nearby wireless devices and/or a device connected to the data network to determine if any of the devices are player devices that can play media. If a player device is discovered, as shown at block 1907, process 1900 includes for the companion link logic determine if the detected player device has been paired with the user electronic device at block 1909. Otherwise the companion link logic can return to block 1906 to continue to search for a player device.

If at block 1909 the user electronic device is determined to be paired with the player device, process 1900 can proceed to block 1912 and the user electronic device, via the companion link logic, to connect to the paired player device. If at block 1909 the user electronic device is not paired with the player device, the process 1900 process to block 1908 and the user electronic device can proceed via the companion link logic, to validate the player device to determine whether the player device is a genuine player device. For example, the user electronic device can determine, via a device validation server, whether a device identifier of the device is valid. Alternatively, the user electronic device can validate a certificate or key associated with the device. If the player device is authentic, the user electronic device can attempt the companion link pairing process, for example, as depicted in FIG. 17. If the pairing process is not successful, as determined at block 1910, process 1900 can return to block 1906. If pairing is successful, process 1900 can proceed to block 1912 and the user electronic device can connect to the paired player device.

After the user electronic device connects with a paired player device at block 1912, the user electronic device can exchange identification tokens, as well as device, media and digital assistant information with the connected device, as shown at block 1914. In one embodiment, the identification tokens and device, media, and digital assistant information that is exchanged can include the identification token received from the digital assistant client. In one embodiment, for each of the user electronic device and the player device, additional information exchanged can include: at least one identifier, installed applications, assigned owners, users, or delegates, registered cloud service accounts, media content downloaded or stored at the devices, media content owned by an owner, user, or delegate of a device and/or an associated cloud services account. In some examples, the information may include a viewing history of media content on a device. For example, viewing history may include identification of a plurality of viewed media items, a time and date for which the user viewed the media items, a number of times the user viewed the media items. In some examples, the information may include media rendering capabilities of a candidate secondary user device. In one embodiment, the media rendering capabilities for the devices can be exchanged. For example, the player devices can include a smart home device such as a connected appliance or digital assistant enabled speaker device, which may not be able to render video or may have limited video rendering capability. The media rendering capabilities that are exchanged can indicate whether the smart home device is capable of playing media. For smart home devices, set-top boxes or televisions that have video playback capability, the media rendering capabilities can indicate video resolution capabilities or aspect ratio capabilities.

Computing Device for Distributed Media Playback

Figure 20:
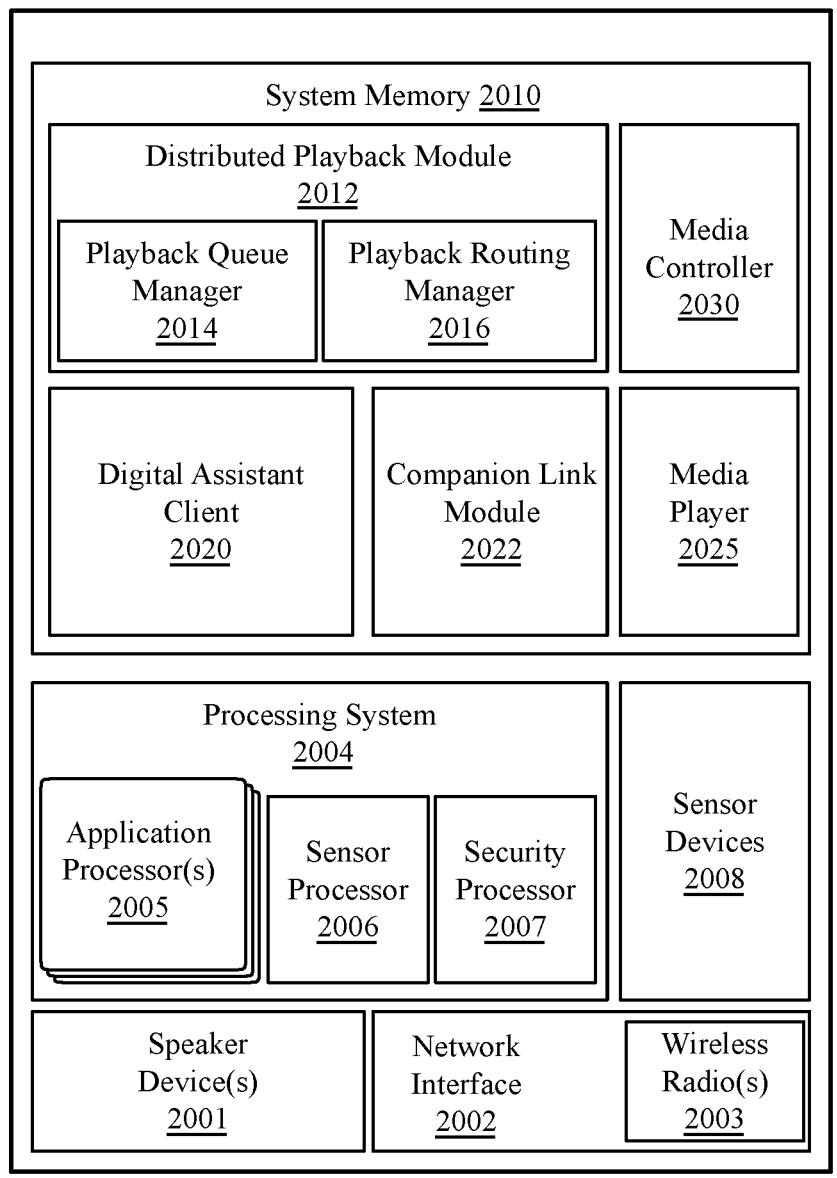
FIG. 20 is a block diagram of a computing device for use in distributed media playback, according to an embodiment.

FIG. 20 is a block diagram of a computing device 2000 for use in distributed media playback, according to an embodiment. The computing device 2000 can represent a user device or player device as described herein. The computing device 2000 includes one or more speaker device(s) 2001 to enable media playback. Where the computing device 2000 is a smart speaker device, the speaker device(s) 2001 may be of higher quality relative to when the computing device is implemented as a user device or a smart appliance. Where the computing device 2000 is a television or television set top box, the computing device may include a display interface or display device (not shown).

The computing device 2000 includes a network interface 2002 that enables network communication functionality. The network interface 2002 can couple with one or more wireless radio(s) 2003 to enable wireless communication over one or more wireless networking technologies such as, but not limited to Wi-Fi and Bluetooth. In some implementations, the network interface 2002 may also support a wired network connection. The computing device also includes a processing system 2004 having multiple processor devices, as well as a system memory 2010, which can be a virtual memory system having an address space that includes volatile and non-volatile memory.

In one embodiment, the processing system 2004 includes one or more application processor(s) 2005 to execute instructions for user and system applications that execute on the computing device 2000. The processing system can also include a sensor processor to process and monitor a suite of sensor devices 2008 having sensors including, but not limited to motion sensors, light sensors, proximity sensors, biometric sensors, audio sensors (e.g., microphones), and image sensors (e.g., cameras). The sensor processor 2006 can enable low-power monitoring of always-on sensors within the suite of sensor devices 2008. The sensor processor 2006 can allow the application processor(s) 2005 to remain in a low power state when the computing device 2000 is not in active use while allowing the computing device 2000 to remain accessible via voice or gesture input to a digital assistant client 2020. In one embodiment, the sensor processor 2006 or a similar low power processor within the processing system can enable low power processing of media instructions provided by a media player 2025. The media player 2025 may be a modular media player that is capable of playback of a variety of different audio and/or video media types, including but not limited to MPEG-2, MPEG-4, H.264, and H.265/HEVC. In one embodiment, other formats may be supported via additional CODEC plugins. The computing device can optionally include a display device (not shown) or can output video to other devices for display using a wireless display protocol.

The digital assistant client 2020 is the logic that executes on the computing device 2000 to provide the intelligent automated assistant system described herein. The digital assistant client 2020 can be selectively given access to various software and hardware components within the computing device, including but not limited to the network interface 2002 to retrieve data via a network, media playback applications to initiate or stop playback of media files, or user calendar data to schedule calendar events, tasks, reminders, or alarms. Where the digital assistant client 2020 executes on a smart home device as described herein, the digital assistant client can interact with a companion link module 2022 to locate and connect with a companion device or a digital assistant client executing on the companion device in the event a request is received to access personal domain data of a user. The companion link module 2022 is a network interface framework that is a least in part a software module that resides in system memory 2010. The companion link module 2022 can include or be associated with a daemon that executes on the processing system 2004 or library within system memory 2010. The companion link module 2022 can also include or interact with hardware or firmware logic of the computing device 2000. The companion link module 2022 can work in concert with the digital assistant client 2020 and the distributed playback module 2012 to initiate media playback or media streaming.

Where the computing device 2000 is within a smart speaker device capable of participating in a distributed playback system, a distributed playback module 2012 can perform operations to manage various aspects of media playback, including but not limited to a playback queue manager 2014 to manage a list of media to be played via a distributed playback system and a playback routing manager 2016 to route media playback to specific elements of the distributed playback system. In one embodiment the playback routing manager 2016 can connect with different elements of the distributed playback system via a connection established using the companion link module 2022. The companion link module 2022 can facilitate connection establishment and message relay over a companion link established between the speakers and devices of the distributed playback system to perform operations such as configuring channel output for a multi-channel playback system or coordinating volume adjustments across multiple connected speakers. In one embodiment the companion link module 2022 can also perform operations to enable a media intercom over the companion link connection between the computing device 2000 and other smart home devices.

In one embodiment, a media controller 2030 can exchange data with the distributed playback module 2012. The data exchange can be performed in response to input received via a user interface of the computing device 2000 or a different computing device that participates within the distributed playback system. The data exchange can also be performed in response to activity requested via the digital assistant client 2020. For example, the media controller 2030 can determine to start, stop, or control media playback locally via the media player 2025 or via the distributed playback module 2012. In one embodiment, a playlist, rather than a single media item, can be played via the media player 2025 or the distributed playback module 2012.

In one embodiment, the playback queue manager 2014 can manage multiple simultaneous playback queues, where the playback queues include one or more past, present or future media elements to be played via the computing device 2000. The playback queues can be loaded with individual media elements or playlists that specify multiple media elements. The playback queues can include locally stored media, media that will be retrieved for playback via a media server or media that will be streamed from a local or remote media streaming server. Multiple types of media elements may be played over the distributed playback system via the playback queue manager, including multimedia files such, as but not limited to music, music videos, and podcasts, including audio or video podcasts, or audio and/or video clips of current news, weather, or sports events.

Where one or more podcasts are selected for playback in response to the occurrence of a scheduled event, podcast selection logic can select a specific episode of a podcast for playback, such as the latest available episode of a podcast or the latest available unplayed podcast. Such selection can be determined from explicit user preferences or based on learned user preference information. The selection can also be performed based on the age of the available unplayed podcasts relative to the current date. In one embodiment, a podcast feed contains metadata that indicates whether the podcast feed is associated with a serial podcast or a news-style podcast. Whether to play the earliest unplayed episode or the latest episode can be determined at least in part based on such metadata.

In one embodiment, for example when setting a wake alarm, a news program or news channel may be selected for playback. The user may select a specific program or channel for playback in response to the wake alarm. Alternatively, the user can select a generic news category and logic associated with the playback queue manager 2014 can select the news program or news channel to play based on selected user preferences. In one embodiment, a news program preference can be determined based on news topic preferences selected in a news program on a user device.

In one embodiment, the playback routing manager 2016 can be used to select a playback device within the distributed playback system to use to play a playback queue. Depending on the number of playback devices within the distributed playback system, multiple different queues can be active on multiple different playback devices or multiple different playback devices within the distributed playback system can be grouped. Grouped playback devices can share a common playback queue and simultaneously play the same media. When a smart playback device is provisioned, the playback device can be associated with one or more users and/or one or more user accounts. The smart playback device can also be assigned a location and/or device type. In one embodiment, residential distributed playback network can be configured in which multiple user devices and play media via one or more smart playback devices within a residence. When a smart playback device is added to the residential network, a room or location of each playback device can be specified. An ownership can also be specified for each smart playback device that indicates whether the smart playback device is associated with a single user or if the smart playback device is a smart home device that is associated with multiple users.

Exemplary Application Programming Interface Architecture

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 21:
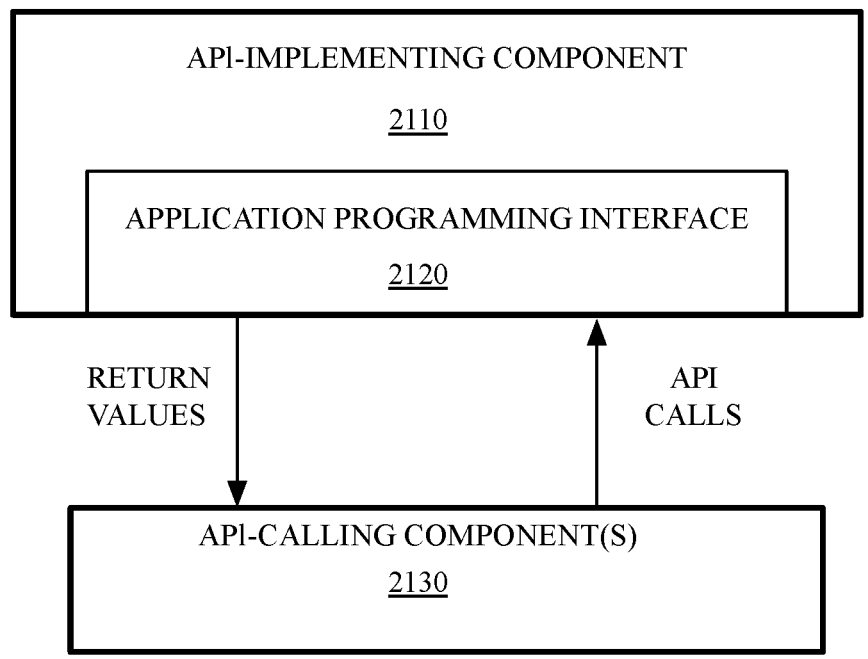
FIG. 21 is a block diagram illustrating an API architecture, which may be used in some embodiments of the invention.

FIG. 21 is a block diagram illustrating an API architecture 2100, which may be used in some embodiments of the invention. The API architecture 2100 includes the API-implementing component 2110 (e.g., an operating system, a library, a device driver, an API, an application program, software or other module) that implements the API 2120. The API 2120 specifies one or more functions, methods, classes, objects, protocols, data structures, formats and/or other features of the API-implementing component that may be used by the API-calling component 2130. The API 2120 can specify at least one calling convention that specifies how a function in the API-implementing component receives parameters from the API-calling component and how the function returns a result to the API-calling component. The API-calling component 2130 (e.g., an operating system, a library, a device driver, an API, an application program, software or other module), makes API calls through the API 2120 to access and use the features of the API-implementing component 2110 that are specified by the API 2120. The API-implementing component 2110 may return a value through the API 2120 to the API-calling component 2130 in response to an API call.

It will be appreciated that the API-implementing component 2110 may include additional functions, methods, classes, data structures, and/or other features that are not specified through the API 2120 and are not available to the API-calling component 2130. It should be understood that the API-calling component 2130 may be on the same system as the API-implementing component 2110 or may be located remotely and accesses the API-implementing component 2110 using the API 2120 over a network. While FIG. 21 illustrates a single API-calling component 2130 interacting with the API 2120, it should be understood that other API-calling components, which may be written in different languages (or the same language) than the API-calling component 2130, may use the API 2120.

The API-implementing component 2110, the API 2120, and the API-calling component 2130 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 22A:
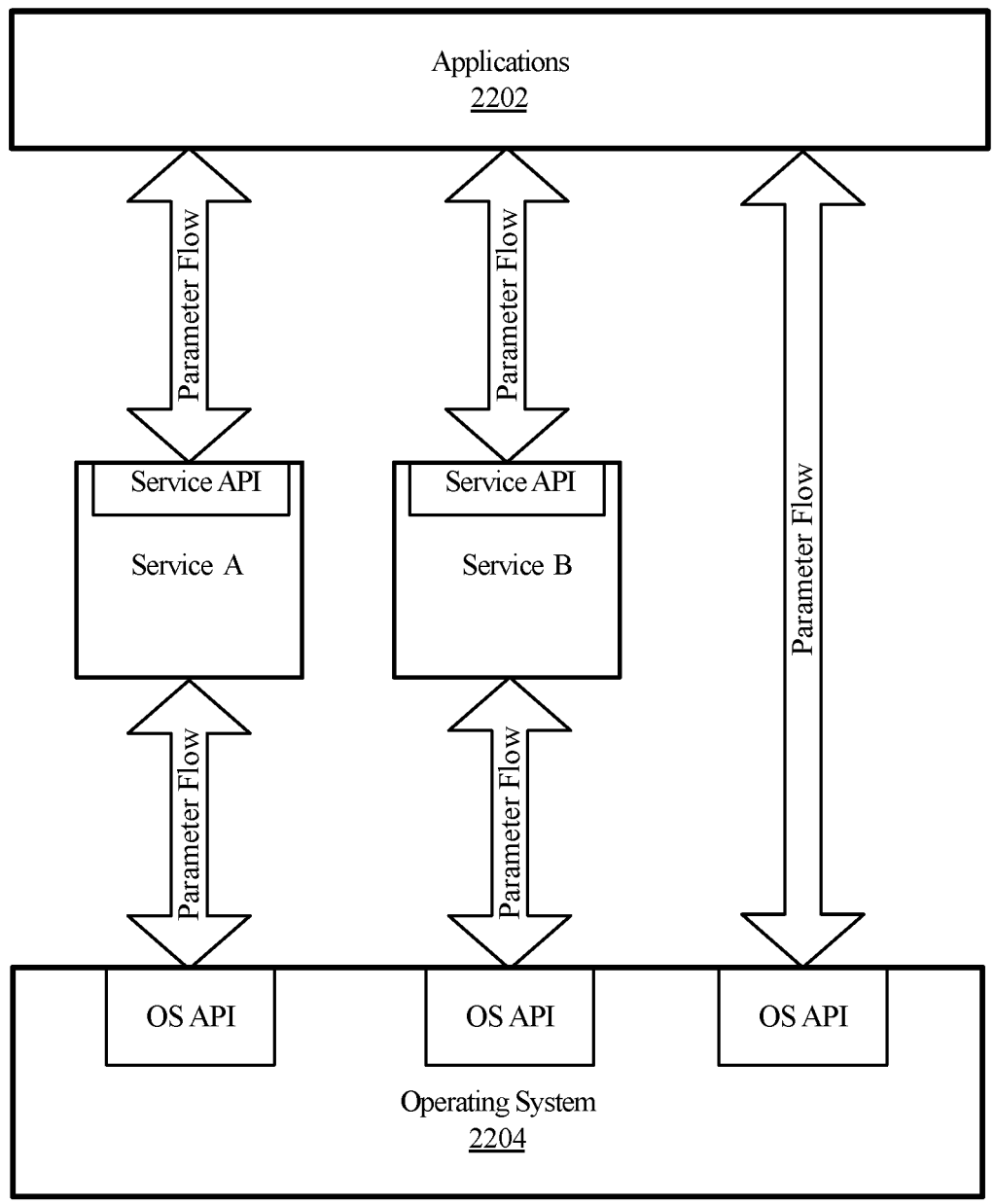
FIG. 22A-22B are block diagrams of exemplary API software stacks, according to embodiments.
Figure 22B:
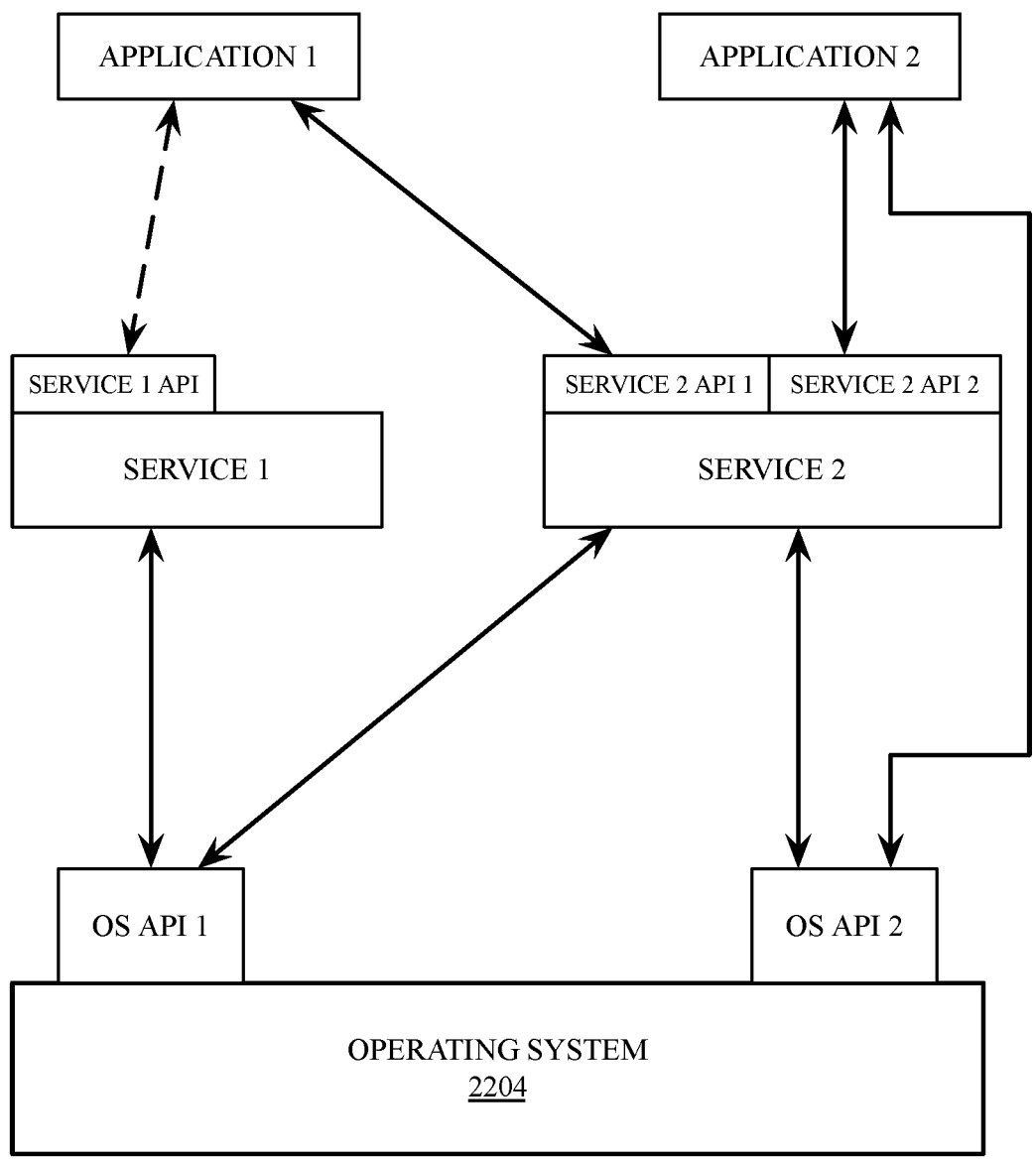

FIG. 22A-22B are block diagrams of exemplary API software stacks 2200, 2210, according to embodiments. FIG. 22A shows an exemplary API software stack 2200 in which applications 2202 can make calls to Service A or Service B using Service API and to Operating System 2204 using an OS API. Additionally, Service A and Service B can make calls to Operating System 2204 using several OS APIs.

FIG. 22B shows an exemplary API software stack 2210 including Application 1, Application 2, Service 1, Service 2, and Operating System 2204. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

API for Content Playback on Multiple Devices

Figure 23:
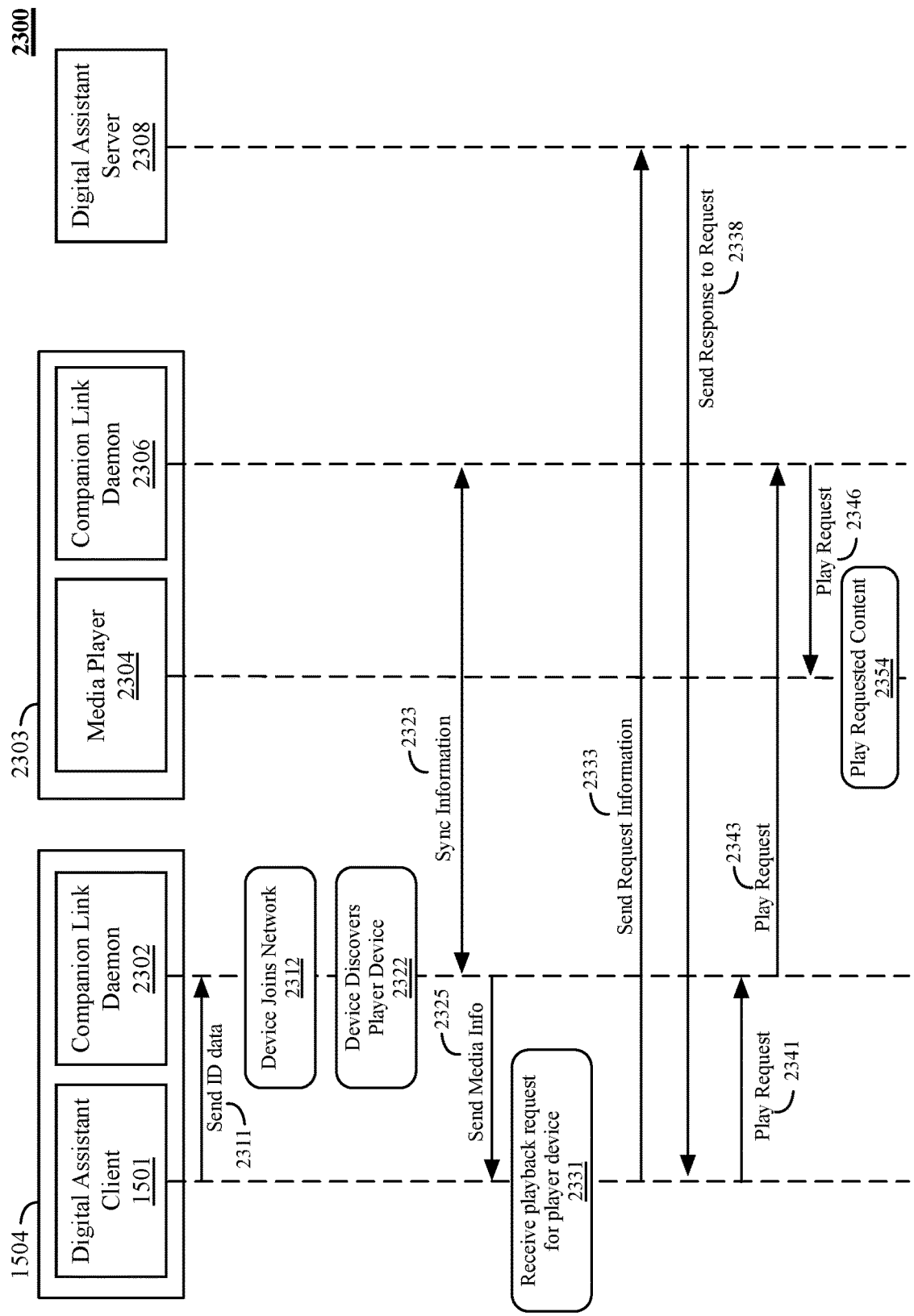
FIG. 23 illustrates an API for content playback on multiple devices, according to embodiments.

FIG. 23 illustrates an API 2300 for content playback on multiple devices, according to embodiments. In one embodiment a user device 1504, which is representative if any user device described herein, can include a digital assistant client 1501 as described herein and a companion link daemon 2302. A player device 2303 can include a media player 2304 and a companion link daemon 2306. In one embodiment the media player can be a version of the media player 2025 of the computing device 2000 of FIG. 20. Companion link daemon 2302 and companion link daemon 2306 can each include software logic associated with the companion link module 2022 of the computing device of FIG. 20. A digital assistant server 2308 is also included. The digital assistant server 2308 can be a version of variant of the digital assistant servers (e.g., digital assistant server 106, digital assistant server 1506) as described herein. The components, messages, and operations depicted are intended to be understood in the context of the components, messages, and operations depicted in FIG. 8A-8G.

In one embodiment the digital assistant client 1501 can send identification data 2311 to the companion link daemon 2302, such as an identification token that is used to identify the digital assistant client 1501 at the user device 1504. In one embodiment when the user device 1504 joins (2312) a network, or otherwise become able to connect to other devices (e.g., via a direct wireless connection), the user device can discover (2322) a player device. The discovered player device can be added to a set of player devices that have been discovered via the network. The companion link daemon 2302 on the user device 1504 can synchronize information (2323) with the companion link daemon 2306 on the player device 2303. The synchronized information can include companion link data, digital assistant client data, and information on media that is available to the user device 1504 and the player device 2303. For example, the digital assistant client 1501 on the user device 1504 can be made aware of the media items are that are stored on or accessible to the player device 2303 (2325). Likewise, the media player 2304 on the player device 2303 may be made aware of the media items that are stored on or accessible to the player device 2303 via the user device 1504. Synchronized information can include data described with respect to block 1914 of the process 1900 depicted in FIG. 19. In one embodiment, synchronized information can also include whether the user device 1504 or the player device 2303 is associated with an online account having membership in one or more music streaming services. The synchronization of information (2323) between the companion link daemons can enable the user device 1504 and player device 2303 to prepare to respond to a user request to play media on a specific device.

When the digital assistant client 1501 at the user device 1504 receives a playback request (2331) for a specified player device, the digital assistant client 1501 can send request information (2333) to the digital assistant server. The playback request can include a requested media item to be played on a requested media player, or can include a natural language request that can be resolved by the digital assistant client 1501 and/or the digital assistant server 2308 (e.g., 'this' media item, 'that' player device). The request information (2333) sent to the digital assistant server can include the requested media item and playback target. In addition to a media item and target, the request information (2333) can also include a directory service identifier (DSID), which is a unique or quasi-unique identifier associated with an account. One or more DSIDs can be sent, for example, if the user device 1504 and the player device 2303 are associated with different accounts. In one embodiment, the accounts can be associated with an online user account server 1536 of FIG. 15. The one or more DSIDs can allow the digital assistant server 2308 to determine a list of media items that may be accessible to the user device 1504 and/or the player device 2303. The request information (2333) can also include one or more encryption key hashes to enable the digital assistant server 2308 to lookup and access encryption keys for online user data that the digital assistant server access when resolving the playback request. The request information (2333) can also include a list or a reference to a list of media items stored on the user device 1504 and the player device 2303.

In one embodiment, the digital assistant server 2308 can correlate a requested media item with the set of media items (movies, songs, etc.) that are available from multiple sources and returns a list of media items that are available to be played. The multiple sources can include but are not limited to online streaming services, an online media server, as well as media items that are stored locally on the user device 1504 and player device 2303. In one embodiment the multiple sources can include an application that is installed on the user device 1504 and/or the player device 2303. While determining the set of available media items, the digital assistant server 2308 can communicate with one or more other servers or server clusters, including servers associated with online user accounts of the user device 1504 and the player device 2303.

To generate the list of media items that are available to be played, the digital assistant server 2308 can aggregate, de-duplicate, and filter the list of media items from the multiple sources. For example, media items from the available sources can be combined into a single list, duplicates with the list can be removed, and the media items can be filtered based on user, account, or device data. For example, a user at a parent account of a family of cloud services accounts can limit the type of media that is accessible to child accounts. Media items can also be filtered based on the type or encoding of the media items and the playback capabilities of the user device 1504 and the player device 2303.

Once one or more correlating media items and player targets are resolved at the digital assistant server 2308, the digital assistant server can send a response (2338) to the request to the digital assistant client 1501 at the user device 1504. Any uncertainties can be resolved as depicted in FIG. 9 and FIG. 10. Once a media item and player target are determined, the digital assistant client 1501 can then send a play request (2341) to the companion link daemon 2302 on the user device 1504. The companion link daemon 2302 on the user device 1504 can then send a play request (2343) to the companion link daemon 2306 on the player device 2303 that is identified by the playback request. The companion link daemon 2306 on the player device 2303 can send a play request (2346) to the media player 2304 of the player device 2303, which can then play the requested content (2354).

A scenario may arise in which a selected player may not be able to directly play the requested content. In such scenarios, it may be possible to stream the content from the user device 1504 or another player device.

Figure 24:
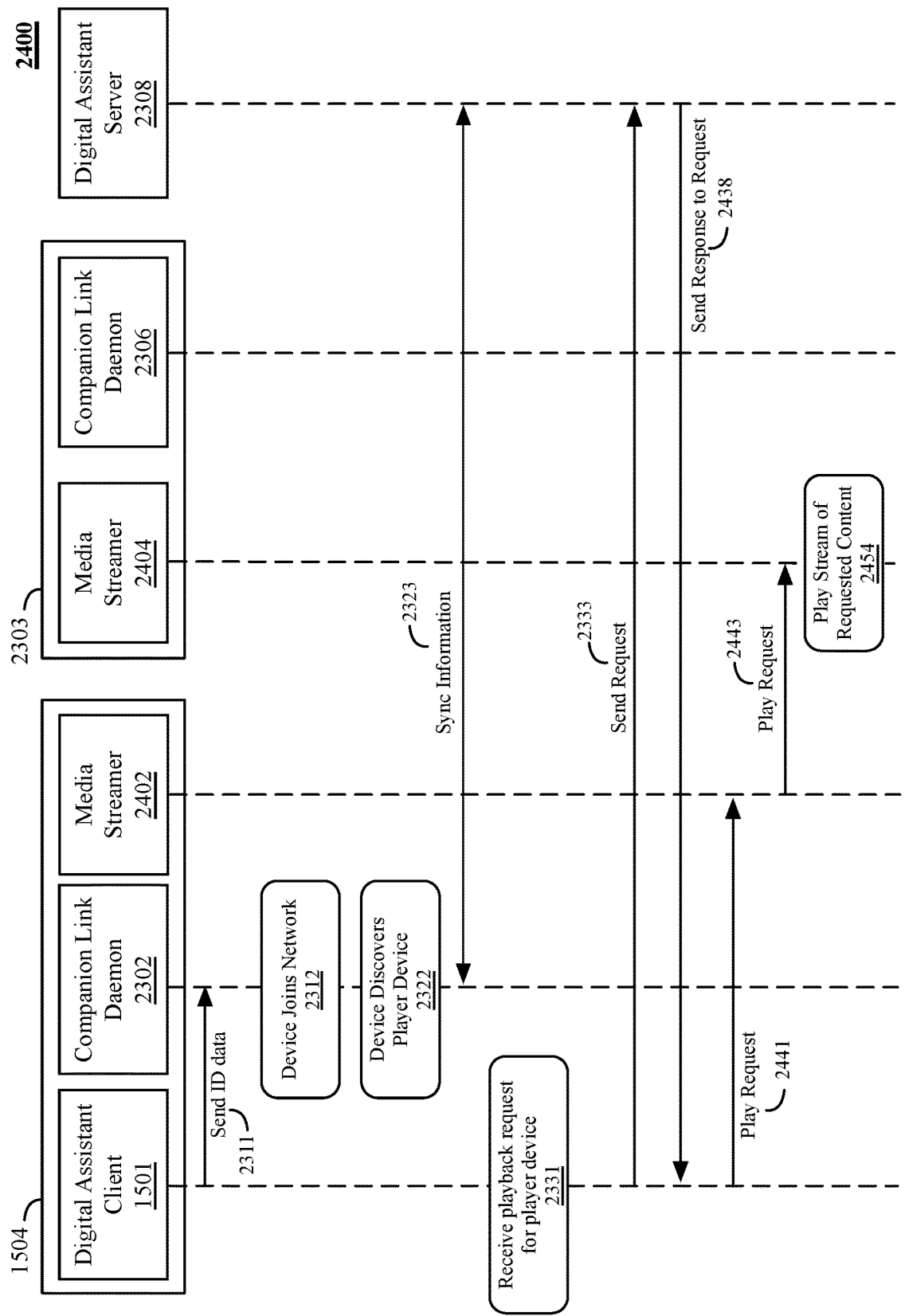
FIG. 24 illustrates an API initiate streaming of content between multiple devices, according to an embodiment.

FIG. 24 illustrates an API 2400 initiate streaming of content between multiple devices, according to an embodiment. In one embodiment, API 2400 is similar to API 2300 of FIG. 23, with the addition of logic for a media streamer 2402 on the user device 1504 and a media streamer 2404 on the player device 2303. In various embodiments, the media streamer logic can be a daemon that executes on the user device 1504 and player device 2303 or a library stored in memory of the respective devices. In one embodiment the media streamer 2404 on the user device 1504 can be configured to broadcast media content, while the media streamer 2404 on the player device 2303 can be configured to broadcast and receive media content. Media streamer 2402 and media streamer 2404 can be associated with one or more media streaming protocols, such as but not limited AirPlay or AirPlay 2, as supported by devices provided by Apple Inc. of Cupertino Calif. The media streamers can also be associated with other streaming methods, such as but not limited to Miracast, or digital living network alliance (DLNA). As specified by API 2400, the digital assistant client 1501 can send a play request (2441) to the media streamer 2402 on the user device 1504. The media streamer 2402 can then send a play request (2443) to the media streamer 2404 of the player device 2303. The media streamer 2404 on the player device can then play a stream of the requested content (2454) on the player device. A determination of whether to request the player device 2303 to directly play the requested content or to play a stream of the requested content can be determined, in one embodiment, based on information in the response (2438) sent by the digital assistant server, which can indicate which media items are available on which devices.

In one embodiment, streaming the requested content can include mirroring a display of the user device 1504. For example, a user may be playing video or audio from a website and may wish to mirror the content displayed on the user device 1504 to a television or a television set top box. To enable streaming, media streamer 2402 and media streamer 2404 can perform any digital rights management (DRM) negotiation that is needed to play the requested content, which can include requesting higher level software logic of the user device 1504 or the player device 2303 to prompt a user to log into one or more online accounts.

To stream a video media item or mirror a display of the user device 1504, the user device can decode and render frames of the decoded media item or a render the frame-buffers that are to be displayed on the user device 1504. A frame can include pixel data describing the pixels included in the frame (e.g. in terms of various color spaces, such as RGB or YCrCb), and may also include metadata such as an alpha value for blending. The user device 1504 can encode a frame into a format that is known to the player device 2303 and transmit, via a network interface, the encoded frame to the player device. The player device can decode the encoded frame and present the frame on a display of the player device 2303. A similar process can occur for audio data of the video media item and for pure audio data (e.g., music streaming). Audio data can be encoded and transmitted by the user device 1504 for decode and playback via speakers of the player device. Techniques for display mirroring are provided in detail in U.S. patent application Ser. No. 15/413,328, "System and Method for Display Mirroring," filed Jan. 23, 2017, U.S. Pat. No. 10,031,712, which is hereby incorporated by reference in its entirety.

Figure 25:
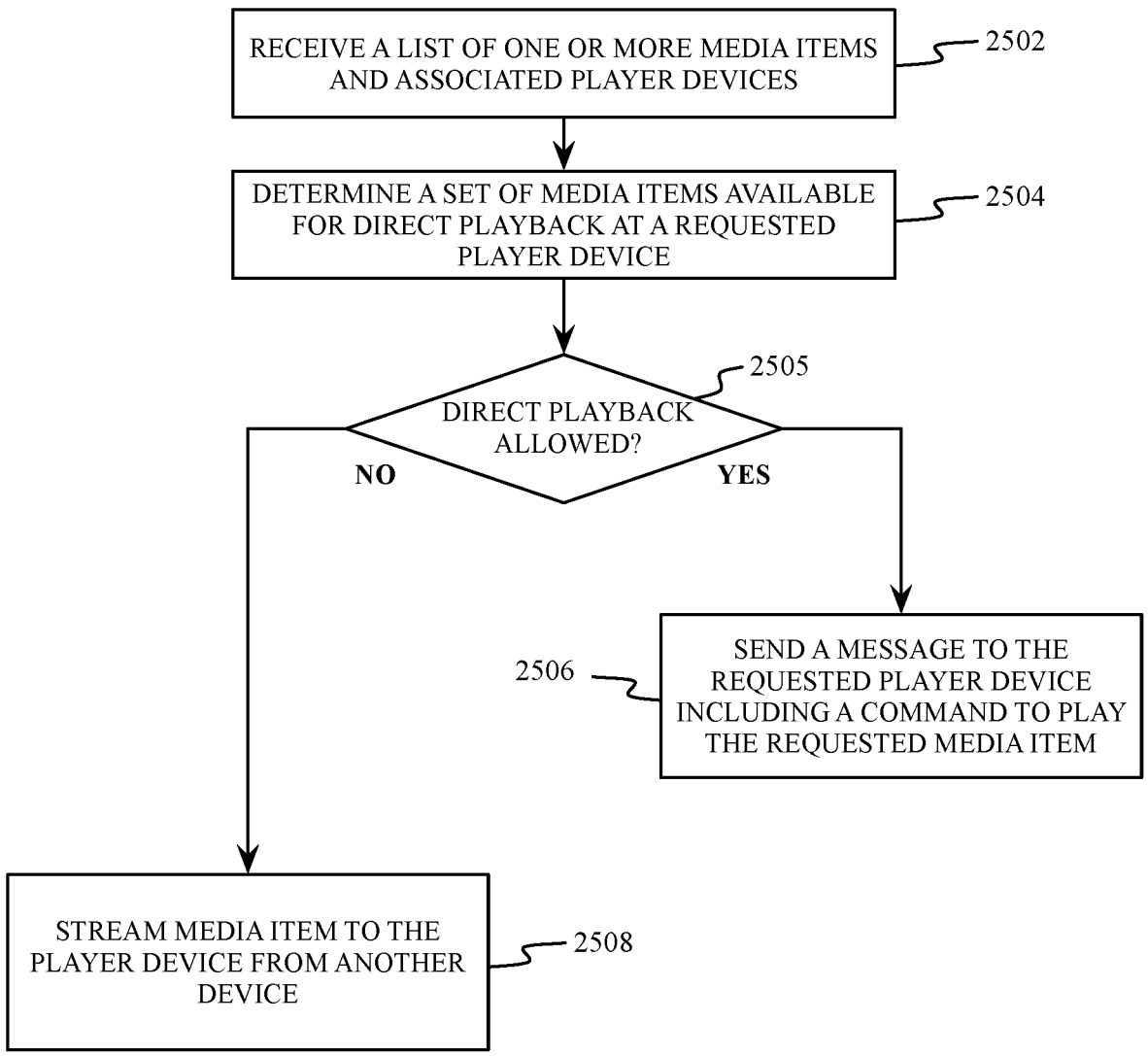
FIG. 25 illustrates logic to select between streaming and direct playback, according to an embodiment.

FIG. 25 illustrates logic 2500 to select between streaming and direct playback, according to an embodiment. Logic 2500 can be performed by hardware and software logic of a user device and one or more player devices when determining how to play a requested media item at a requested player device. The hardware and software logic can include, in one embodiment, a digital assistant client and companion link module as described herein.

In one embodiment, as shown at block 2502, a digital assistant client at a user device can receive a response to a request sent to a digital assistant server, where the response includes a list of one or more media items and one or more player devices associated with the one or more media items. At block 2504, the digital assistant client can determine a set of media items that are available for direct playback at a requested player device. If direct playback is allowed, as determined at block 2505, the digital assistant client can send a message to the requested player device at block 2506. The message can include a command to play the requested media item at the player device. If direct playback is not allowed, logic 2500 can perform operations to stream a media item to the player device from another device. The media item can be streamed from the user device to the player device or from another player device that has access to the requested media item. For example, a song that is stored locally on a digital assistant enabled smart speaker device can be streamed to a smart television or television set top box that does not have the ability to play the song directly. In one embodiment, the streaming at block 2508 can include mirroring content displayed on the user device to the requested player device, for example, if the user intends to play audio or video that is currently being played via a website or a third-party application.

In one embodiment, if direct or streaming playback of content can be enabled at a player device by downloading software from an application server or an application store (e.g., App store), the digital assistant client can offer to install the software on the player.

Figure 26:
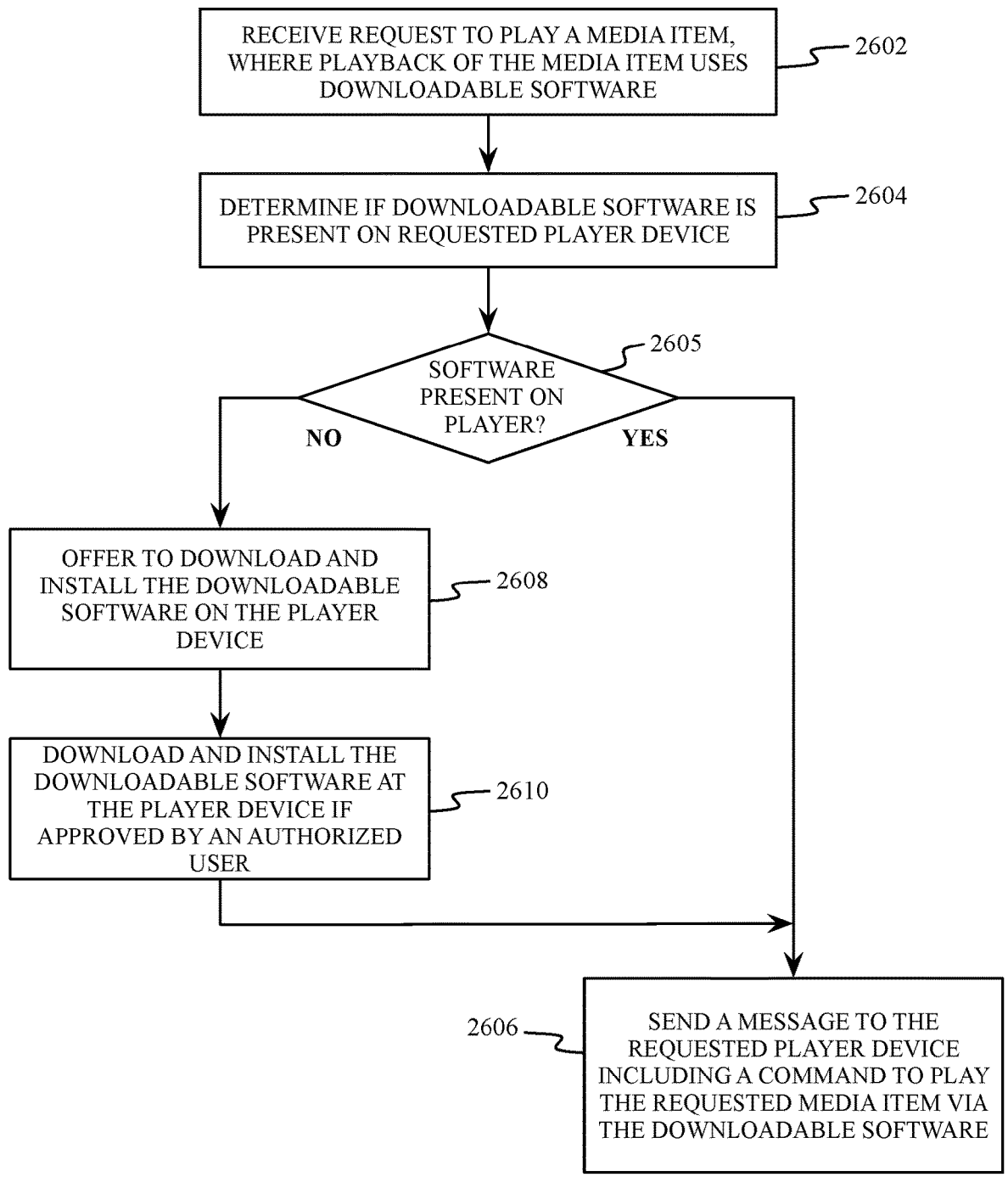
FIG. 26 illustrates logic to enable the download of software to facilitate playback of a requested media item, according to an embodiment.

FIG. 26 illustrates logic 2600 to enable the download of software to facilitate playback of a requested media item, according to an embodiment. Logic 2500 can be performed by hardware and software logic of a user device and a player device. The hardware and software logic can include, in one embodiment, a digital assistant client and companion link module as described herein.

In one embodiment, a digital assistant client on a user device can receive a request to play a media item, as shown at block 2602. Playback of the media item may use or be enabled by downloadable software, such as a media CODEC, media player, or application. The digital assistant client, at block 2604, can determine if the downloadable software is present on the player device associated with the request. The digital assistant can determine whether the software is present on the player based a list of installed software received from the player during an information synchronization phase, as depicted at block 1914 of FIG. 19 and synchronization information 2323 of FIG. 23-24.

If, as determined at block 2605, the software is present on the player, the digital assistant client can send a message to the requested player device at block 2606. The message can include a command to play the requested media item via the downloadable software. For example, the digital assistant client can send a message to initiate playback of a media item via a specific media player or via a specific application, such as a media streaming application.

If, at block 2605, the digital assistant client determines that the software is not present on the player, the digital assistant client can offer to download and install the software on the player device, as shown at block 2608. If the offer is accepted or approved by a user that is authorized to perform software downloads, the digital assistant client can facilitate the download and install of the downloadable software at the player device, as shown at block 2610. The digital assistant client can then send a message to the requested player device, as shown at block 2606.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve facilitating playback of media content on a secondary user device. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify different devices that the user has previously interacted with, such as televisions, set top boxes, or voice activated speaker systems. Accordingly, use of such personal information data enables delivery of content to devices that the user frequently engages with. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of playing media content on a secondary user device, the present technology can be configured to allow users to select to "opt in" or "opt out" of participation in the collection of personal information data during registration for services or anytime thereafter. In another example, users can select not to provide information regarding secondary user devices on which to play content. In yet another example, users can select to only "opt in" for certain secondary user devices, and "opt out" of other secondary devices for playing media content. In addition to providing "opt in" and "opt out" options, the present disclosure contemplates providing notifications relating to the access or use of personal information. For instance, a user may be notified upon providing a request for playing media content on a secondary device, where the notification indicates that personal information will be accessed. The user may be reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, secondary user devices may be identified based on non-personal information data or a bare minimum amount of personal information, such as the content being requested by the device associated with a user, other non-personal information available to the media playback system, or publicly available information.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

One embodiment provides for an electronic device, comprising a data interface, a memory to store instructions, and one or more processors to execute the instructions, wherein the instructions cause the one or more processors to receive information associated with media playback, receive a request for playback of a media item, resolve a media item and player device for the request based on a set of available media items and player devices, and transmit, via the data interface, a request to play the media item at the player device. Resolving the media item and player device can include determining a network location for a device storing the media items, a streamable status of the media items (e.g., from a local device or cloud streaming service), and resolving a network location for the player device based on an identifier or physical location associated with the player device.

One embodiment provides for a method comprising, at an electronic device with one or more processors and memory, receiving information associated with media playback, receiving a request for playback of a media item, resolving a media item and player device for the request based on a set of available media items and player devices, and transmitting, via a data interface, a request to play the media item at the player device.

One embodiment provides for a non-transitory machine-readable medium storing instructions to cause one or more processors of an electronic device to perform operations comprising detecting a player device via a data interface of the electronic device, the player device detected on a network accessible to the electronic device, automatically attempting to connect with the player device upon detection of the player device, and exchanging data with the player device, wherein data exchanged with the player device includes a first list of media items accessible to the electronic device and a second list of media items accessible to the player device. The player device can then be added to a set of available player devices on the network. Upon subsequent receipt of a request for playback of a media item, the instructions can cause the electronic device to resolve a media item for the request based on the first list of media items and the second list of media item. The electronic device can resolve a player device for use in playback of the media item for the request based on the set of available player devices on the network, such as, for example, the rendering capabilities (e.g., audio, video, etc.) of the available player devices. The electronic device can then transmit, via a data interface, a request to play the media item at a resolved player device.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An electronic device, comprising:
    a data interface to enable a connection to a network;
    a memory to store instructions; and
    one or more processors to execute the instructions, wherein the instructions cause the one or more processors to:
        detect a player device via the data interface and exchange data with the player device, wherein the data exchanged with the player device includes a first list of media items accessible to the electronic device and a second list of media items accessible to the player device;
        receive a request for playback of a media item;
        resolve a location for the media item and an identifier for the player device for the request based on a set of media items and player devices available via the network, the set of media items available via the network determined based on the first list of media items or the second list of media items; and transmit, via the data interface, a request to play the media item at the player device.

2. The electronic device as in claim 1, wherein the data interface includes a wireless radio to enable a direct wireless connection with the player device and to enable a connection to a wireless network.

3. The electronic device as in claim 2, wherein the instructions additionally cause the one or more processors to provide a digital assistant client and network interface logic.

4. The electronic device as in claim 3, wherein the digital assistant client is to send an identifier to the network interface logic.

5. The electronic device as in claim 4, wherein the network interface logic is to detect the player device via the data interface and exchange the data with the player device, wherein data exchanged with the player device includes the identifier of the digital assistant client.

6. The electronic device as in claim 5, wherein the network interface logic is to cause the electronic device to automatically attempt to connect with the player device upon detection of the player device.

7. The electronic device as in claim 6, wherein the network interface logic is to attempt to pair with the player device upon determination that a pair relationship does not exist with the player device, wherein to pair with the player device includes to determine a set of services supported by the player device.

8. The electronic device as in claim 6, wherein the network interface logic is to determine whether a pair relationship exist with the player device and establish an encrypted connection with the player device upon determination of the pair relationship.

9. The electronic device as in claim 1, wherein to resolve the media item and the player device for the request based on a set of available media items and player devices, the one or more processors are to:
send, via the data interface, a message including information associated with the request for playback of the media item; and
receive, via the data interface, one or more media items and the identifier for the player device.

10. The electronic device as in claim 1, wherein the instructions additionally cause the one or more processors to determine whether the media item is available to the player device for playback.

11. The electronic device as in claim 10, wherein the media item is determined to not be available to the player device for playback, the media item is determined to be available for streaming to the player device, and the request to play the media item at the player device is a request to play a stream of the media item at the player device.

12. The electronic device as in claim 11, wherein the instructions additionally cause the one or more processors to transmit a stream of the media item to the player device.

13. The electronic device as in claim 12, wherein to transmit the stream of the media item to the player device includes to transmit a stream including content displayed on a display of the electronic device.

14. A method comprising:
at an electronic device with one or more processors and memory:
detecting a player device via a data interface and exchanging data with the player device, wherein data exchanged with the player device includes a first list of media items accessible to the electronic device and a second list of media items accessible to the player device;
receiving a request for playback of a media item;
resolving a media item and player device for the request based on a set of media items and player devices available via a network to which the electronic device is connected, the set of media items available via the network determined based on the first list of media items or the second list of media items; and
transmitting, via the data interface of the electronic device, a request to play the media item at the player device.

15. The method as in claim 14, further comprising:
determining whether the media item is available to the player device for playback;
in response to determining that the media item is not available to the player device for playback, determining whether the media item is available for streaming to the player device; and
wherein the request to play the media item at the player device is a request to play a stream of the media item at the player device in response to determining that the media item is available for streaming to the player device.

16. The method as in claim 14, wherein data exchanged with the player device includes an identifier of a digital assistant client executed on the electronic device.

17. The method as in claim 14, additionally comprising:
automatically attempting to connect with the player device upon detection of the player device;
determining whether a pair relationship exist with the player device; and
verifying the pair relationship with the player device upon determining existence of the pair relationship, the pair relationship verified at least in part via a key received from the player device during a pair setup with the player device; and
establishing an encrypted connection with the player device upon determination of the pair relationship, wherein the encrypted connection is encrypted based on an encryption key generated while verifying the pair relationship.

18. A non-transitory machine-readable medium storing instructions to cause one or more processors of an electronic device to perform operations comprising:
detecting a player device via a data interface of the electronic device, the player device detected on a network accessible to the electronic device, the player device one of multiple player devices available for content playback via the network;
exchanging data with the player device, wherein data exchanged with the player device includes a first list of media items accessible to the electronic device and a second list of media items accessible to the player device;
adding the player device to a set of available player devices on the network;
receiving a request for playback of a media item;
resolving a media item for the request based on the first list of media items or the second list of media items;
resolving a player device for use in playback of the media item for the request based on the set of available player devices on the network, the resolved player device one of the multiple player devices available for content playback via the network; and transmitting, via the data interface, a request to play the media item at a resolved player device.

19. The non-transitory machine-readable medium as in claim 18, the operations further comprising:
automatically attempting to connect with the player device upon detection of the player device;
determining whether the media item is available to the player device for playback;
in response to determining that the media item is not available to the player device for playback, determining whether the media item is available for streaming to the player device; and
wherein the request to play the media item at the resolved player device is a request to play a stream of the media item at the resolved player device in response to determining that the media item is available for streaming to the player device.

20. The non-transitory machine-readable medium as in claim 18, the operations additionally comprising:
verifying a pair relationship with the player device upon determining existence of the pair relationship, the pair relationship verified at least in part via a key receive from the player device during a pair setup with the player device; and
establishing an encrypted connection with the player device upon determination of the pair relationship, wherein the encrypted connection is encrypted based on an encryption key generated while verifying the pair relationship.

* * * * *

UNITED STATES PATENT AND TRADEMARK OFFICE
CERTIFICATE OF CORRECTION

PATENT NO. : 11,102,259 B2  
APPLICATION NO. : 16/741504  
DATED : August 24, 2021  
INVENTOR(S) : Bradley et al.

Page 1 of 1

It is certified that error appears in the above-identified patent and that said Letters Patent is hereby corrected as shown below:

In the Claims

Column 91, Line 22 (Claim 20), Replace "receive" with --received--.

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*